(12) United States Patent  
Malek

(10) Patent No.: US 12,530,236 B2  
(45) Date of Patent: Jan. 20, 2026

(54) SYSTEMS AND METHODS FOR COMPUTING PROCESS MANAGEMENT AND COMPUTING RESOURCE ALLOCATION USING SERVERLESS CLOUD COMPUTATIONAL COMPUTING MODELS

(71) Applicant: Meteka Analytics, Inc., Champaign, IL (US)

(72) Inventor: Keyvan Malek, Champaign, IL (US)

(73) Assignee: Meteka Analytics, Inc., Champaign, IL (US)

( * ) Notice: Subject to any disclaimer, the term of this patent is extended or adjusted under 35 U.S.C. 154(b) by 0 days.

(21) Appl. No.: 19/056,633

(22) Filed: Feb. 18, 2025

(65) Prior Publication Data

US 2025/0238273 A1    Jul. 24, 2025

Related U.S. Application Data

(63) Continuation of application No. PCT/US2025/012525, filed on Jan. 22, 2025.

(60) Provisional application No. 63/623,753, filed on Jan. 22, 2024.

(51) Int. Cl.  
    *G06F 9/50* (2006.01)
(52) U.S. Cl.  
    CPC .......... *G06F 9/5033* (2013.01); *G06F 9/5072* (2013.01)
(58) Field of Classification Search  
    None  
    See application file for complete search history.

(56) References Cited

U.S. PATENT DOCUMENTS 11,256,555 B2    2/2022    Goodsitt

FOREIGN PATENT DOCUMENTS

WO    WO-2012106212 A1    8/2012

OTHER PUBLICATIONS

Abdelhafez et al., "Performance analysis of synchronous and asynchronous distributed genetic algorithms on multiprocessors" Swarm and Evolutionary Computation, Sep. 2019, vol. 49, pp. 147-157.
Alba et al., "Analyzing synchronous and asynchronous parallel distributed genetic algorithms" Future Generation Computer Systems, 2001, 17, pp. 451-465.

(Continued)

*Primary Examiner* — Eric C Wai  
(74) *Attorney, Agent, or Firm* — COOLEY LLP

(57) ABSTRACT

A request is received from a user compute device to solve an optimization problem. A set of subpopulations is identified from an identified population included in the optimization problem. Each subpopulation from the set of subpopulations is associated with a unique sub-machine resource from a set of sub-machine resources at a set of remote compute devices. Each sub-machine resource is caused to determine an associated set of candidates from an associated subpopulation from the set of subpopulations and for that sub-machine resource. Each sub-machine resource is caused to generate an associated set of offspring based on an objective function associated with the associated set of candidates for that sub-machine resource. Each sub-machine resource is caused to mutate the associated set of offspring to generate an associated set of mutated offspring. An updated population is determined, and a representation of a response is determined based on the updated population.

29 Claims, 30 Drawing Sheets

(56) References Cited

OTHER PUBLICATIONS

Alba et al., "Parallel Metaheuristics: Recent Advances and New Trends" Int. Trans. Oper. Res., Jan. 2013, vol. 20, Issue 1, pp. 1-48.

Bader et al., "HypE: An Algorithm for Fast Hypervolume-Based Many-Objective Optimization" Evolutionary Computation, 2011, 19(1), pp. 45-76.

Bi et al., "Impact of Starting Position and Searching Mechanism on the Evolutionary Algorithm Convergence Rate" Journal of Water Resources Planning and Management, 2016, 142, 36 pages.

Boelrijk et al., "Multi-objective optimization via equivariant deep hypervolume approximation" University of Amsterdam, 2022, 18 pages, Preprint at doi.org/10.48550/arXiv.2210.02177.

Bradstreet et al., A Fast Incremental Hypervolume Algorithm. IEEE Trans. Evol. Comput. 12, 714-723 (2008).

Cantu-Paz, "A Survey of Parallel Genetic Algorithms" Reseaux et Systemes Repartis, Calculateurs Paralleles, vol. 10, 1998, pp. 141-171, 30 pages.

Coello et al., "Applications of Multi-objective Evolutionary Algorithms" World Scientific, 2004, pp. 1-3, 28 pages.

Coello et al., "Evolutionary Algorithms for Solving Multi-Objective Problems" Genetic and Evolutionary Computation, Springer, 2007, pp. 477-480.

Coello et al., "Evolutionary Algorithms for Solving Multi-Objective Problems" Genetic and Evolutionary Computation, Springer, 2007, pp. 502-503.

Deb et al., "A Fast and Elitist Multiobjective Genetic Algorithm: NSGA-II" IEEE Transaction on Evolutionary Computation, Apr. 2002, vol. 6, No. 2, pp. 182-197.

Deb et al., "Self-Adaptive Genetic Algorithms with Simulated Binary Crossover" Evolutionary Computation, 2001, 9(2), pp. 197-221, 24 pages.

Deb et al., "Evaluating the $\epsilon$-Domination Based Multi-Objective Evolutionary Algorithm for a Quick Computation of Pareto-Optimal Solutions" Evolutionary Computation, 2005, 13(4), pp. 501-525.

Deb et al., "Towards a Quick Computation of Well-Spread Pareto-Optimal Solutions" Evolutionary Multi-Criterion Optimization (eds. Fonseca, C. M., Fleming, P. J., Zitzler, E., Thiele, L. & Deb, K.) pp. 222-236 (Springer, 2003). doi:10.1007/3-540-36970-8_16.

Deb, K. Multi-Objective Evolutionary Algorithms. in Springer Handbook of Computational Intelligence (eds. Kacprzyk, J. & Pedrycz, W.) 995-1015 (Springer, 2015). doi:10.1007/978-3-662-43505-2_49.

Deng et al., "Approximating Hypervolume and Hypervolume Contributions Using Polar Coordinate" IEEE Transactions Evolutionary Computation, Oct. 2019, vol. 23, Issue 5, pp. 913-918.

Falcon-Cardona et al., "Parallel Multi-Objective Evolutionary Algorithms: A Comprehensive Survey" Swarm Evol. Comput., 2021, 67, 100960, 90 pages.

Garcia et al., "COARSE-EMOA: An indicator-based evolutionary algorithm for solving equality constrained multi-objective optimization problems" Swarm and Evolutionary Computation, Dec. 2021, vol. 67, 35 pages.

Garcia-Valdez et al., "Is there a free lunch for cloud-based evolutionary algorithms?" in 2013 IEEE Congress on Evolutionary Computation, pp. 1255-1262 (2013). doi:10.1109/CEC.2013.6557709.

Goel et al., "Response surface approximation of Pareto optimal front in multi-objective optimization" Computer Methods in Applied Mechanics and Engineering, Jan. 1, 2007, vol. 196, Issues 4-6, pp. 879-893.

Guerreiro et al., "The Hypervolume Indicator: Computational Problems and Algorithms" ACM Computing Surveys, Jul. 2021, vol. 54, No. 6, Article 119:1-119:42, 42 pages.

Horoba et al., "Benefits and drawbacks for the use of epsilon-dominance in evolutionary multi-objective optimization" in Proceedings of the 10th annual conference on Genetic and evolutionary computation, pp. 641-648 (Association for Computing Machinery, 2008). doi:10.1145/1389095.1389224.

Ishibuchi et al., "Reference point specification in hypervolume calculation for fair comparison and efficient search" in Proceedings of the Genetic and Evolutionary Computation Conference, pp. 585-592 (Association for Computing Machinery, 2017). doi:10.1145/3071178.3071264, 8 pages.

Jiao et al., "Handling constrained many-objective optimization problems via problem transformation" IEEE Trans. Cybern. 51, 4834-4847 (2020), 20 pages.

Jin, "A Comprehensive Survey of Fitness Approximation in Evolutionary Computation" Soft Computing, 2005, 9(1), pp. 3-12, 13 pages.

Kazimipour et al. "A Review of Population Initialization Techniques for Evolutionary Algorithms" in 2014 IEEE Congress on Evolutionary Computation (CEC) pp. 2585-2592 (2014). doi:10.1109/CEC.2014.6900618, 9 pages.

Kollat et al., "A new epsilon-dominance hierarchical Bayesian optimization algorithm for large multiobjective monitoring network design problems" Advances in Water Resources, May 2008, vol. 31, Issue 5,pp. 828-845.

Kora et al., "Crossover Operators in Genetic Algorithms: A Review" International Journal of Computer Applications, Mar. 2017, vol. 162, No. 10, 4 pages.

Lim et al., "Crossover and Mutation Operators of Genetic Algorithms" International Journal of Machine Learning and Computing, Feb. 2017, vol. 7, No. 1, pp. 9-12.

Liu et al., "Handling Constrained Multi-Objective Optimization Problems via Bidirectional Coevolution" IEEE Trans. Cybern., Apr. 2021, 52, 10163-10176, 15 pages.

Meri et al., "Cloud-based evolutionary algorithms: An algorithmic study" Nat. Comput., 2013, 12, 135-147, 14 pages.

Ming et al., "Handling constrained many-objective optimization problems via determinantal point processes" Sep. 2023, Information Sciences vol. 643, 15 pages.

Nebro et al., "On the Effect of Applying a Steady-State Selection Scheme in the Multi-Objective Genetic Algorithm NSGA-II" in Nature-Inspired Algorithms for Optimisation (ed. Chiong, R.), pp. 435-456 (Springer, 2009). doi:10.1007/978-3-642-00267-0_16.

Reed et al., "Addressing uncertainty in multisector dynamics research" Zenodo, 2022, p. 3.

Saltelli et al., "Global sensitivity analysis: the primer" John Wiley, 2008, p. 1.

Salza et al., "Speed up genetic algorithms in the cloud using software containers" Future Generation Computer Systems, vol. 92, Mar. 2019, pp. 276-289.

Shang et al., "A Survey on the Hypervolume Indicator in Evolutionary Multiobjective Optimization" IEEE Trans. Evol. Comput., Feb. 2021, vol. 25, No. 1, pp. 1-20.

Shen et al., "A multistage evolutionary algorithm for many-objective optimization" Information Sciences, vol. 589, Apr. 2022, pp. 531-549.

Simic et al., "Optimizing the performance of optimization in the cloud environment—An intelligent auto-scaling approach" Future Generation Computer Systems, vol. 101, Dec. 2019, pp. 909-920.

Teijeiro et al. "A cloud-based enhanced differential evolution algorithm for parameter estimation problems in computational systems biology" Clust. Comput., 2020, 20, pp. 1937-1950.

Tsutsui et al., "Multi-parent Recombination with Simplex Crossover in Real Coded Genetic Algorithms" in Proceedings of the 1st Annual Conference on Genetic and Evolutionary Computation, 1999, vol. 1, pp. 657-664, 8 pages.

Yen et al., "A simplex genetic algorithm hybrid" in Proceedings of 1997 IEEE International Conference on Evolutionary Computation (ICEC '97), pp. 175-180 (1997). doi:10.1109/ICEC.1997.592291.

Zhan et al., "Cloudde: A Heterogeneous Differential Evolution Algorithm and Its Distributed Cloud Version" IEEE Trans. Parallel Distrib. Syst., Mar. 2017, vol. 28, No. 3, pp. 704-716.

Chipperfield et al., "Parallel Genetic Algorithms: A Survey", Jan. 1, 1996 (Jan. 1, 1996), pp. 1-31, Retrieved from the Internet: URL:www.researchgate.net/publication/313628568_Parallel_genetic_algorithms.

Dziurzanski et al., "Scalable Distributed Evolutionary Algorithm Orchestration Using Docker Containers", Journal of Computational

(56) References Cited

OTHER PUBLICATIONS

Science, Elsevier, Amsterdam, NL, vol. 40, Jan. 7, 2020 (Jan. 7, 2020), ISSN: 1877-7503, DOI: 10.1016/J.JOCS.2019.101069, 14 pages.
International Search Report and Written Opinion for International Application No. PCT/US2025/012525, mailed Apr. 16, 2025, 15 pages.
Lu et al., "Parallel and Distributed Architecture of Genetic Algorithm on Apache Hadoop and Spark", Applied Soft Computing Journal, Elsevier, Amsterdam, NL, vol. 95, Jun. 26, 2020 (Jun. 26, 2020), ISSN: 1568-4946, DOI: 10.1016/J.ASOC.2020.106497, 15 pages.

Operation 1: Optimization Algorithm

$t = 0$ $P_0 \rightarrow$ *Initialize using one of the three options*

$f(P_0) \rightarrow$ *Function evaluation*

$\varepsilon$, *dominance archive initialization*

*for each island repeat*

$t = t + 1$ $P_t \rightarrow$ *Parent selection*

$R_t = R(P_t) \rightarrow$ *Recombination*

$Q_t = M(R_t) \rightarrow$ *Mutation $\rightarrow$ create offspring*

$F(Q_t) \rightarrow$ *Function evaluation*

*update island archive $\rightarrow$ (Algorithm-2)*

*if t = main archive update interval*

*Update the main archive $\rightarrow$ (Algorithm-2)*

*Until termination criteria is met*

FIG. 6A

Operation 2: Archive Update

$X = Q_l[i] \rightarrow$ decision variables $Y = F(X) \rightarrow$ objective functions $C =$ predefined constraints $t_C =$ constraint application simulation count

*if* $t > t_C$ *AND* $X < C$ *then*

*For each archive member (A)*

*if* $Y <_\varepsilon a$ *then* $\rightarrow$ (1)

Remove *a* from the archive

*else if* $Y >_\varepsilon a$ *then* $\rightarrow$ (2)

Y does not get added to the archive

*End for*

*if not* (1) *or* (2)

add Y to the archive

*else:*

Y does not get added to the archive

1. General Information
Project Name: Seasonal Planning

Project Name,
Optimization Method: Island Based

Number of Decision Variables: 26

Number of decision variables
Number of Objectives: 4

Number of objective functions
Random Seed: 100

Random seed used in initialization
Maximum Number of Function Evaluation: 5000

Maximum number of Function Evaluation
Initialization Method: Random Initialization The initialization method used in the optimization engine

2. Decision and Objective Variables
2.1. Define Decision Variables

| Decision | Name | Similar Vars. | Min. | Max. |
|---|---|---|---|---|
| Decision 1: | b_radii_season_sv1 | 7 | 0.01 | 1 |
| Decision 2: | b_radii_season_sv2 | 7 | 0.01 | 1 |
| Decision 3: | b_radii_season_sv3 | 7 | 0.01 | 1 |
| Decision 4: | b_centers_season_sv1 | 7 | -1 | 1 |
| Decision 5: | b_centers_season_sv2 | 7 | -1 | 1 |
| Decision 6: | b_centers_season_sv3 | 7 | -1 | 1 |
| Decision 7: | b_radii_month_sv1 | 7 | 0.01 | 1 |
| Decision 8: | b_radii_month_sv2 | 7 | 0.01 | 1 |
| Decision 9: | b_radii_month_sv3 | 7 | 0.01 | 1 |
| Decision 10: | b_radii_month_sv4 | 7 | 0.01 | 1 |
| Decision 11: | b_centers_month_sv1 | 7 | -1 | 1 |
| Decision 12: | b_centers_month_sv2 | 7 | -1 | 1 |
| Decision 13: | b_centers_month_sv3 | 7 | -1 | 1 |
| Decision 14: | b_centers_month_sv4 | 7 | -1 | 1 |
| Decision 15: | weight_area_planted_all | 14 | 0.01 | 1 |
| Decision 16: | weight_deficit_all_crops | 21 | 0.01 | 1 |

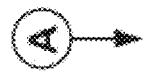
A →

| | | | | | |
|---|---|---|---|---|---|
| Decision 17: | weight_water_trade_sell | Similar Vars: | 7 | Min: | 0.01 | Max: | 1 |
| Decision 18: | weight_water_trade_buy | Similar Vars: | 7 | Min: | 0.01 | Max: | 1 |
| Decision 19: | weight_GW_recharge | Similar Vars: | 7 | Min: | 0.01 | Max: | 1 |
| Decision 20: | weight_GW_extract | Similar Vars: | 7 | Min: | 0.01 | Max: | 1 |
| Decision 24: | beta_water_trade_buy | Similar Vars: | 1 | Min: | -1 | Max: | 1 |
| Decision 25: | beta_GW_recharge | Similar Vars: | 1 | Min: | -1 | Max: | 1 |
| Decision 26: | beta_GW_extract | Similar Vars: | 1 | Min: | -1 | Max: | 1 |

2.2. Define Objective Variables

| | | | | | | |
|---|---|---|---|---|---|---|
| Objective 1: | Average_revenue | Lower Bound: 0 | Upper Bound: None | Epsilon: 10000 | Direction: Maximize |
| Objective 2: | GW_level | Lower Bound: 0 | Upper Bound: None | Epsilon: 10000 | Direction: Maximize |
| Objective 3: | Orchard_Reliability | Lower Bound: 0 | Upper Bound: 1 | Epsilon: 0.1 | Direction: Maximize |
| Objective 4: | Max_yield_reliability | Lower Bound: 0 | Upper Bound: 1 | Epsilon: 0.1 | Direction: Maximize |

Edit Project →

3. Update Optimization Function
○ Do you want to update the optimization function?

FIG. 14B

General Information

Number of Islands

10

Number of islands used in island-based method.

Optimization Velocity

Silver (memory = 512 MB)

Memory and CPU allocations to the optimization task.

Crossover Parameters eta Crossover SBX Parameter.

2.0 eta Crossover SBX Parameter.

Size of Diversity Pool

100

Size of diversity pool.

Number of Offspring per Island:

100

Number of Offspring generated per Island.

Stage 3 Fraction:

0.8

Fractions of NFEs that triggers stage 3 which focuses on exploitation.

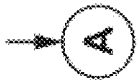

FIG. 15A

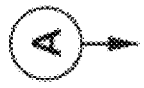

Diversity Pool Partitioning - Stage 2:

| Replaced by PF: | Replaced by Same Box: | Filled from Other islands: | Random Bad Members: | Main Archive Members: |
|---|---|---|---|---|
| 0.15 | 0.15 | 0.5 | 0.1 | 0.1 |
| Replaced by Pareto front members. | Replaced by same box members. | Injected from other islands. | Random bad members from the same pool. | Injected from the main archive. |

Diversity Pool Partitioning - Stage 3:

| Replaced by PF: | Replaced by Same Box: | Filled from Other islands: | Random Bad Members: | Main Archive: |
|---|---|---|---|---|
| 0.15 | 0.15 | 0.3 | 0.05 | 0.35 |
| Replaced by Pareto front members. | Replaced by same box members. | Injected from other islands. | Random bad members from the same pool. | Injected from the main archive. |

K Simplex:

4

Number of parents going into expanding simplex.

FIG. 15B

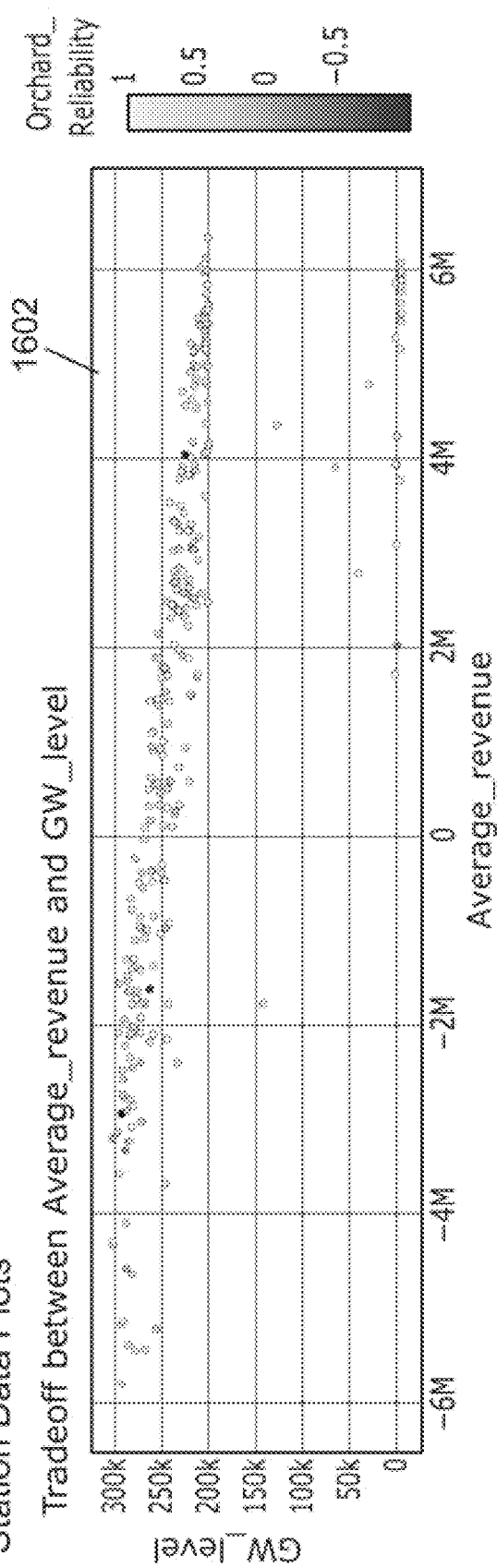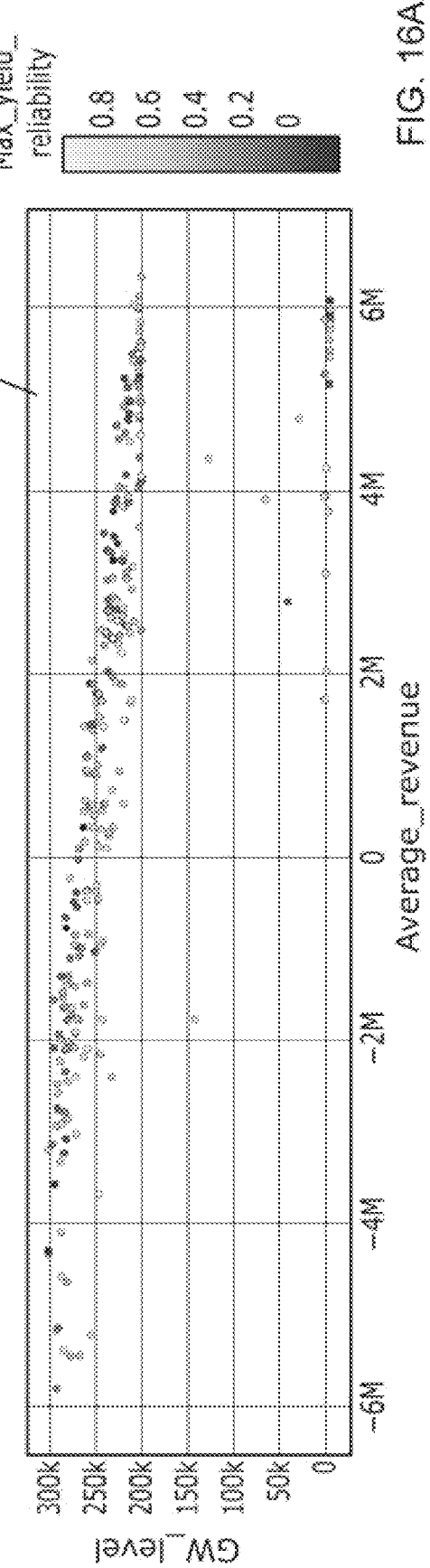
FIG. 16A

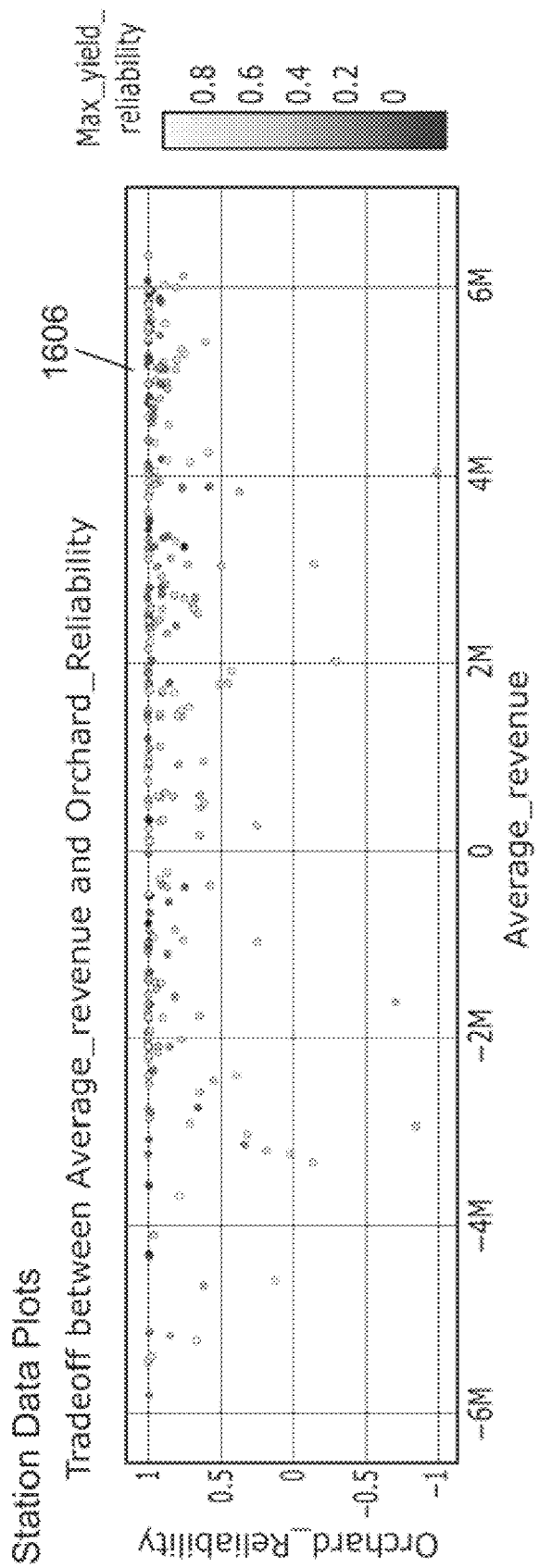
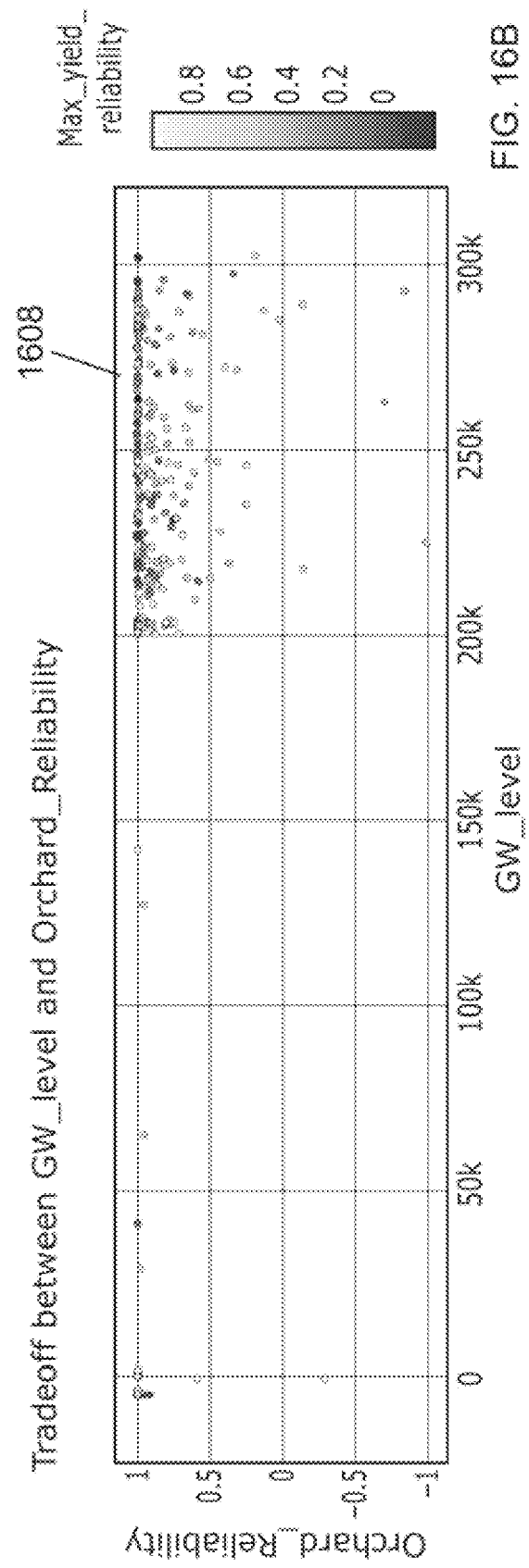
FIG. 16B

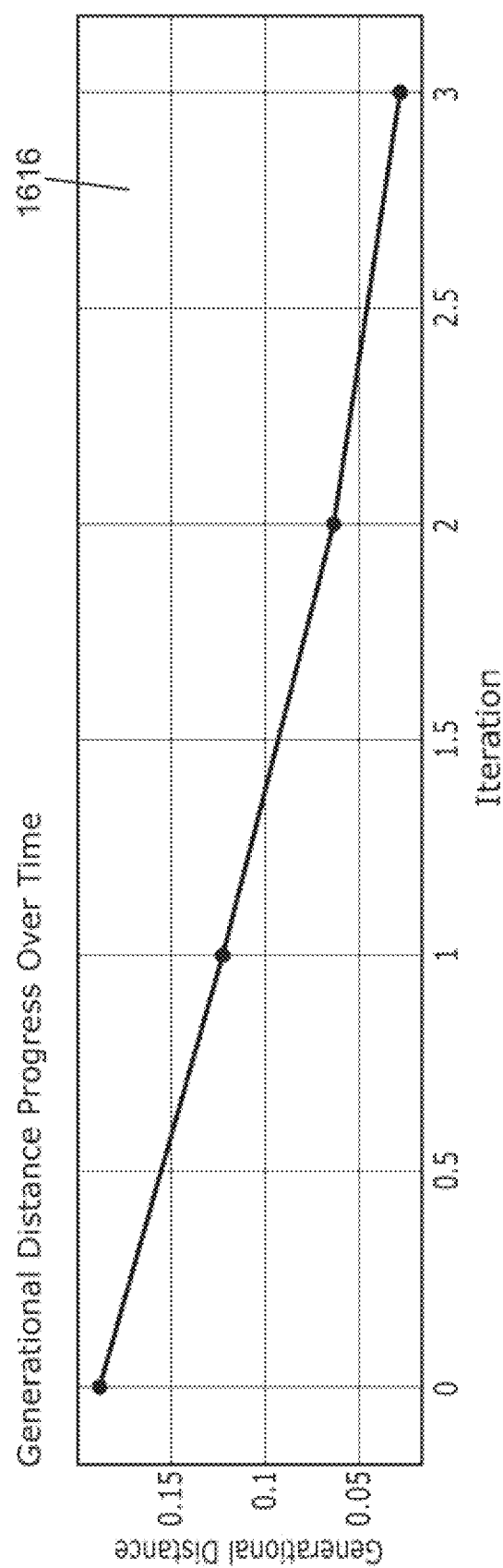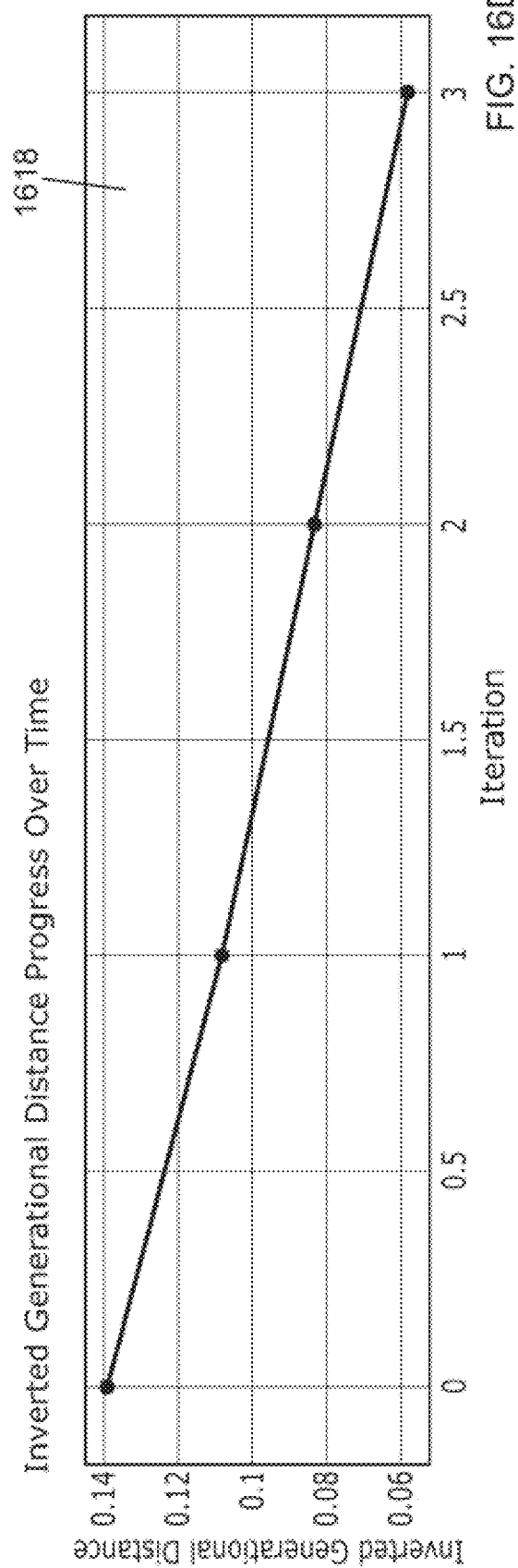
FIG. 16D

SYSTEMS AND METHODS FOR COMPUTING PROCESS MANAGEMENT AND COMPUTING RESOURCE ALLOCATION USING SERVERLESS CLOUD COMPUTATIONAL COMPUTING MODELS

CROSS REFERENCE TO RELATED APPLICATION

This application is a continuation of International Application No. PCT/US2025/012525, titled "Systems and Methods for Computing Process Management and Computing Resource Allocation Using Serverless Cloud Computational Computing Models," and filed Jan. 22, 2025, which claims priority to and the benefit of U.S. Provisional Patent Application No. 63/623,753, titled "Systems and Methods for Computing Process Management and Computing Resource Allocation Using Serverless Cloud Computational Computing Models", and filed Jan. 22, 2024, the contents of each of which are incorporated by reference herein in its entirety.

FIELD

One or more embodiments are related to systems and methods for computing process management and computing resource allocation using serverless cloud computational computing models.

BACKGROUND

Evolutionary machine learning models and/or evolutionary optimization models can be used to solve optimization problems. Some known techniques for implementing evolutionary machine learning models and/or evolutionary optimization models, however, can use computational resources that are not always easy to provide and maintain.

SUMMARY

In some embodiments, a method includes receiving, via a processor, a request from a user compute device to solve an optimization problem. In response to the request, a set of subpopulations (e.g., initial candidate solutions, archive, etc.) are identified, via the processor (e.g., either from predefined parametric ranges or from a pre-identified population, such as a main archive, included in the optimization problem). The pre-identified population can be divided into different subpopulations to generate the set of subpopulations. Each subpopulation from the set of subpopulations is associated, via the processor, with a unique sub-machine resource from a set of sub-machine resources at a set of remote compute devices. Each sub-machine resource from the set of sub-machine resources is caused, via the processor, to determine an associated set of candidates from an associated subpopulation from the set of subpopulations and for that sub-machine resource. Each sub-machine resource from the set of sub-machine resources is caused, via the processor, to select, recombine, and/or generate an associated set of offspring based on the associated set of candidates for that sub-machine resource. Each sub-machine resource from the set of sub-machine resources is caused, via the processor, to mutate the associated set of offspring to generate an associated set of mutated offspring for that sub-machine resource. Each sub-machine resource from the set of sub-machine resources is caused, via the processor, to generate an associated updated subpopulation by updating the associated subpopulation for that sub-machine resource based on an objective function associated with the associated mutated set of offspring for that sub-machine resource. An updated population is determined, via the processor, based on each associated updated subpopulation for each sub-machine resource from the set of sub-machine resources. Responsive to the updated population outperforming the identified population, a representation of a response is generated, via the processor, based on the updated population.

In some embodiments, an apparatus includes: a memory; and a processor operatively coupled to the memory, the processor configured to: identify a set of subpopulations from an identified population included in an optimization problem; associate each subpopulation from the set of subpopulations with a unique sub-machine resource from a set of sub-machine resources at a set of compute devices; cause each sub-machine resource from the set of sub-machine resources to determine an associated set of candidates from an associated subpopulation from the set of subpopulations and for that sub-machine resource; cause each sub-machine resource from the set of sub-machine resources to generate an associated set of offspring based on the associated set of candidates for that sub-machine resource; cause each sub-machine resource from the set of sub-machine resources to mutate the associated set of offspring to generate an associated set of mutated offspring for that sub-machine resource; cause each sub-machine resource from the set of sub-machine resources to generate an associated updated subpopulation by updating the associated subpopulation for that sub-machine resource based on an objective function associated with the associated mutated set of offspring for that sub-machine resource; determine an updated population based on each associated updated subpopulation for each sub-machine resource from the set of sub-machine resources; and generate a representation of a response based on the updated population.

In some embodiments, a non-transitory computer-readable storage medium storing instructions that, when executed by a computer system, performs operations including: receive a request from a user compute device to solve an optimization problem; identify, in response to the request, a set of subpopulations from an identified population included in the optimization problem; associate each subpopulation from the set of subpopulations with a unique sub-machine resource from a set of sub-machine resources at a set of remote compute devices; cause each sub-machine resource from the set of sub-machine resources to determine an associated set of candidates from an associated subpopulation from the set of subpopulations and for that sub-machine resource, each sub-machine resource from the set of sub-machine resources generating an associated set of offspring based on the associated set of candidates for that sub-machine resource, each sub-machine resource from the set of sub-machine resources mutating the associated set of offspring to generate an associated set of mutated offspring for that sub-machine resource, each sub-machine resource from the set of sub-machine resources generating an associated updated subpopulation by updating the associated subpopulation for that sub-machine resource based on an objective function associated with the associated mutated set of offspring for that sub-machine resource; determine an updated population based on each associated updated subpopulation for each sub-machine resource from the set of sub-machine resources; and responsive to the updated population outperforming the identified population, generate a representation of a response based on the updated population.

BRIEF DESCRIPTION OF THE DRAWINGS

FIGS. 6A-6B illustrates the overall serverless procedure used during the evolutionary search to identify the most optimized solutions.

FIGS. 14A and 14B illustrate an example of defining variables for a project, according to an embodiment.

FIGS. 15A to 15D illustrate an example of providing additional parameters for a project, according to an embodiment.

FIGS. 16A to 16D illustrate sample results of performing the optimization problem defined in part by the parameters illustrated in FIGS. 14A, 14B, 15A, 15B, 15C, and 15D, according to an embodiment.

DETAILED DESCRIPTION

Figure 1:
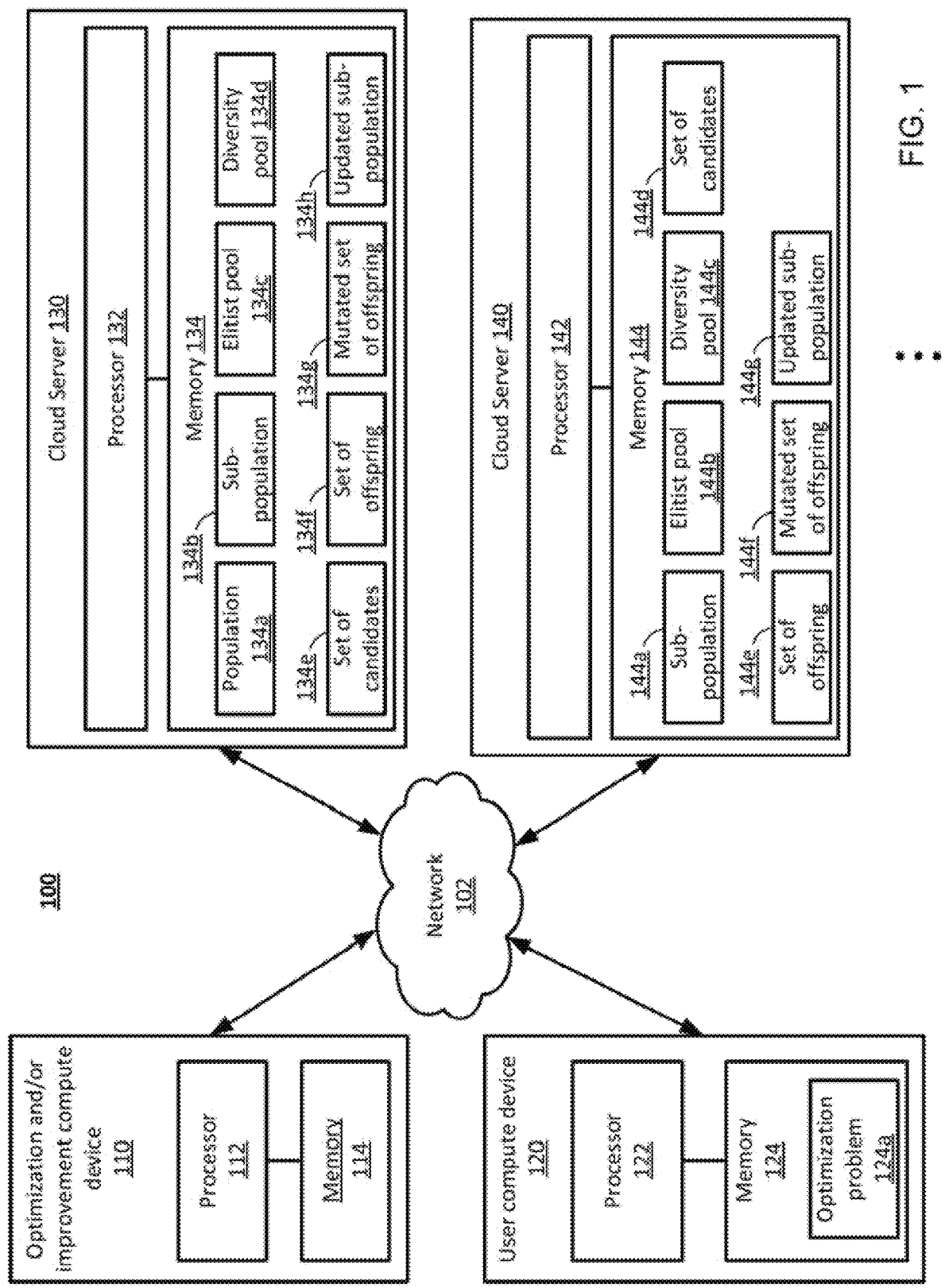
FIG. 1 includes a block diagram of a system for using a serverless approach to solve an optimization problem, according to an embodiment.

Optimization and/or improvement manifests itself in many aspects, from wholesale inventory management, artificial intelligence, investment analysis, and portfolio management to industrial product design and development. In addition, optimization and/or improvement can be used for infrastructural investments and governmental planning and management strategies. While some optimization and/or improvement options are available for easy problems and problems with straightforward differentiable mathematical representations, searching a multi-dimensional space for an optimized and/or improved solution is not always a trivial task, especially when there is more than one objective. When it comes to many objective and complex non-tractable problems, evolutionary machine learning models and/or evolutionary optimization models can offer a better chance of finding high-quality solutions.

Evolutionary machine learning models and/or evolutionary optimization models, however, can use computational resources that are not always easy to provide and maintain. This hurdle has prevented, at least in part, the widespread use of evolutionary computations in many practical situations. Accordingly, some implementations described herein are related to addressing the aforementioned deficiencies by using scalable serverless cloud resources. Many-Objective Evolutionary Algorithms (MOEAs) have previously been conducted on computer cluster networks (High-Performance Computing systems, HPCs), which use significant initial capital investments, frequent maintenance, and operational expenses. Cloud resources have also been used as an alternative to computer clusters for evolutionary optimizations and/or improvements. However, these cloud-based virtual computational resources also use resource allocation and heavy cloud engineering expertise to function and optimize their uptime costs. These overhead costs have prevented the widespread adoption of this technology by various sectors that can benefit from this technology.

Some implementations described herein use cloud-based serverless services to address this cloud resource provisioning problem. At least some intended implementations use powerful cloud-based resources that do not need initial investments and can be maintained by cloud service providers. In addition, in some implementations, the user can be charged on a pay-as-you-go basis and does not have to pay for their downtime, reducing costs for the user. Also, unlike HPCs and manual cloud service provisioning systems, in some implementations, the user can easily specify the exact quality and quantity of computational resources for each individual project, which can be automatically (e.g., without human intervention) terminated immediately (e.g., at machine speed) after each function evaluation during the evolutionary search. The cloud-based serverless platform also allows an optimization and/or improvement machine learning models to leverage the other benefits of cloud systems, such as fully integrated and highly secure data storage resources.

Figure 4:
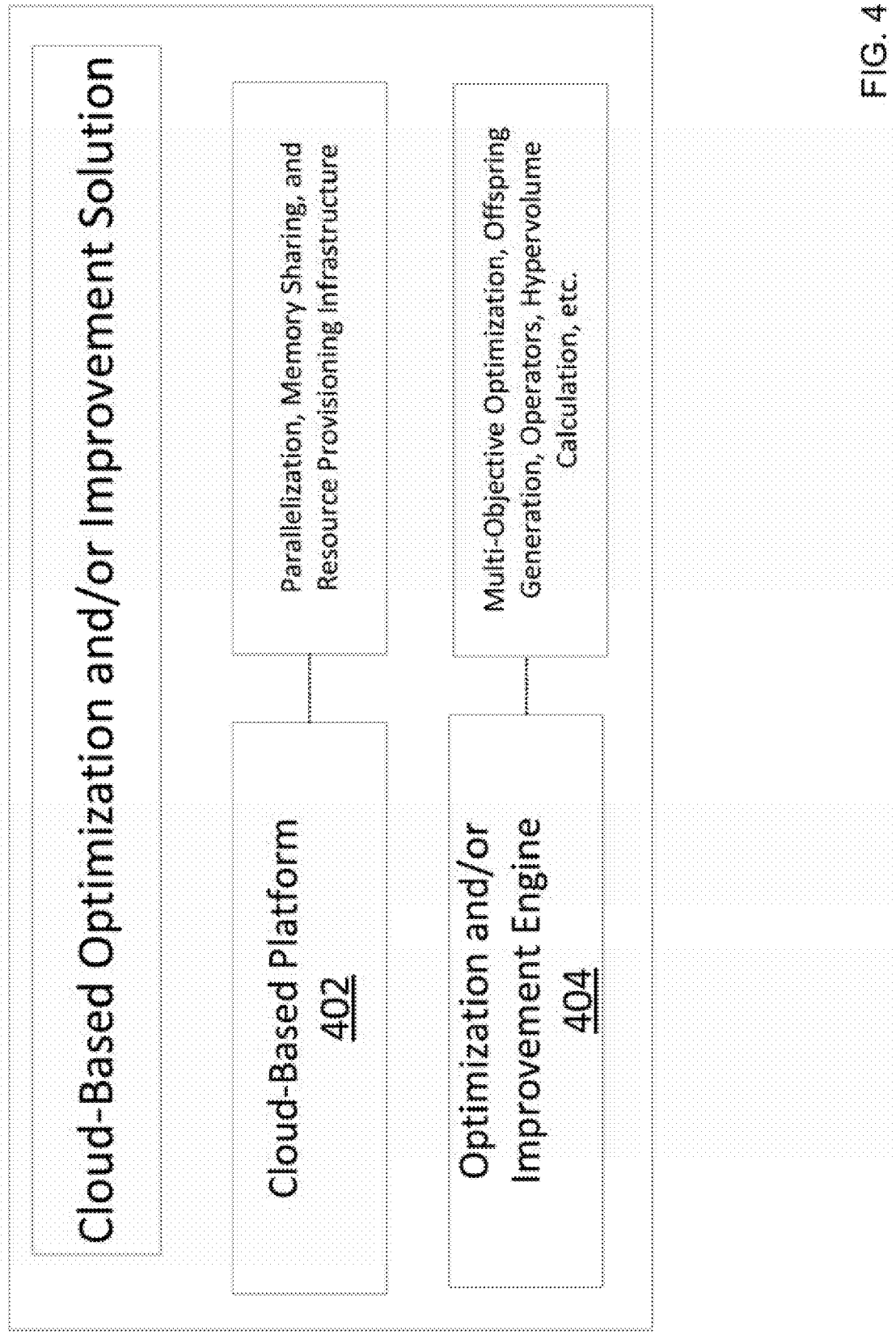
FIG. 4 illustrates an optimization and/or improvement platform that includes a cloud-based platform and an optimization and/or improvement engine, according to an embodiment.

In some implementations, as shown in FIG. 4, a cloud-based optimization and/or improvement solution can include two components: 1) a cloud-based platform 402, and 2) an optimization and/or improvement engine 404. The cloud-based platform 402 can perform parallelization, perform memory sharing, enable/provide a resource provisioning infrastructure, and/or the like (see, e.g., FIG. 5). The optimization and/or improvement engine 404 can enable/provide multi-objective optimization and/or improvement, offspring generation, operators, hypervolume calculation, and/or the like (see, e.g., operation 1 at FIG. 6A and operation 2 at 6B). These two components can be implemented to work together to achieve a high level of scalability, search quality, and flexibility to meet the users' specific demands.

Figure 5:
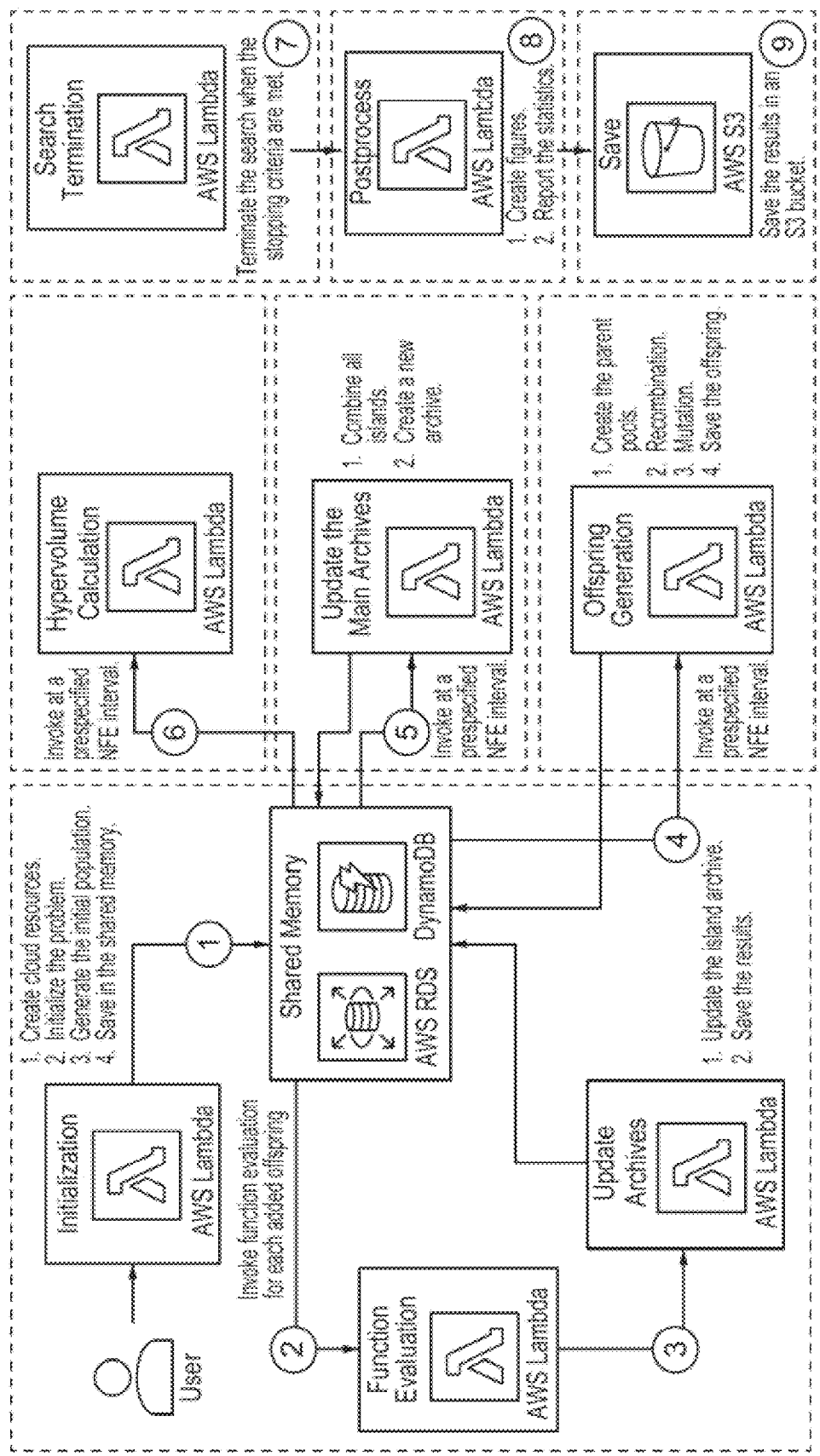
FIG. 5 illustrates using serverless functionality to execute an evolutionary machine learning model and/or evolutionary optimization models, according to an embodiment.

Some implementations, for example, as shown in FIG. 5, are related to using previously found solutions and comparing the new solutions with the previously found solutions; based on that comparison, a determination is made as to which old solutions from the previously found solutions survive (e.g., remain in the archive) and which solutions from the new solutions can replace previously found solutions and/or be added to the archive and get carried over to the next generation(s). Some implementations include:

Operation 1—The diversity and elitist pools for each island are constructed.

Operation 2—New offspring (solutions) are created through the recombination (crossover) approaches (e.g., sbx, simplex, uniform, etc.).

Operation 3—Mutation is applied on the newly formed recombined children.

(Operations 1-3 are part of the offspring generation process.)

Operation 4—Each offspring is sent to a serverless compute unit and model simulation (function evaluations) happen asynchronously at the serverless compute unit.

Operation 5—The solutions are compared with predefined constraints, if the count of function evaluations (NFE) is more than the constraint application threshold (see, e.g., FIG. 6B).

Operation 6—Island archive update: Each new offspring is individually compared with current archive members of the islands, and one of these three scenarios happens subsequently for each new offspring:

At least one of the archive members gets dominated and replaced by the new solution (the new offspring);

No archive member gets dominated by the new solution/offspring, and the new solution/offspring gets discarded; and Neither a nor b is true, which means that the offspring is a new, non-dominated solution in the archive and will be added to the archive without archive member removal.

Operations 4, 5, and 6 can happen asynchronously in separate distributed serverless compute nodes/units.

Operation 7—At predefined intervals, main archive updates happen, where island solutions are combined and compared with the main archive. The process shown in FIG. 6B (operation 6) is followed to identify the solutions that will be added to the main archive.

Operation 8—perform postprocessing on the generated solution, for example, create figures (e.g., bar charts, pie charts, plots, curves, etc.), and/or reporting the data.

Operation 9—Save the results, for example, on the cloud (e.g., AWS).

Implementations shown in FIGS. 6A-6B can also create surrogate models and perform prefiltering to remove inferior solutions and objectives that are outside of the range.

Referring now to the figures, FIG. 1 includes a block diagram of a system 100 for using a serverless approach to solve an optimization problem, according to an embodiment. System 100 includes optimization and/or improvement compute device 110, user compute device 120, cloud server 130, and cloud server 140, each communicatively coupled to one another via network 102.

In some embodiments, the network 102 can be any suitable communications network for transferring data, operating over public and/or private networks. For example, the network 102 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 102 can be a wireless network such as, for example, a Wi-Fi or wireless local area network ("WLAN"), a wireless wide area network ("WWAN"), and/or a cellular network. In other instances, the network 102 can be a wired network such as, for example, an Ethernet network, a digital subscription line ("DSL") network, a broadband network, and/or a fiber-optic network. In some instances, the network can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 102 can be encrypted or unencrypted. In some instances, the communication network 102 can include multiple networks or subnetworks operatively coupled to one another by, for example, network bridges, routers, switches, gateways and/or the like (not shown).

Optimization and/or improvement compute device 110 includes processor 112 operatively coupled to memory 114 (e.g., via a system bus). Optimization and/or improvement compute device 110 can be any type of compute device, such as a server, desktop, laptop, tablet, smartphone, and/or the like.

User compute device 120 includes processor 122 operatively coupled to memory 124 (e.g., via a system bus). User compute device 120 can be any type of compute device, such as a server, desktop, laptop, tablet, smartphone, and/or the like.

Cloud servers 130 and 140 can include processors 132 and 142, respectively. Cloud servers 130 and 140 can also include memories 134 and 144, respectively. Processors 132 and 142 can be operatively coupled to memories 134 and 144, respectively (e.g., via a system bus). Although FIG. 1 shows two cloud servers, in other implementations, any number of cloud servers can be used (e.g., three, 10, 25, 50, 100, 500, etc., inclusive of all ranges and values therebetween). Additionally, in other implementations, cloud servers 130 and 140 can be any other type of compute device, such as a desktop, laptop, tablet, smartphone, and/or the like.

Each of the processors 112, 122, 132, 142 can be, for example, a hardware-based integrated circuit (IC) or any other suitable processing device configured to run or execute a set of instructions or a set of codes. For example, each of the processors 112, 122, 132, 142 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. Each of the processors 112, 122, 132, 142 can be operatively coupled to respective memories 114, 124, 134, 144 through a system bus (for example, address bus, data bus, and/or control bus).

The memories 114, 124, 134, 144 can store electronic information. The term memory may refer to various types of processor-readable media such as, for example, random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory 124 of user compute device 120 can include (e.g., store) a representation of optimization problem 124a. Optimization problem 124a can represent any type of optimization and/or improvement problem, such as, for example, a wholesale inventory management optimization and/or improvement problem, artificial intelligence optimization and/or improvement problem, investment analysis optimization and/or improvement problem, portfolio management optimization and/or improvement problem, industrial product design and development optimization and/or improvement problem, and/or the like. In some implementations, an optimization and/or improvement problem refers to the problem of finding an optimal and/or an improved solution(s) from feasible solutions and/or a given population of solutions. In some implementations, finding a solution that is "optimal" and/or "improved" does not mean that the solution is optimal in absolute terms, but rather optimal and/or improved with respect to a given quality metric, which may be in contrast with other possible metrics. As a result, an "optimal" and/or "improved" solution can be optimal and/or improved in one application or for one audience but not in a different application or for a different audience. Accordingly, in some implementations, "optimal" or "optimization" herein is different than "super optimization."

In some implementations, user compute device 120 sends an electronic signal to optimization and/or improvement compute device 110 including a representation of optimization problem 124a. In some implementations, optimization problem 124a includes indications of various parameters and/or details that can be used to define, generate, constrain, and/or solve optimization problem 124a, as additionally discussed with respect to FIGS. 14A, 14B, 15A, 15B, 15C, and 15D. In response to optimization and/or improvement compute device 110 receiving the electronic signal including the representation of optimization problem 124a, optimization and/or improvement compute device 110 can facilitate, via an optimization and/or improvement platform at optimization and/or improvement compute device 110, a serverless computing solution by facilitating execution of an evolutionary algorithm and/or machine learning model to generate a solution to optimization problem 124a. For example, optimization and/or improvement compute device 110 can identify machine/computational resources to execute an evolutionary algorithm and/or machine learning model (i.e., genetic algorithm) (e.g., MOEA).

For example, optimization and/or improvement compute device 110 can determine the machine resources to be used for generating the solution to optimization problem 124a. Deciding the machine resources can include determining which compute devices are used, which processors and/or memories of which compute devices are used, the size/space of memory to be used at each compute device, and/or the like. In some implementations, optimization and/or improvement compute device 110 can determine the machine resources in response to receiving a representation of optimization problem 124a automatically without intervention by a user. In some implementations, optimization and/or improvement compute device 110 can determine the machine resources in response to receiving a representation of optimization problem 124a based on input provided by a user, such as, for example, a serverless computing service provider to use, a maximum or minimum memory size, a maximum or minimum number of serverless compute devices to use, a type of processor to use or not use, and/or the like. In some implementations, optimization and/or improvement compute device 110 can determine the machine resources to be used for generating the solution to optimization problem 124a prior to receiving a representation of optimization problem 124a. In some implementations, optimization and/or improvement compute device 110 can determine the machine resources to be used for generating the solution to optimization problem 124a after receiving a representation of optimization problem 124a.

In some implementations, a user can provide (e.g., via a user interface at user compute device 120) an indication of the memory level and/or CPU level they want to allocate to their optimization problem, which can implemented as, for example, a hyperparameter. Therefore, users don't have to restructure and redefine their computational stacks to change the speed of their optimization procedures. In some implementations, different levels of serverless cloud structures are predefined and/or created (e.g., 512 MB, 1024 MB, 1536 MB, and/or the like). When a user selects their preferred memory and/or CPU level (e.g., at user compute device 120), a representation of that preferred memory and/or CPU level is received at optimization and/or improvement compute device 100 such that optimization and/or improvement compute device 100 sends a representation of the preferred memory level, preferred CPU level, and/or the optimization task to an associated serverless resource (e.g., cloud server 130, 140, and/or the like). Additionally or alternatively, a representation of the preferred memory and/or CPU level can be sent from user compute device 120 to a cloud server (e.g., cloud server 130, 140, and/or the like) without sending a representation of the preferred memory and/or CPU level to optimization and/or improvement compute device 100. Examples of memory levels that a user can select include 512 MB, 1024 MB, 1536 MB, and/or the like. In some implementations, a compute device (e.g., AWS) automatically adjusts the CPU power and/or level (e.g., of cloud server 130, 140, and/or the like) based on (e.g., in proportion to) the selected memory level. Once a representation of the preferred memory and/or CPU level is received, a remedial action can occur if an amount of memory and/or CPU being used (e.g., at cloud server 130, 140, and/or the like) reaches, gets within a predetermined range of, and/or exceeds the preferred memory and/or CPU level (e.g., generate an alert as a compute device or server illustrated in FIG. 1, request permission to use additional memory and/or CPU(s) from a user via user compute device 120, pause processing the optimization problem at cloud server 130, 140, and/or the like, automatically use additional memory and/or CPU(s), etc.).

For example, in the example of FIG. 1, optimization and/or improvement compute device 110 can receive a representation of optimization problem 124a and determine the machine resources to be used for generating the solution to optimization problem 124a, for example, processors 132 and 142 and memories 134 and 144 of cloud servers 130 and 140. Note that FIG. 1 is just one example, and in other examples, optimization and/or improvement compute device 110 can determine different machine resources to be used for different optimization problems (e.g., using different cloud servers, using a different processor included in cloud server 130 and/or 140 but not shown in FIG. 1, using a different memory included in cloud server 130 and/or 140 but not shown in FIG. 1, etc.).

In one example, cloud servers 130 and 140 can be used to solve optimization problem 124a. Memory 134 of the cloud server 130 can include a representation of population 134a (sometimes referred herein to as "main archive"). Population 134a can represent an initial population of candidates or solutions that is to be used for solving optimization problem 124a. Although FIG. 1 shows population 134a at memory 134, in some implementations, population 134a can be stored on any compute device. For example, though not explicitly shown in FIG. 1, in some implementations, cloud servers 130 and 140 can share a common memory that stores population 134a. Additionally or alternatively, in some implementations, the common memory can store query languages and/or a relational database that can be used for optimization and/or improvement.

Population 134a can be generated using any technique, such as random initialization by selecting candidates randomly, Latin-hypercube sampling (LHS), initialization from a known solution (e.g., provided by a user based on a previously found solution, known benchmark, best guess, and/or the like), and/or the like. Population 134a can also be generated based on a random seed. In some implementations, a random seed can be set for each serverless function execution and the random seed of a function evaluation can be set to be the count of function evaluations (NFEs) at the time of the serverless function invocation to avoid randomization biases and reach a higher level of true randomness.

A set of subpopulations (each subpopulation sometimes referred to herein as "archive") can be identified (e.g., partitioned) based on population 134a, and different sub-machine resources can be used to process different subpopulations. For example, as shown in FIG. 1, sub-populations 134b and 144a can be partitioned from population 134a, cloud server 130 can be used to store and process sub-population 134b, and cloud server 140 can be used to store and process subpopulation 144b. Population 134a can be partitioned in any way to generate subpopulations, such as partitioning population 134a equally among sub-machine resources, partitioning population 134a different among different sub-machine resources, or a combination thereof. In some implementations, population 134a can be partitioned to generate subpopulations based on, for example, input provided by a user via user compute device 120, a characteristic(s) associated with the sub-machine resources (e.g., memory capacity, processing power, and/or the like). In some implementations, the set of subpopulations can be identified using a steady-state algorithm.

Each subpopulation can be used to generate an updated subpopulation (e.g., based on parameters/constraints from optimization problem 124a). Generating an updated subpopulation can include, for example, generating elitist and diversity pools for each subpopulation based on that subpopulation, identifying candidates based on the elitist and diversity pools, conducting recombination and generating offspring based on the candidates, mutating at least some of the offspring after conducting recombination, and generating an updated subpopulation based on the mutated offspring. The updated subpopulations can be used (e.g., combined, selectively chosen from, etc.) to generate an updated population. The updated subpopulation can then be communicated to a serverless compute device (e.g., cloud server 130, 140, and/or the like) for the function evaluation process. In some implementations, if the model outputs (e.g., objectives) calculated by function evaluation at the serverless compute device satisfy a predetermined or previously determined set of criteria and/or outperform current archive members, the updated population can represent (and/or be used to generate) a viable solution to optimization problem 124a. The viable solution can be added to the archive. The optimization procedure can repeat the same steps (e.g., generating subpopulations, generating elitist and diversity pools, identifying candidates, recombination and generating offspring, mutating offspring, comparison with the current subpopulations, generating updated subpopulations, and/or function evaluation) until the predefined termination criteria are reached.

For example, cloud server 130 can generate elitist pool 134c and diversity pool 134d based on sub-population 134b. Similarly, cloud server 140 can generate elitist pool 144b and diversity pool 144c based on subpopulation 144a. In some implementations, elitist pool 134c is generated by randomly selecting a predetermined number of candidates (e.g., parents) from sub-population 134b, and elitist pool 144b is generated by randomly selecting the same predetermined number of candidates (or a different number of candidates in other implementations) from subpopulation 144a. In some implementations, diversity pool 134d includes at least five candidates: (1) a Pareto front candidate from a subpopulation different than sub-population 134b; (2) a candidate in the same subpopulation as the Pareto front candidate from (1) but that was dominated by the Pareto front candidate from (1); (3) a candidate that was previously part of the Pareto front but was replaced by a different candidate and no longer part of the Pareto front; (4) a lower quality candidate that has never been selected to be part of the Pareto front; and (5) a higher quality candidate from sub-population 134b (i.e., archive). Similarly, in some implementations, diversity pool 144c can belong to and/or include members from one or more of the following five categories: (1) a Pareto front candidate from a subpopulation different than subpopulation 144a; (2) a candidate in the same subpopulation as the Pareto front candidate from (1) but that was dominated by the Pareto front candidate from (1); (3) a candidate that was previously part of the Pareto front but was replaced by a different candidate and no longer part of the Pareto front; (4) a lower quality candidate that has never been selected to be part of the Pareto front; and/or (5) a higher quality candidate from sub-population 134b. In some implementations, the ratio of candidates from the five different categories in a given diversity pool can be defined in optimization problem 124a (e.g., as illustrated in FIG. 15B). As described herein, the term "Pareto front" refers to a set of optimal and/or improved solutions in the space of objective functions in multi-objective optimization problems (MOOPs), which are non-dominated to each other but are superior to all and/or at least a subset of solutions in the search space. In some implementations, pareto front members represent an improved and/or the most optimized tradeoffs among different objectives within a set of known solutions (e.g., all known solutions). Improving one of the objectives on the Pareto front can result in the deterioration of at least one other objective.

Cloud server 130 can generate set of candidates 134e based on elitist pool 134c and diversity pool 134d. Similarly, cloud server 140 can generate set of candidates 144d based on elitist pool 144b and diversity pool 144c. As will be discussed below, a recombination technique can be used to generate sets of offspring 134f and 144e. Therefore, in some implementations, the technique used to select candidates from elitist pools 134c, 144b and diversity pools 134d, 144c to generate set of candidates 134e, 144d can depend on the recombination technique that is used. In some implementations, set of candidates 134e includes at least one candidate from elitist pool 134c and at least one candidate from diversity pool 134d. In some implementations, set of candidates 144d includes at least one candidate from elitist pool 144b and at least one candidate from diversity pool 144c.

Figure 15C:
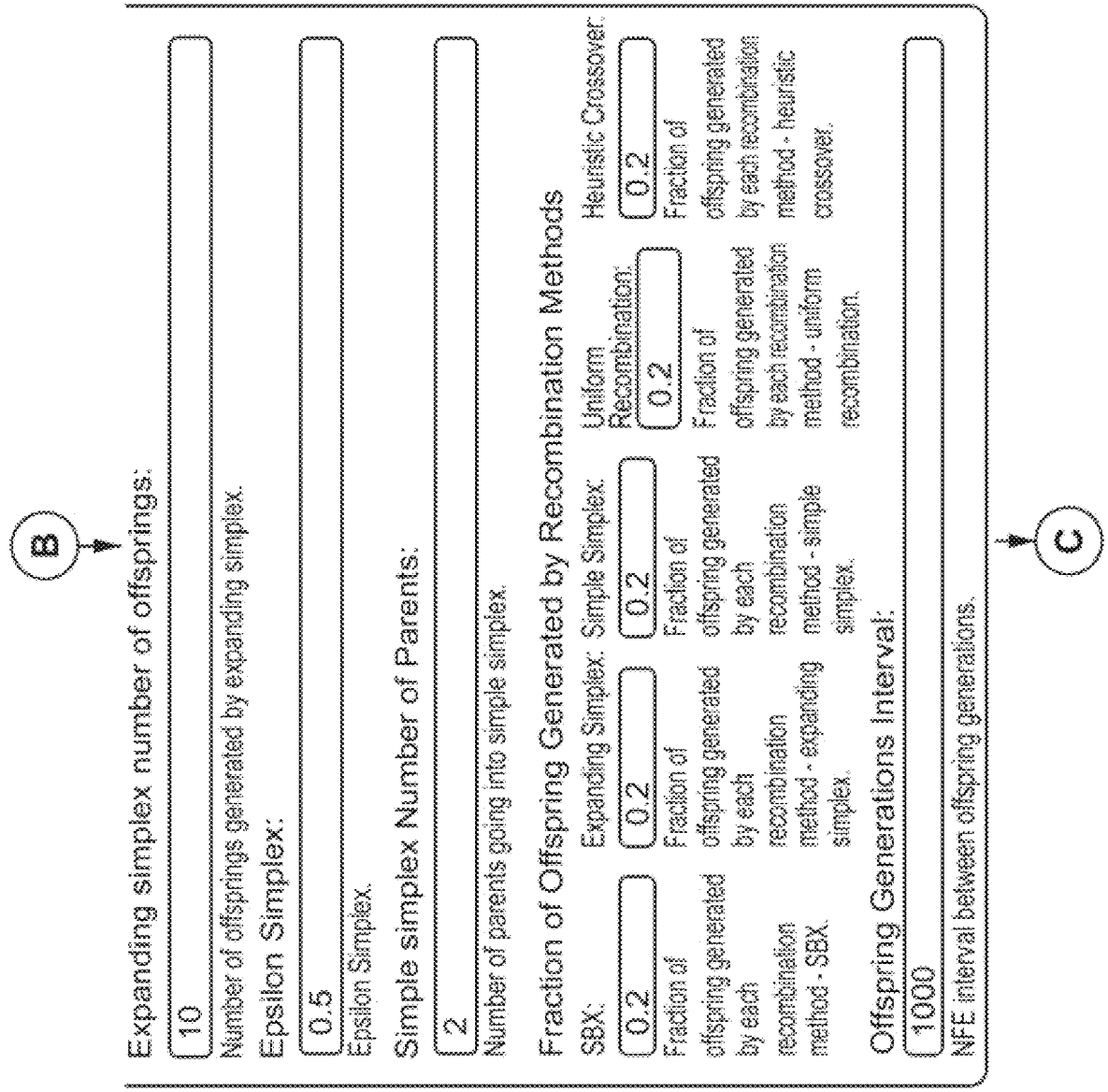

Cloud server 130 can generate set of offspring 134f based on set of candidates 134e. Similarly, cloud server 140 can generate set of offspring 144e based on set of candidates 144d. In some implementations, a recombination method can be used to generate sets of offspring 134f, 144e based on sets of candidates 134e, 144d. The recombination method can use, for example, multiple different real-value crossover methods (e.g., simulated binary crossover, expanding simplex, simple simplex, uniform crossover, heuristic crossover, etc.). In some implementations, the fraction of offspring generated using different recombination methods can be customized/manually defined (e.g., by a user via user compute device 120; as illustrated in FIG. 15C). Different real-value crossover methods can contribute equally and/or differently from other real-value crossover methods (e.g., based on input provided by the user at user compute device 120). For example, if five different real-value crossover methods are used, in some implementations, each real-value crossover method can contribute 20%. As another example, if five different real-value crossover methods are used, four methods can each contribute 15% and one method can contribute 40%.

Cloud server 130 can generate mutated set of offspring 134g based on set of offspring 134f. Similarly, cloud server 140 can generate mutated set of offspring 144f based on set of offspring 144e. In some implementations, each offspring from sets of offspring 134f and 144e have an equal chance of being selected for mutation. In some implementations, uniform mutation is used to generate to generate mutated sets of offspring 134g and 144f.

Cloud servers 130 and 140 can execute the optimization function and/or model provided by the user compute server 120. The newly recombined and/or mutated offspring can be the inputs for the function evaluation. The outputs of the function evaluation can be the objective functions that determine the performance of the newly found solutions, as, for example, illustrated in FIGS. 6A (for function evaluation) and 6B (for archive updating).

Cloud server 130 can generate updated subpopulation 134h based on the objective functions corresponding to mutated set of offspring 134g. Similarly, cloud server 140 can generate updated subpopulation 144g based on mutated set of offspring 144f. Generating updated subpopulations 134h, 144g can include comparing new candidates (e.g., from mutated sets of offspring 134g, 144f) with the previously found candidates (e.g., previously found most optimized solutions, previously found improved solutions, etc.) and/or removing current candidates from sub-populations 134b, 144a if they are outperformed by the new candidates. Updated subpopulations 134h and 144g can be combined and compared with the current population 134a (main archive members) to generate an updated population that can be used as main archive. The updated population can be compared to a predetermined set of criteria, such as a size of the updated population being less than a predetermined threshold, a size of the updated population being greater than a predetermined threshold, and/or the like.

In some implementations, the updated subpopulations 134h and 144g updating process (e.g., island-specific archive updates) can follow the procedure outlined in operation 2 of FIG. 6B. Each new offspring can be compared against the current subpopulation members, and if the new offspring outperforms at least one of the current members, the new offspring can replace those current members being outperformed.

If a member of the updated population satisfies the predetermined set of criteria (e.g., outperforms at least one of the current archive members), the members can represent and/or can be used to generate a solution/answer to optimization problem 124a, and will be added to the archive (see, e.g., FIG. 6B). In such a case, and after the search for new solutions is terminated, in some implementations, a representation of the updated population can be sent to user compute device 120 (e.g., to output a representation of the updated population to a user).

A memory resource (e.g., memory 134, 144, etc.) can host an archive that represents the better- and/or best-performing solutions found across some or all subpopulations. This shared memory is sometimes referred to as the main archive, and can store the main archive. The archive update process can be triggered at a user-predefined interval where all sub-populations or updated sub-populations are combined and compared with solutions in the main archive member. In some implementations, the main archive update process can follow the procedure demonstrated in FIG. 6B. At the end of the optimization, when the termination criteria are reached, the main archive solutions can be updated again (e.g., one last time), and the results are reported back to the user via user compute device 120.

If the current state of the optimization procedure does not satisfy a predetermined set of termination criteria, the same process described above to go from population 134a to the updated population can be repeated using the updated population in place of population 134a until the optimization process satisfies the predetermined set of termination criteria. That is, the updated population can be used to generate new subpopulations, elitist pools, diversity pools, sets of candidates, sets of offspring, mutated sets of offspring, model simulation/function evaluation, and updated subpopulations (e.g., archive updates). In some implementations, the population can be used to generate the subpopulations, elitist pools, diversity pools, sets of candidates, sets of offspring, mutated sets of offspring, and updated subpopulations using a first set of objective function constraints, and the updated population can be used to generate new subpopulations, elitist pools, diversity pools, sets of candidates, sets of offspring, mutated sets of offspring, and updated subpopulations using a second, different set of objective function constraints. Constraints can include, for example, the minimum and maximum possible range of the objectives, decision variable limitations and/or desires associated with optimization problem 124a, and/or the like. This can be repeated under both sets of initial and final constraints to narrow down the island-specific archive selected subpopulations and yield a subpopulation or set of subpopulations that represent a satisfactory (e.g., optimized and/or improved) solution to the initial problem. In one example, constraints earlier in the optimization and/or improvement process for optimization problem 124 can be ignored (e.g., based on a threshold for ignoring a given constraint based on a user-defined percentage of total simulations) so that elitist pool 134c, diversity pool 134d, elitist pool 144b, diversity pool 144c, and/or the like can be more comprehensively explored. Thereafter, constraints (the same constraints and/or different constraints) can be applied for a more refined search of elitist pool 134c, diversity pool 134d, elitist pool 144b, diversity pool 144c, and/or the like that takes into account limitations and/or desires associated with optimization problem 124a. At the time of termination, the processor 112 of the optimization and/or improved compute device 120 may generate an electronic signal that is indicative of the satisfactory solution. In some implementations, the signal may be communicated to the user compute device 120, which may cause the user compute device 120 to output (e.g., display) a representation of the satisfactory solutions.

In some implementations, a hypervolume can be generated based on population 134a (main archive) but not sub-populations 134b, 144a (island-specific archives). In some implementations, diversity pools 134d, 144d are not generated based on the hypervolume. In some implementations, diversity pools 134d, 144d are generated based on the hypervolume. Additional details related to the hypervolume are discussed below.

FIG. 6A illustrates an operation or process for performing optimization and/or improvement, according to an embodiment. In some implementations, as shown in FIG. 6A, for each island (e.g., memory of each cloud server, such as memory 134, 144, etc.) an iterative process is repeated (until a termination criteria are met) that includes selecting parents, performing recombination based on the parents, performing mutation and creating offspring based on the recombination, performing function evaluation based on the offspring, and updating island archives based on operation 2 illustrated in FIG. 6B. For each iteration and/or time where the main archive is to be update, the main archive can be updated based on operation 2.

FIG. 6B illustrates an operation or process for updating an archive and/or main archive, according to an embodiment. If a time is less than a constraint application simulation count and the number of decision variables is less than the number of predefined constraints, for each archive member, that member is removed from the archive if, for example: (1) the objective function is less than the dominance archive initialization for that member, and the objective function is not added to the archive; and/or if (2) the objective function is greater than is less than the dominance archive initialization for that member. If neither (1) nor (2) are true, the objective functions can be added to the archive; otherwise, the objective function may not be added to the archive.

Figure 2:
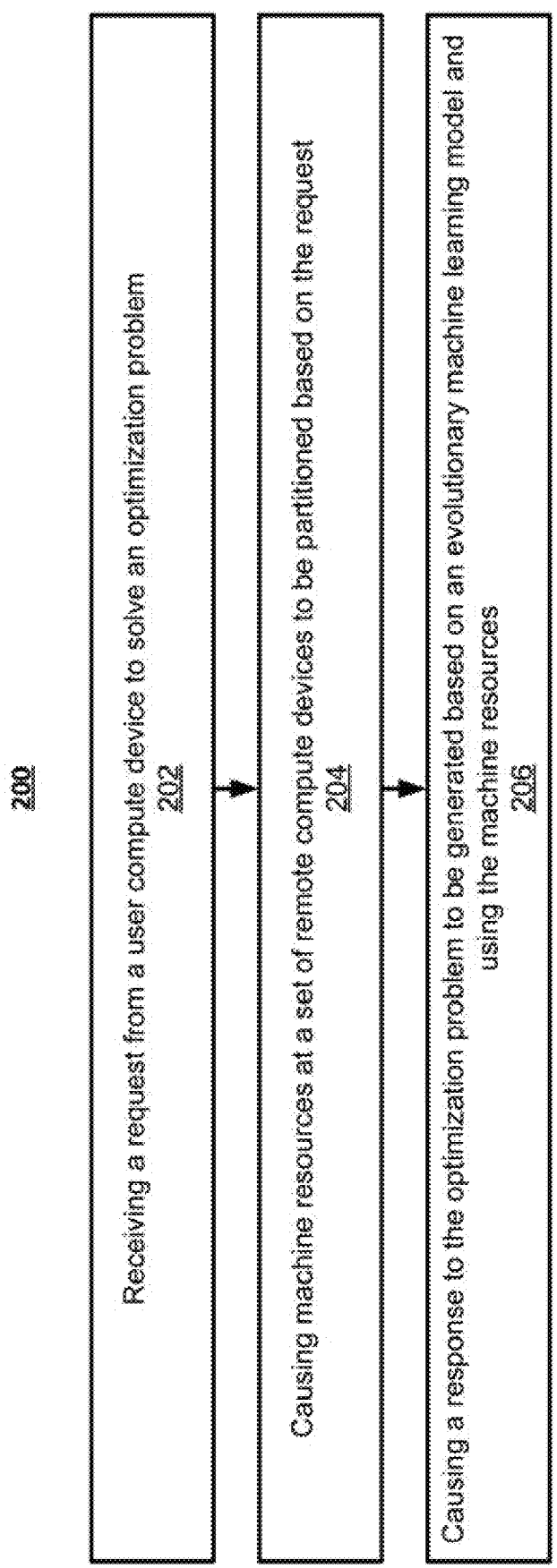
FIG. 2 shows a flowchart of a method for generating a response to an optimization problem, according to an embodiment.

FIG. 2 shows a flowchart of a method 200 to generate a response to an optimization problem, according to an embodiment. In some implementations, method 200 can be code stored in a memory (e.g., memory 114 of FIG. 1) and executed by a processor (e.g., processor 112 of FIG. 1).

At 202, a request is received from a user compute device (e.g., user compute device 120 of FIG. 1) to solve an optimization problem (e.g., optimization problem 124a of FIG. 1). The request can be received via an electronic signal (e.g., a wired or wireless signal). In some implementations, the request includes details for any of the parameters illustrated in FIGS. 14A, 14B, 15A, 15B, 15C, and/or 15D.

At 204, machine resources (e.g., processors 132, 142 and memories 134, 144 of FIG. 1) at a set of remote compute devices (e.g., cloud servers 130, 140 of FIG. 1) are caused (e.g., by sending an electronic signal) to be partitioned based on the request. For example, optimization and/or improvement compute device 110 can send electronic signals to cloud servers 130, 140 indicating the machine resources to be used/partitioned. In some implementations, 204 occurs automatically (e.g., without human intervention) in response to 202.

At 206, a response to the optimization problem is caused (e.g., by sending an electronic signal) to be generated based on an evolutionary machine learning model (and/or evolutionary optimization models) and using the machine resources. For example, the machine resources can receive electronic signals with instructions to execute the evolutionary machine learning model (and/or evolutionary optimization models) and send electronic signals representing the response to optimization and/or improvement compute device 110 and/or user compute device 120. The evolutionary machine learning model (and/or evolutionary optimization models) can be, for example, an optimization and/or improvement platform configured to generate updated populations until a predetermined set of search termination criteria are met.

Figure 3A:
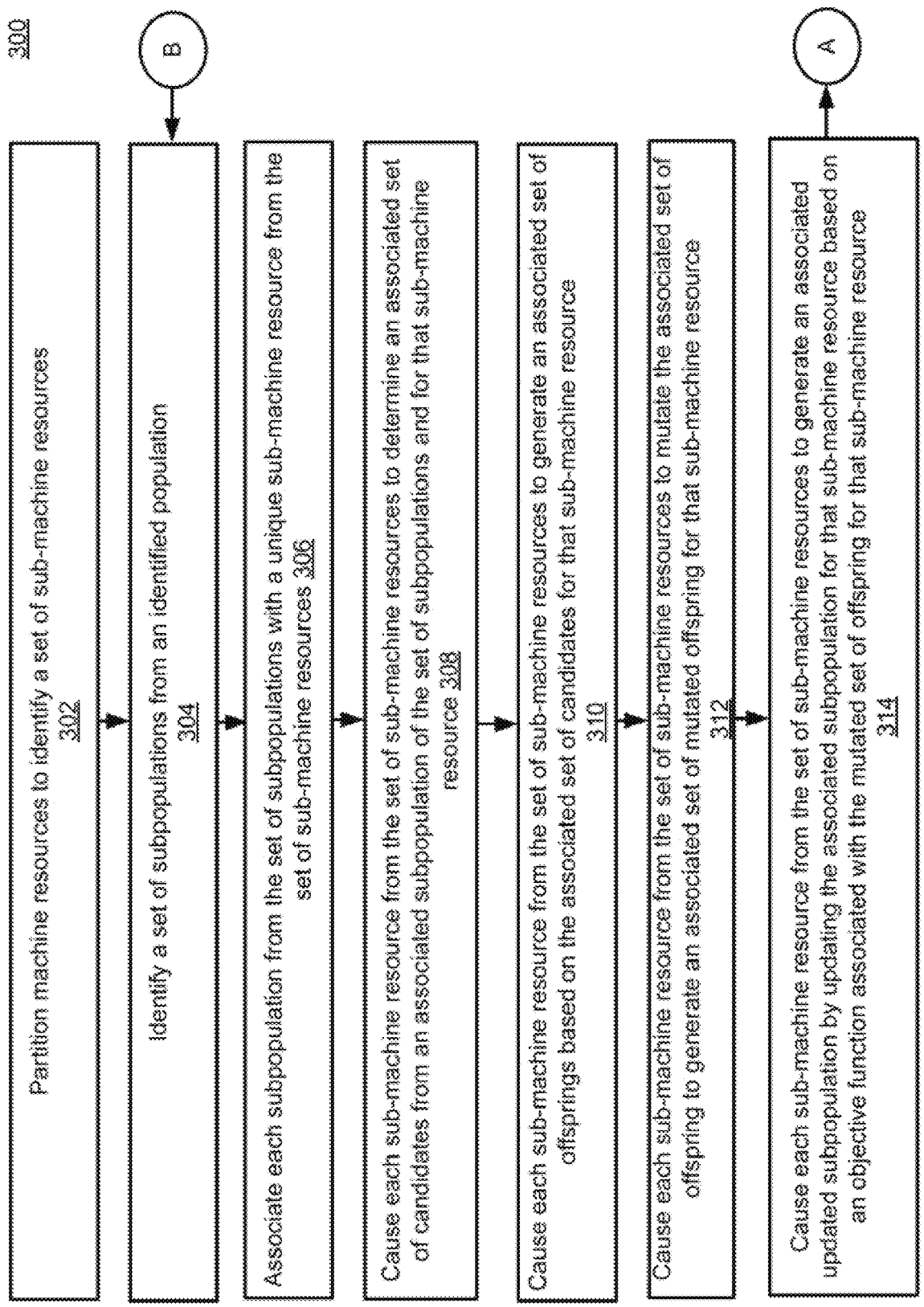
FIGS. 3A-3B show a flowchart of a method for executing an evolutionary optimization machine learning model and/or evolutionary optimization models via serverless computing, according to an embodiment.
Figure 3B:
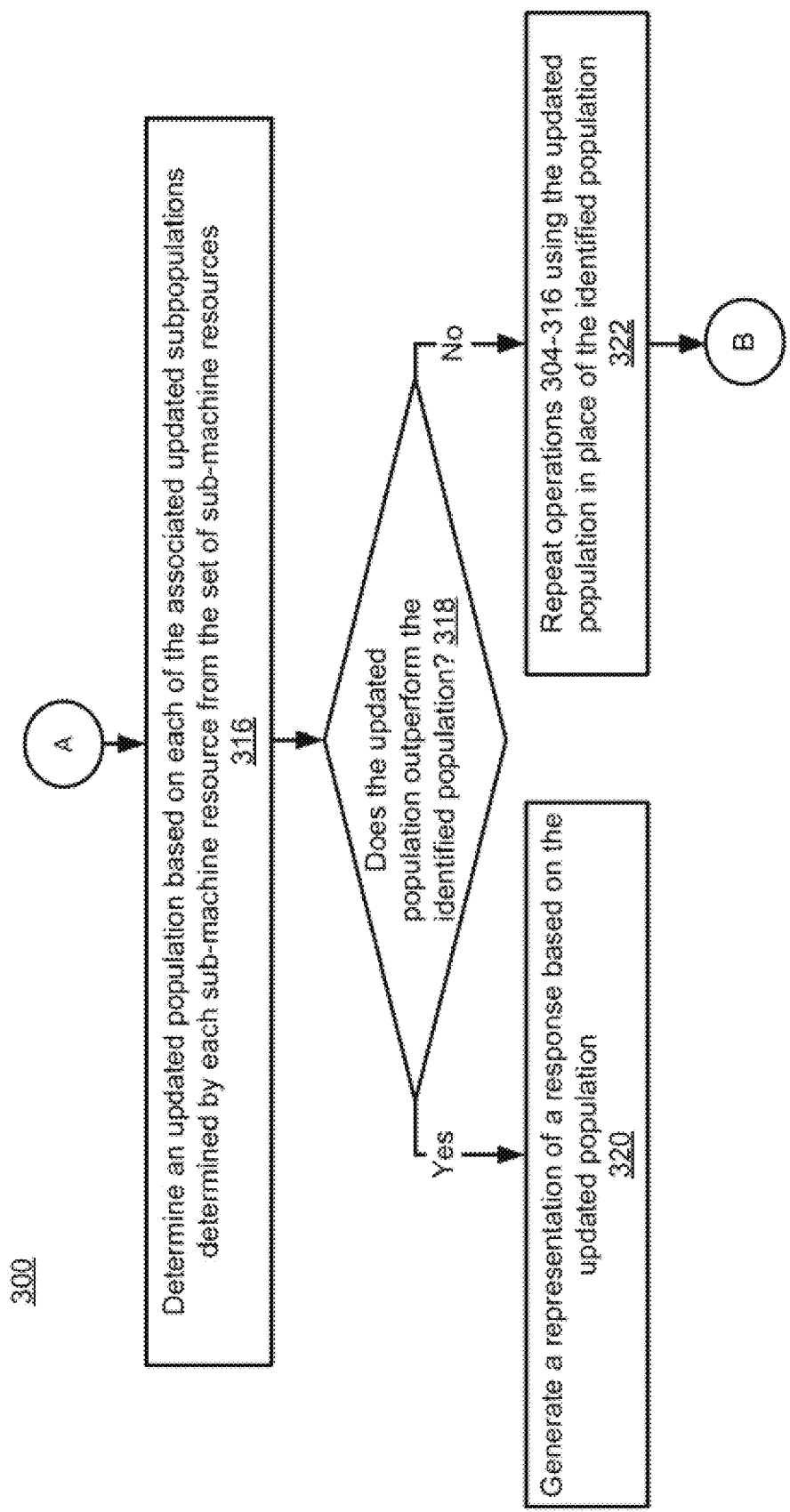

FIGS. 3A-3B show a flowchart of a method 300 to execute an evolutionary machine learning model and/or evolutionary optimization models via serverless computing, according to an embodiment. In some implementations, method 300 can be code stored in a memory (e.g., memory 114 of FIG. 1) and executed by a processor (e.g., processor 112 of FIG. 1).

At 302, machine resources are partitioned to identify a set of sub-machine resources. For example, with reference to FIG. 1, if cloud server 130, cloud server 140, processor 132, memory 134, processor 142, and/or memory 144 are machine resources, optimization and/or improvement compute device 110 can cause (e.g., by sending an electronic signal to cloud servers 130, 140) cloud server 130, processor 132, and memory 134 to be partitioned as a first set of sub-machine resources and cloud server 140, processor 142, and memory 144 to be partitioned as a second set of sub-machine resources. In some implementations, the set of sub-machine resources include memory shared among a set of remote compute devices (e.g., cloud servers 130, 140).

At 304, a set of subpopulations (e.g., sub-populations 134b, 144a) are identified from an identified population (e.g., population 134a). In some implementations, operation 304 occurs automatically (e.g., without human intervention) in response to completing operation 302.

At 306, each subpopulation from the set of subpopulations is associated with a unique sub-machine resource from the set of sub-machine resources. For example, with reference to FIG. 1, sub-population 134b can be associated with cloud server 130, processor 132, and/or memory 134, and subpopulation 144a can be associated with cloud server 140, processor 142, and/or memory 144. In some implementations, operation 306 occurs automatically (e.g., without human intervention) in response to completing operation 304.

At 308, each sub-machine resource from the set of sub-machine resources is caused to determine an associated set of candidates (e.g., set of candidates 134e, 144d) from an associated subpopulation (e.g., elitist pool 134c, 144b, diversity pool 134d, 144c) of the set of subpopulations and for that sub-machine resource. For example, with reference to FIG. 1, cloud server 130 can determine set of candidates 134e from elitist pool 134c and diversity pool 134d, while cloud server 140 can determine set of candidates 144d from elitist pool 144b and diversity pool 144c. In some implementations, operation 308 occurs automatically (e.g., without human intervention) in response to completing operation 306.

At 310, each sub-machine resource from the set of sub-machine resources is caused to generate an associated set of offspring (e.g., sets of offspring 134f, 144e) based on the associated set of candidates for that sub-machine resource. For example, with reference to FIG. 1, cloud server 130 can generate set of offspring 134f based on set of candidates 134e and cloud server 140 can generate set of offspring 144e based on set of candidates 144d. In some implementations, operation 310 occurs automatically (e.g., without human intervention) in response to completing operation 308.

At 312, each sub-machine resource from the set of sub-machine resources is caused to mutate the associated set of offspring to generate an associated set of mutated offspring (e.g., mutated set of offspring 134g, 144f) for that sub-machine resource. For example, with reference to FIG. 1, cloud server 130 can mutate set of offspring 134f to generate mutated set of offspring 134g, and cloud server 140 can mutate set of offspring 144e to generate mutated set of offspring 144f. In some implementations, operation 312 occurs automatically (e.g., without human intervention) in response to completing operation 310. In some implementations, during model/function evaluation, each sub-machine resource from the set of sub-machine resources evaluates the associated set of offspring by executing an optimization and/or improvement model using the associated set of mutated offspring as its input. The output is sometimes referred to as the objective function. The goal during model/function evaluation can be to optimize and/or improve a model/function. Therefore, for each individual offspring, that offspring's performance (aka, fitness) can be evaluated. Said differently, the outputs of the model (objective functions) when run using each mutated or un-mutated offspring are used. The results of each model evaluation can be compared with the archive members of that island (e.g., at that sub-machine resource), and 302 can be repeated until a terminal criteria are met.

At 314, each sub-machine resource from the set of sub-machine resources is caused to generate an associated updated subpopulation (e.g., updated subpopulation 134*h*, 144*g*) by updating the associated subpopulation for that sub-machine resource based on the objective functions associated with/corresponding to the associated mutated set of offspring for that sub-machine resource (e.g., the mutated offspring can go through function evaluations and the results of those simulations (e.g., objective functions/objectives) can be used for population updating). For example, with reference to FIG. 1, cloud sever 130 can generate updated subpopulation 134*h* by updating sub-population 134*b* based on mutated set of offspring 134*g*, and cloud sever 140 can generate updated subpopulation 144*g* by updating subpopulation 144*a* based on mutated set of offspring 144*f*. In some implementations, operation 314 occurs automatically (e.g., without human intervention) in response to completing operation 312.

At 316, an updated population is determined based on each of the associated updated subpopulations determined by each sub-machine resource from the set of sub-machine resources. For example, in some implementations and with reference to FIG. 1, updated subpopulations 134*h*, 144*g* can be used (e.g., combined) and compared with the current population members to generate the updated population (e.g., as shown in FIG. 6B). In some implementations, operation 316 occurs automatically (e.g., without human intervention) in response to completing operation 314.

At 318, a determination is made whether the updated population satisfies a predetermined criterion and/or outperforms the current population members. An example of a predetermined criterion is the value of optimization objective variables in the updated population being outside of the desired predetermined range. In some implementations, operation 318 occurs automatically (e.g., without human intervention) in response to completing operation 316.

If the updated population does satisfy a predetermined optimization termination criterion, at 320, a representation of a response is generated based on the updated population. If the updated population does not satisfy a predetermined criterion, at 320, steps 304 to 316 are repeated using the updated population in place of the identified population.

In some implementations of method 300, 302 to 314 are performed asynchronously.

1. Example Optimization and/or Improvement Platform and Resource Provisioning Infrastructure:

In some implementations, the optimization and/or improvement platform (e.g., running on optimization and/or improvement compute device 110) uses cloud-based computational resources (e.g., at cloud server 130 and 140) to conduct efficient and cost-effective many-objective evolutionary optimization and/or improvement. In some implementations, the optimization and/or improvement platform can be deployed at (e.g., stored at, running at, etc.) a remote site (e.g., an internet site, website) hosted by an optimization and/or improvement compute device (e.g., optimization and/or improvement compute device 110) or on users' compute device (e.g., including user compute device 120). The website can direct the optimization problem to the serverless cloud servers (e.g., cloud server 130, 140), and optimization and/or improvement is conducted there. Alternatively or additionally, the user can define the problem using their user compute device and send (via the user compute device) an HTTP request to the API endpoint of the optimization engine, which can start the cloud-based serverless optimization process. Some implementations of the optimization and/or improvement platform use various Amazon Web Services® (AWS) functionalities (e.g., at cloud servers 130 and 140) for the optimization and/or improvement process. Conducting the parallel evolutionary search can be enabled by, for example: 1) the use of serverless functions to minimize and/or reduce the overhead cost and burden of resource provisioning for parallel computations, 2) the implementation of cloud-based relational databases to share memory during the search process, and 3) the use of cloud-native asynchronous invocation features to construct an efficient async MOEAs. The following sections describe these capabilities in greater detail.

Although some implementations are described with reference to the AWS platform, techniques described herein can be implemented on other cloud-based service providers that support similar functionalities in other implementations. For example, other serverless services including, but not limited to MICROSOFT® AZURE®, GOOGLER Cloud, IBM® Cloud, ALIBABA® Cloud, etc. can also be used to enable the various operations described herein. This platform is also transferable to other manually developed serverless systems.

1.1. Example Serverless Function Implementations

One of the hurdles or limitations in using cloud computing systems for evolutionary optimization and/or improvement is the provision and maintenance of these resources to keep cost-effective. Some implementations described herein use cloud-native serverless functions to address this problem. Some implementations use a serverless compute service (e.g., AWS's lambda functions) for the mass parallel simulation of function evaluations (i.e., the individual model runs, which is often the most computationally expensive task), offspring generation, archive updates, and monitoring of the status of search (FIG. 5). In addition, some implementations described herein use serverless services for model termination, data post-processing, visualization of the results, and data extract, transform, and load (ETL) processes. This is advantageous because by doing so, the user does not need to allocate computational resources and worry about the trade-offs between efficient uptime and cost-effective downtime. This capability differentiates systems and methods described herein from some known optimization paradigms in computer clusters and cloud systems that require heavy capital investments and operational costs of system maintenance and uptown management.

FIG. 5 illustrates using serverless functionality to execute an evolutionary machine learning model and/or evolutionary optimization algorithm, according to an embodiment. At operation (1), AWS Lambda (e.g., executed at processor 132 and/or 142 of FIG. 1 and/or stored at memory 134 and/or 144 of FIG. 1) can be used for initialization, which can include creating cloud resources initializing the optimization problem (e.g., optimization problem 124a), generating an initial population (e.g., population 134a), and saving the initial population in a shared memory (e.g., using AWS RDS and/or DynamoDB). At operation (2), AWS Lambda can be used to perform a function evaluation, which can (if any new offspring were added at operation (4) previously) include invoking a function evaluation for each added offspring. At operation (3), AWS Lambda can be used to update archives (i.e., populations) and save the updated archives at the shared memory. At a prespecified NFE interval, at operation (4), AWS Lambda and the shared memory can be used to generate offspring by creating parent pools (e.g., elitist pools, diversity pools, etc.), performing recombination and mutation, and saving the offspring at the shared memory. At the prespecified NFE interval, at operation (5), AWS Lambda can be used to update the main archive (e.g., population 134a) by combining islands and storing the main archive at the shared memory. At the prespecified NFE interval, at operation (6), AWS Lambda can be used to perform hypervolume calculation. In some implementations, hypervolume calculation is done as a post-processing step to monitor the progress of the search and/or to monitor the real-time status of the search. For example, if hypervolume stops increasing, this can mean that the optimization and/or improvement algorithm has stopped finding new solutions, and the search can be either stopped or directed toward new areas of the decision space. At operation (7), AWS Lambda can be used to perform a search termination if the stopping criteria have been met. At operation (8), AWS Lambda can be used to perform postprocessing, which can include creating figures and/or statistics (e.g., representing an answer to the optimization problem). At operation (9), the results from (8) are stored in, for example, a AWS S3 bucket. In some implementations, alternative or in addition to AWS Lambda, any other serverless service can be used (e.g., Google Cloud, Microsoft Azure, Cloudflare, Netlify, Oracle Cloud, etc.). In some implementations, alternative or in addition to AWS S3, any other object storage service can be used (e.g., Google Cloud, Microsoft Azure, Backblaze, Scaleway, etc.). In some implementations, alternative or in addition to AWS RDS, any other relational database service can be used (e.g., Google Cloud, Microsoft Azure, DigitalOcean, etc.). In some implementations, alternative or in addition to DynamoDB, any other NoSQL database can be used (e.g., Google Cloud, Microsoft Azure, MongoDB Atlas, Couchbase, etc.).

In some implementations, users have control over their computational platform configurations. For example, users can select (e.g., by providing input to user compute device 120) the number of processors and the memory allocated to each serverless unit. For instance, in AWS Lambda, the memories can vary from 128 MB to 10,240 MB. Also, unlike other known computer cluster-based parallel systems, there are no specific limits for data storage and access to data during the search.

In some implementations, the optimization and/or improvement platform does not follow a known HPC-based genetic algorithm architecture regarding its design, memory sharing, and parallelization. This may advantageously make the systems and methods described herein more efficient and scalable. In some implementations the systems and methods described herein may resemble an island-based layout, as described herein. The optimization and/or improvement can operate in a single or many-objective mode. The many-objective optimization problems (also known as many-objective evolutionary models (MOEAs)) can, in some implementations, use more computational time and cost. Systems and methods described herein may be particularly beneficial for those types of problems.

In some implementations, the code base of the optimization and/or improvement platform and optimization and/or improvement engine can be written in a single language (e.g., Python). Some implementations use, for example, AWS' Cloud Development Kit (CDK) to define its Infrastructure as Code (IaC). This consistency across various infrastructure and scientific code stack components allows a faster and more flexible development process.

1.2. Example Containerization of Serverless Optimization and/or Improvement Functions Software containerization can provide portability, consistency, resource efficiency, and improvement in overall processing time. In addition to these general benefits, there are sometimes memory limits for the size of a single serverless function deployment, and this limit can be significantly higher for containerized deployments. For example, Amazon's lambda functions have a 500 MB limit for regular deployments and a 10 GB limit for containerized serverless implementations. Therefore, in some implementations, functions are containerized, including the primary optimization and/or improvement function that may be provided by the user. This provides users with the opportunity to optimize and/or improve more complex tasks that have external libraries.

1.3. Example Cloud-Based Shared Memory Resources

Some known techniques for distributed mass parallel simulation systems do not desirably define how memory is shared between various computation units. Different memory-sharing design choices can affect communication time, rate of synchronization, and total time of computation. Previously, different shared memory programming strategies have been implemented to address this problem such as, for example, MOEAs utilize shared memory approaches such as Multi-threading, OpenMP, and Message Passing Interface (MPI). Some implementations described herein use the capabilities of cloud-based memory resources to address the memory challenge. In this architecture (see, e.g., FIG. 7), archive communications and data management operations can be carried out asynchronously, and each computational unit (e.g., cloud server 130 and/or 140) can directly access memory resources without interrupting the operation of other units. This memory-sharing method can reduce (e.g., minimize) the data communication time, removing a potentially significant bottleneck in achieving a shorter total processing time.

Figure 7:
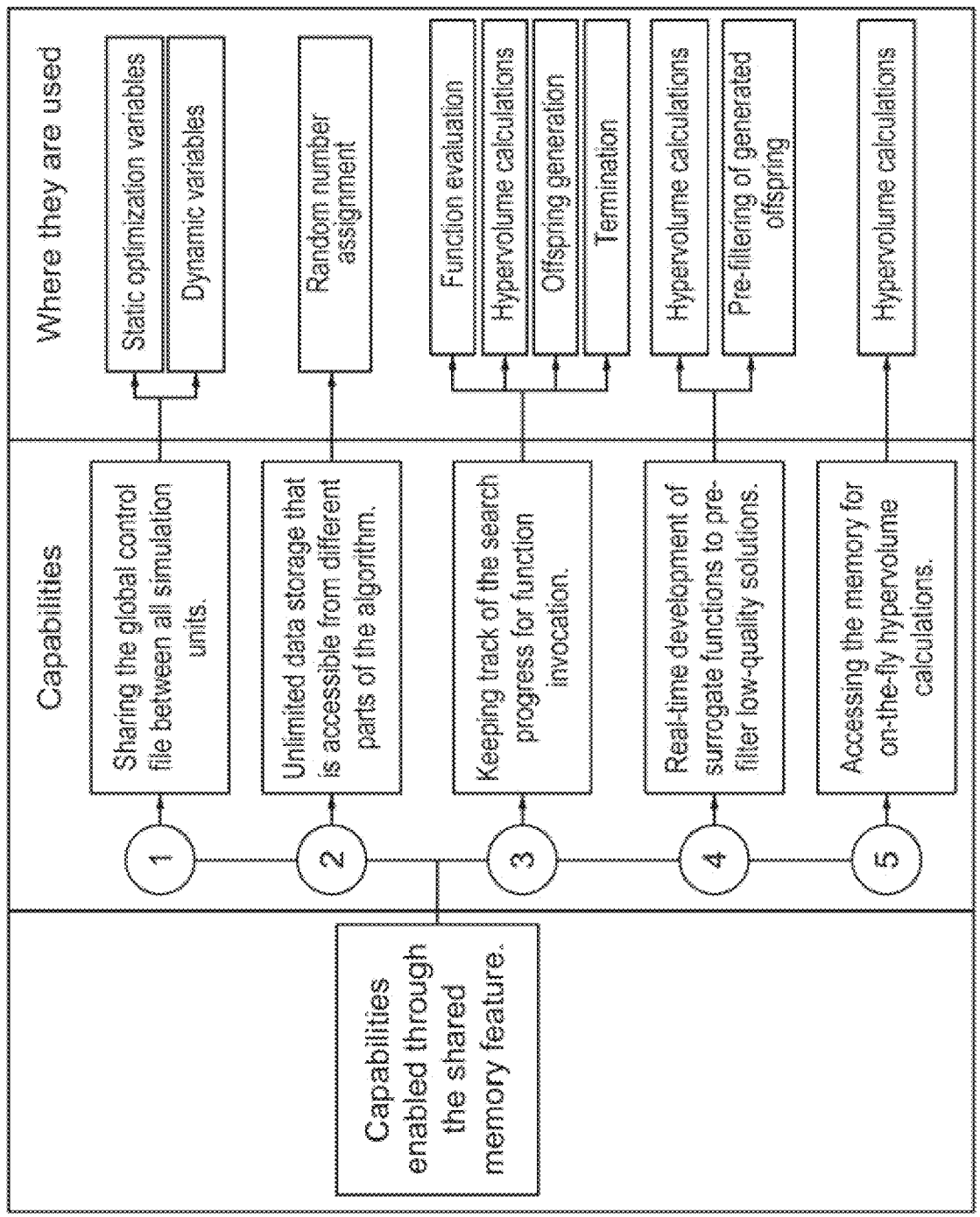
FIG. 7 illustrates capabilities enabled through using shared memory, according to an embodiment.

FIG. 7 illustrates capabilities enabled through using shared memory (e.g., cloud sever 130 and/or 140 both being able to access memory 134, memory 144, and/or a memory not illustrated in FIG. 1), according to an embodiment. One capability may be sharing the global control file between the simulation units (e.g., cloud server 130 and/or 140) that can be used for and/or define different variables static and dynamic optimization variables. Another capability is data storage (e.g., nearly unlimited data storage) that is accessible from different parts of the evolutionary machine learning models and/or evolutionary optimization models, which can be based on and/or used for random number assignment. Another capability is keeping track of the search progress for function invocation, which can be used for and/or include function evolution, hypervolume calculation, offspring generation, and termination. Another capability is substantially real-time development of surrogate functions to pre-filter low quality solutions, which can be used for and/or based on hypervolume calculations and/or pre-filtering of generated offspring. Another capability is accessing the shared memory for substantially real-time hypervolume calculations (e.g., on-the-fly), which can be used for and/or based on hypervolume calculations.

In addition, unlike some other MOEA parallelization options, the cloud-based datasets (e.g., population 134a, sub-population 134b, sub-population 144a, etc.) can be repeatedly (e.g., continuously, periodically, sporadically, etc.) available during the optimization and/or improvement. Therefore, in some implementations, each serverless function can query from other islands, their archives, and the main archive uninterruptedly. In some implementations, an "island" can refer to a sub-machine resource (e.g., cloud server 130, processor 132, memory 134). In some implementations, an island is a standalone optimization unit that does not communicate frequently with other islands. Unlike known island-based systems, because serverless systems are used in some implementations described herein, simulations/function evaluations can be independent. One of the connection points for individual islands can be the shared memory between the islands. In some implementations, an "archive" of an island can refer to candidates (e.g., sub-population 134b) associated with (e.g., stored and/or processed at) the island. In some implementations, a "main archive" can refer to a full population of candidates (e.g., population 134a). In some implementations, the main archive is shared between all islands and includes the better- and/or best-performing members across the islands. The main archive can but not have to be part of a central controller. Thus, the recombination process and generation of offspring (e.g., set of offspring 134f and 144e) can be performed more efficiently. At the same time, because the optimization and/or improvement engine can access survived and failed function evaluations, the optimization and/or improvement platform can dynamically develop data-driven surrogate classification functions to approximate the fitness of an offspring and estimate if a solution can make it to the non-dominated frontier. This can significantly accelerate the search process, especially for functions of high computational times. The optimization and/or improvement engine can also use the shared memory feature for the substantially real-time calculation of hypervolume, which can provide instant (e.g., real time, at machine speed) feedback and guide the search.

The other advantage of using cloud-based storage resources is that, unlike some known parallel computing systems, there are no specific space limits for datasets, and the optimization and/or improvement results can be moved to permanent storage systems and retrieved and re-used when needed. Also, many cloud providers offer data management as stand-alone services and have separate cost structures for data communications, which gives the user a higher level of control over the trade-offs between search quality and computational costs.

Some implementations described herein can be used with relational database system (e.g., AWS-based RDS systems (MySQL)) for data storage of each optimization and/or improvement project. The optimization and/or improvement platform can also use a database (e.g., AWS' NoSQL DynamoDB tables) for data storage (e.g., the unstructured user-provided input files) and the invocation of various serverless functions (e.g., Lambda serverless functions) that are used to accomplish the optimization and/or improvement task. Also, other storage systems (e.g., AWS' S3 buckets) can be used as the more permanent storage option after the optimization and/or improvement process finishes (see, e.g., FIG. 5).

1.4. Example Asynchronous Invocation:

Some implementations are related to using asynchronous techniques. Asynchronous systems can offer higher parallelization capabilities and significant speedup gains compared to generational synchronous systems. The optimization and/or improvement platform can use an asynchronous parallel optimization and/or improvement system that uses, for example, the AWS DynamoDB's lambda invocation feature to run the model for each newly generated offspring. As such, a steady-state island-specific archive updating process can be applied. The asynchronous invocation feature can also be used for other MOEA operations, such as offspring generation, main archive updating, and hypervolume calculations.

2. Example Many-Objective Evolutionary Optimization and/or Improvement Engine

This section describes an example implementation of the optimization and/or improvement engine designed for systems and methods described herein. Various approaches have been implemented in systems and methods described herein to improve the speed and efficiency of the optimization and/or improvement process. Compared to some known evolutionary machine learning models and/or evolutionary optimization models, techniques described herein leverage the capability of cloud infrastructures while ensuring improved search quality and efficiency (see, e.g., FIG. 7). The following section first provides an overview of the optimization and/or improvement process, and then discusses some of the capabilities developed and utilized in the optimization engine.

2.1. Example General Definitions of the Optimization Problem Solved

Figure 12:
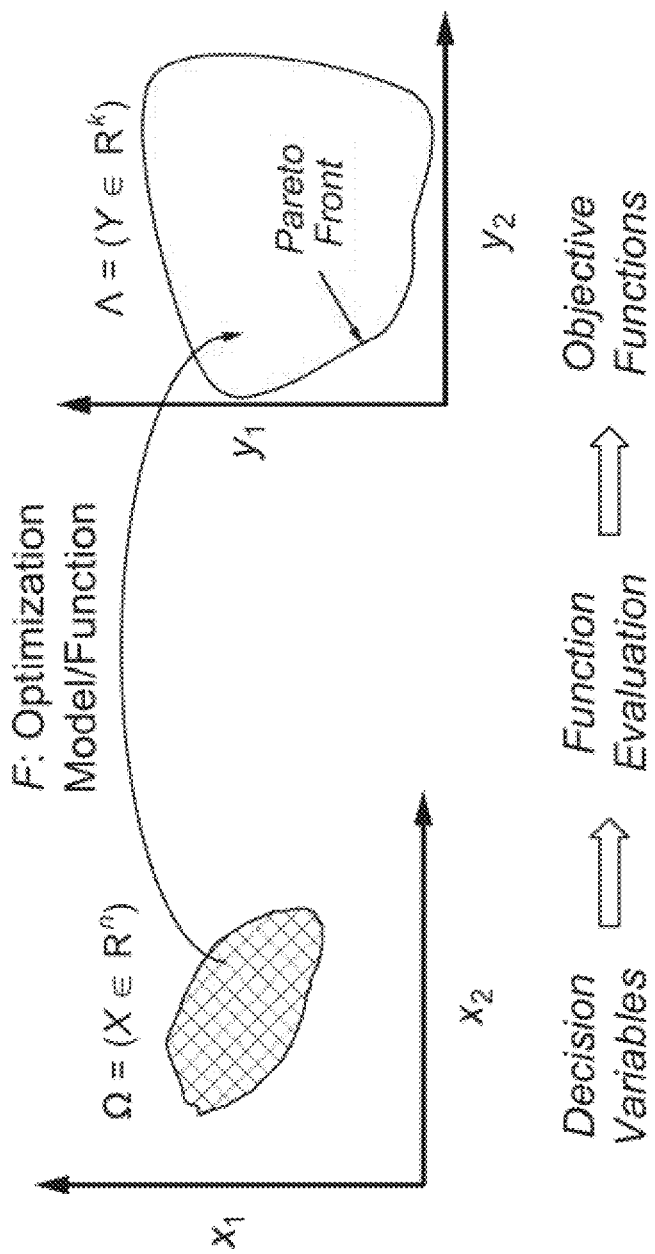
FIG. 12 illustrates generating objective functions using function evaluations of decision variables, according to an embodiment.

Some implementations are related to providing a modular optimization solver that can be used for a variety of different real-world many-objective optimization problems. Generally, many-objective optimization problems can be mathematically defined as follows:

$$\minimize_{x \in \Omega} \text{ OR maximize: } F(X) = (f_1(X), f_2(X), f_3(X), \ldots, f_m(X))$$

$$\text{subject to: } \begin{cases} g_i(x) = 0, \forall_i \in \varepsilon \\ h_j(X) \le 0, \forall_j \in \varepsilon \end{cases}$$

where $=[x_1, x_2, \ldots, x_n]$ is the vector of n decision variables, $g_i$ and $h_j$ are the equality and inequality optimization constraints, respectively, and $F=(f_1, \ldots, f_m)$ is the m dimensional vector of the objective functions. The decision variables can be the variables that are changed to affect the outputs of the optimization model. The objective functions can be model outputs that are intended to be optimized. The optimization model can be, for example, a single Python function, a complex model file provided in serialized formats (e.g., Python Pickling) and/or compressed executable files. Function evaluation in this context can refer to conducting model simulations when the model inputs include the decision variables and the model outputs contain the objective functions (FIG. 12). Some implementations can handle single- and/or multi-objective problems.

2.2. Example Overall Algorithm

Some implementations are related to a steady-state many objective evolutionary algorithm that uses an epsilon-dominance methodology to maintain Pareto front archives. Some implementations follow the concept of coarse-grained parallel architecture (island-based) to parallelize the simulation, but as discussed elsewhere herein the actual implementation is different from known parallel implementations.

In some implementations, the steady-state many objective evolutionary algorithm can initialize the optimization procedure and start the first round of function evaluations. After this, an archive (e.g., sub-population 134b, 144a, etc.) can be constructed within each island for the optimization problem. For each individual simulations, the results of the optimization model can be compared to the current archive members as shown in FIGS. 5, 6A, 6B, and 13. Once a certain percentage of simulations are completed, the next round of offspring generation can initiate. Offspring production can include parent selection through construction of an elitist and diversity parent pools. After parent pool construction, the recombination and mutation process can be used to generate the offspring for the next generation of function evaluations.

A main archive (e.g., population 134a) that is shared between the islands can be maintained. The main archive can include the better and/or best performing (e.g., fittest) solutions throughout the search. The main archive update process can occur at user-predefined intervals and follows operation 2 as shown in FIG. 6B in which the operation compares solutions with the main archive members and updates the main archive if an eligible solution has been added to the archive of each island since the previous round of main archive update. An on-the-fly hypervolume generation process that is used to monitor and guide the search and detect search stagnations can also be used. The hypervolume process can also be triggered at a predefined interval. Additionally, once the operation reached a termination conditions (e.g., the maximum number of function evaluations), the operation can stop and the serverless functions are used to conduct the postprocessing analysis and results reports.

2.3. Example Initialization Options

The initial condition is an attribute of an optimization and/or improvement technique. The random seed used at the start of the optimization and/or improvement technique and the initialization method can control, at least in part, which part of a high-dimensional decision space will be explored, which can affect the convergence rate and the final solutions. In some implementations, an optimization and/or improvement engine can provide users with (e.g., via a user interface, as illustrated by "Initialization Method" at FIG. 14A) three initialization options (e.g., options that the user can select via a user interface). Examples of initialization options include, but are not limited to:

a. Random initialization is a stochastic method that can be used to initialize an optimization and/or improvement technique. A predefined number of solution candidates can be generated randomly.

b. Latin-Hypercube Sampling (LHS) can be used, for example, in the design of physical and computational experiments. LHS is a statistical method for generating a near-random sample of parameter values from a multi-dimensional distribution, and can been used in evolutionary machine learning models and/or stochastic initialization. An advantage of LHS is that the entire objective space is explored relatively evenly.

c. Initialization from a known solution can be, in some ways, conceptually similar to transfer learning in Artificial intelligence. For example, the user can provide previously found solutions, known benchmarks, or best guesses, and/or the like as the machine learning model's initial state. This feature can bring processing time gains in many cases.

Figure 8:
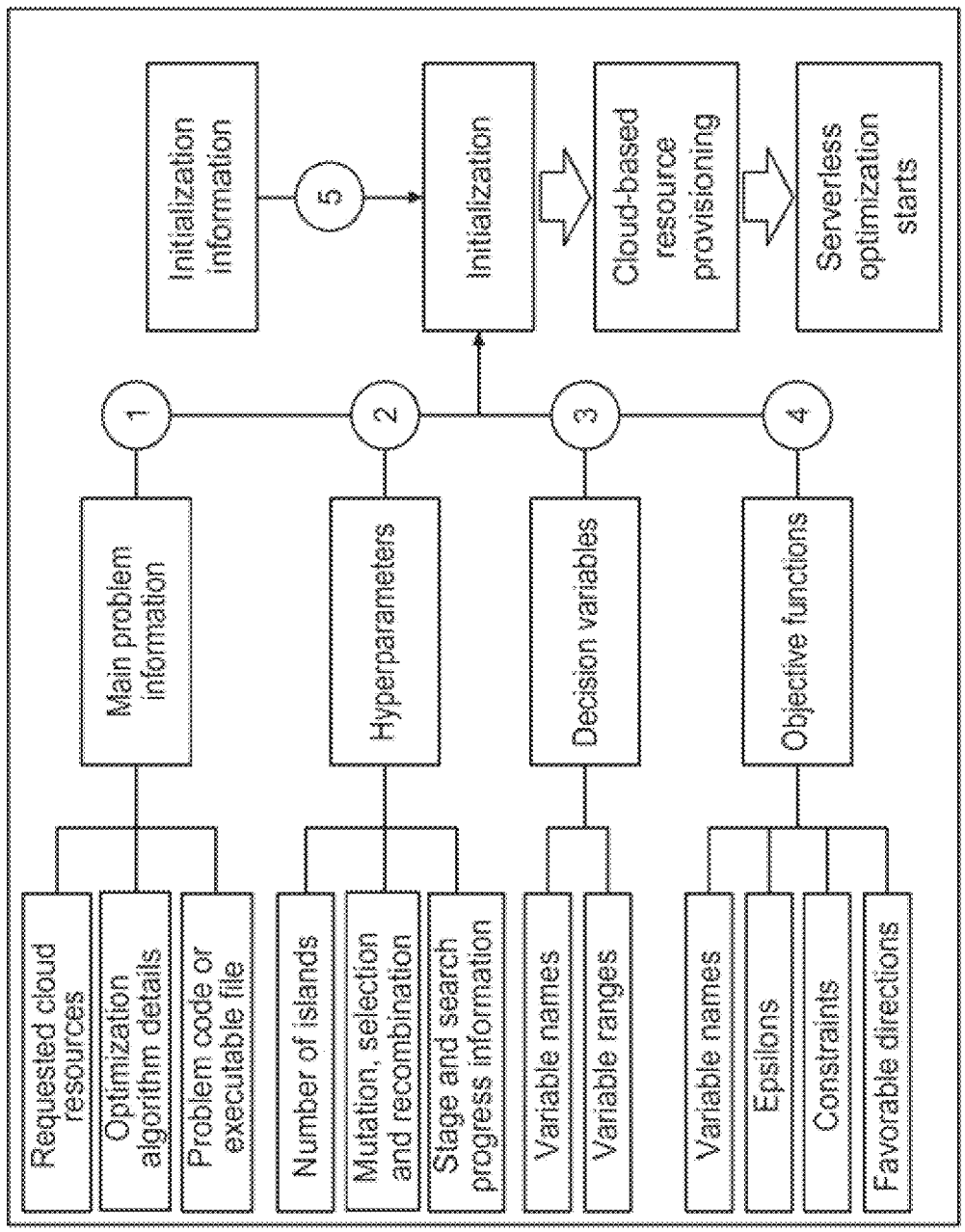
FIG. 8 illustrates an initialization process for performing optimization and/or improvement, according to an embodiment.

FIG. 8 depicts the initialization process in some implementations, while also showing the inputs that can be used to start the simulation process. In response to an initialization method (e.g., receiving an optimization problem/information), initialization can be performed based on the main problem, hyperparameters, decision variables, and/or objective functions. The main problem can be represented in problem code or an executable file, include optimization (and/or improvement) algorithm details, and be associated with requested cloud resources. The hyperparameters can include number of islands, stages and search progress information, mutation, selection, and recombination, The decision variables can include variable names and variable ranges. The objective functions can include variable names, epsilons, constraints, and favorable direction. Thereafter, cloud-based resources can be provisioned and used for serverless optimization and/or improvement.

2.4. Example Random Number

Another consideration during the initialization and execution of the optimization and/or improvement problem is the way that random seeds are handled. In some previous MOEAs, the random seed is set at the beginning and often determines which part of the space is explored during the search process. Instead of setting the random seed once at the beginning, some implementations described herein set a random seed for each serverless function execution. The random seed of a function evaluation can be set to be the count of function evaluations (NFEs) at the time of the serverless function invocation. The actual number of NFEs can depend on one or more different stochastic factors, including the time complexity of previous function evaluations, wait time for invocation, and/or the memory communication rate. In some implementations, a user can manually provide an indication of the random seed (e.g., as illustrated by "Random Seed" at FIG. 14A).

2.5. Example Three Search Stages

In some implementations, the optimization and/or improvement engine uses three search stages (e.g., that occur consecutively). In some implementations, the percentage of the total number of runs associated with each stage can be a user-defined hyperparameter. The three stages can include, for example:

Stage 1: An initialization stage, where initial datasets can be generated and function evaluation can be conducted for those simulations.

Stage 2: An exploration stage that prioritizes exploration over exploitation and aims at collecting information from the decision and objective spaces. The stage can start after the initialization stage.

Stage 3: An exploitation stage, where the evolutionary machine learning model and/or evolutionary optimization algorithm becomes more elitist and more main archive solution is used to fine-tune the superior solutions. In other words, more parents (e.g., solutions) from the main archive (e.g., population 134a) are injected, inserted, or introduced into the recombination process. This gives the known superior solutions a higher chance of influencing the next generation. This way the optimization and/or improvement algorithm focuses on finding possible solutions around the already discovered solution (aka, exploitation), which is in contrast with looking for solutions in other unknown parts of the decision variable space (exploration).

Compared to some known techniques that have implemented the multi-stage optimization and/or improvement concept, techniques described herein use a different approach to define and handle different stages. This allows diversity to be prioritized and the objective space to be explored first, then finding best and/or improved solutions set in stage through exploitation. In some implementations, the default can be exploration before exploitation (e.g., so users have control over the makeup of parent pools in each stage), in other implementations, the order can reverse (e.g., exploitation before exploration) or a conduct with a more balanced approach can be chosen depending on the specific situation.

2.6. Example Applying Constraints During the Optimization and/or Improvement Process Many objective evolutionary models (MOEAs) sometimes do not desirably enforce constraints. Because constraints can significantly restrict the diversity of parent pools and reduce the exploration potential of MOEAs, it can be more challenging for optimization and/or improvement methods to find and maintain high-quality solutions when solving constrained optimization problems.

Figure 15D:
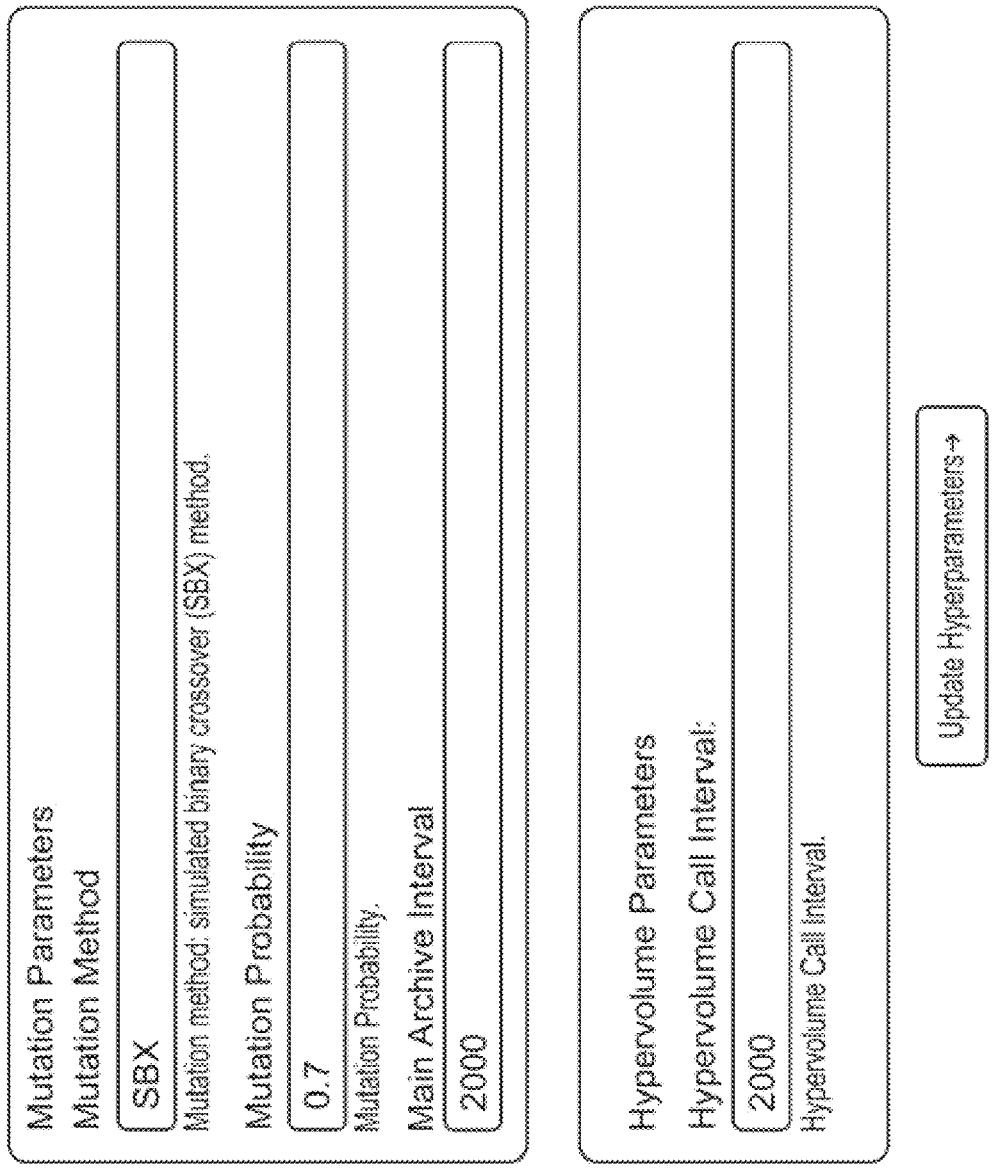
Figure 16B:
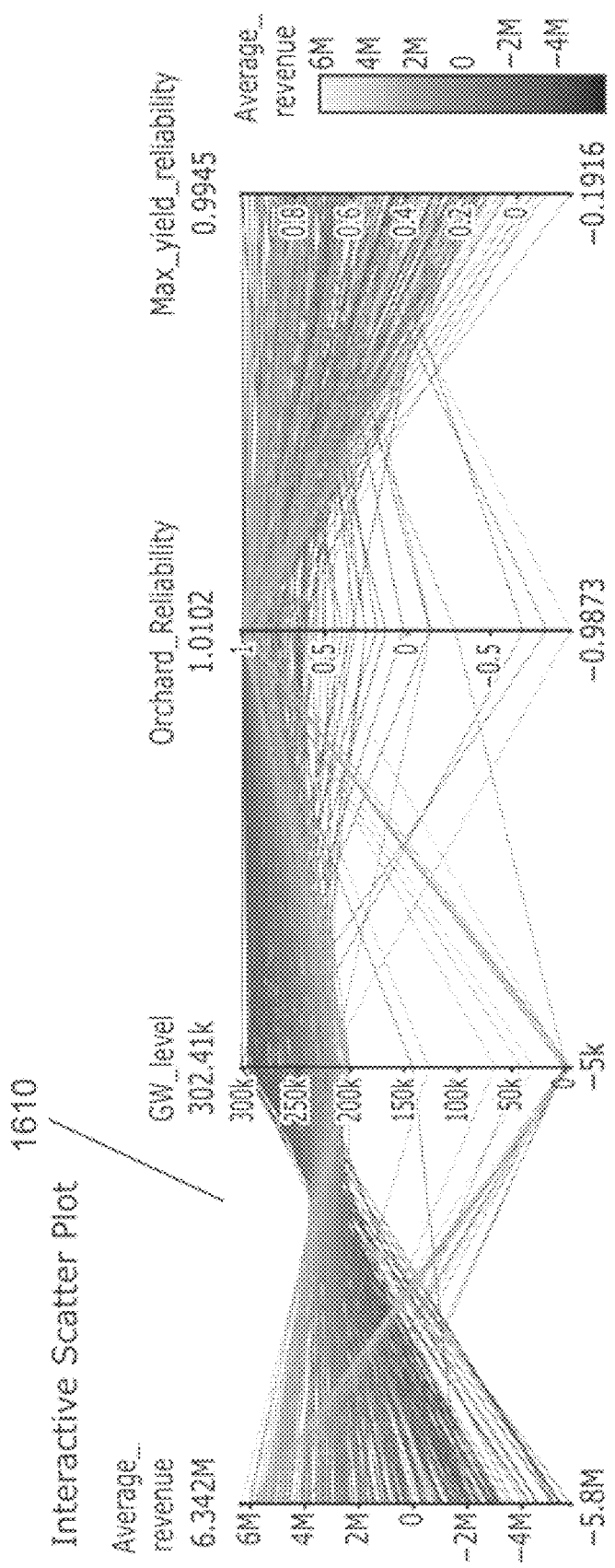
Figure 16C:
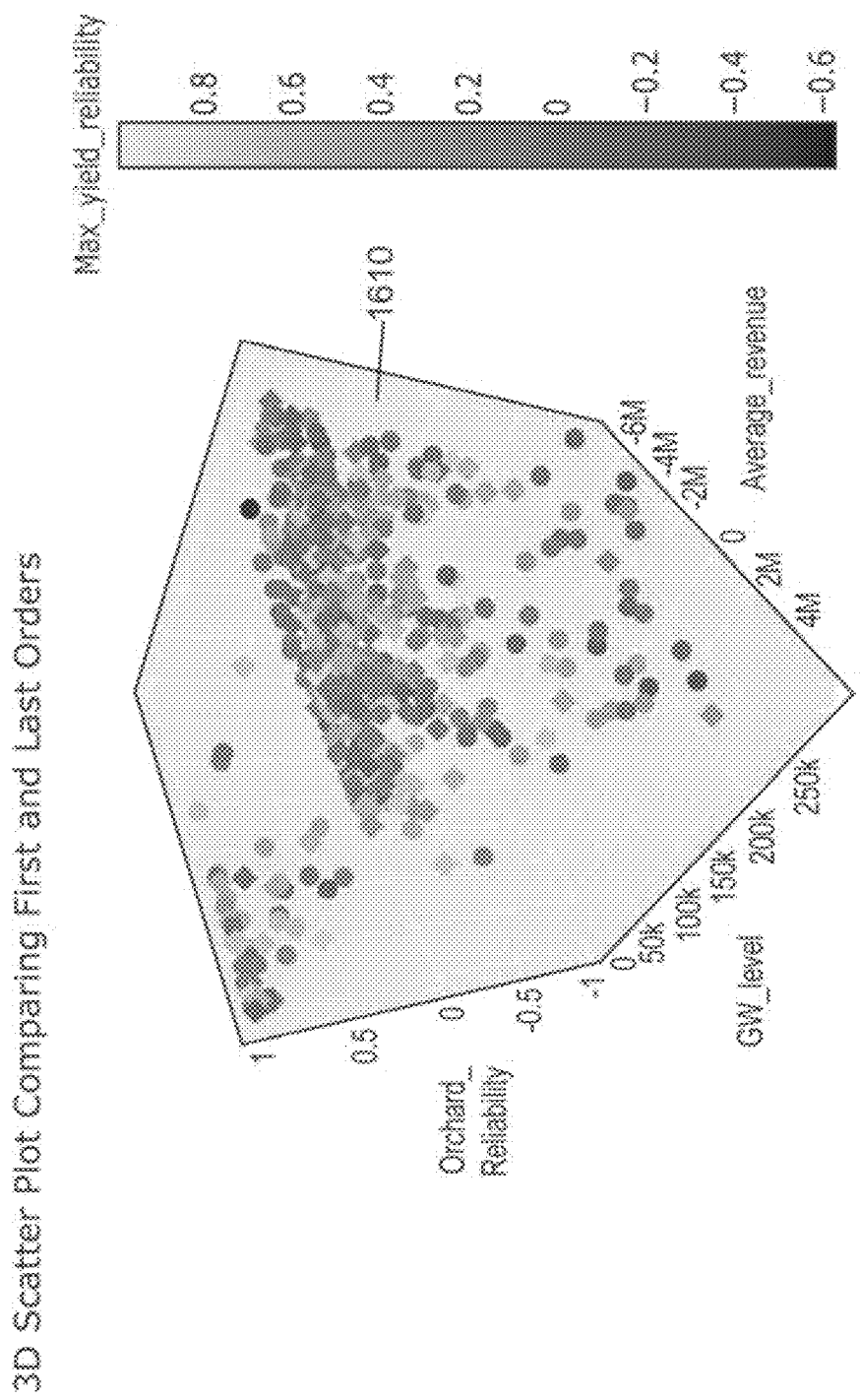
Figure 16C:
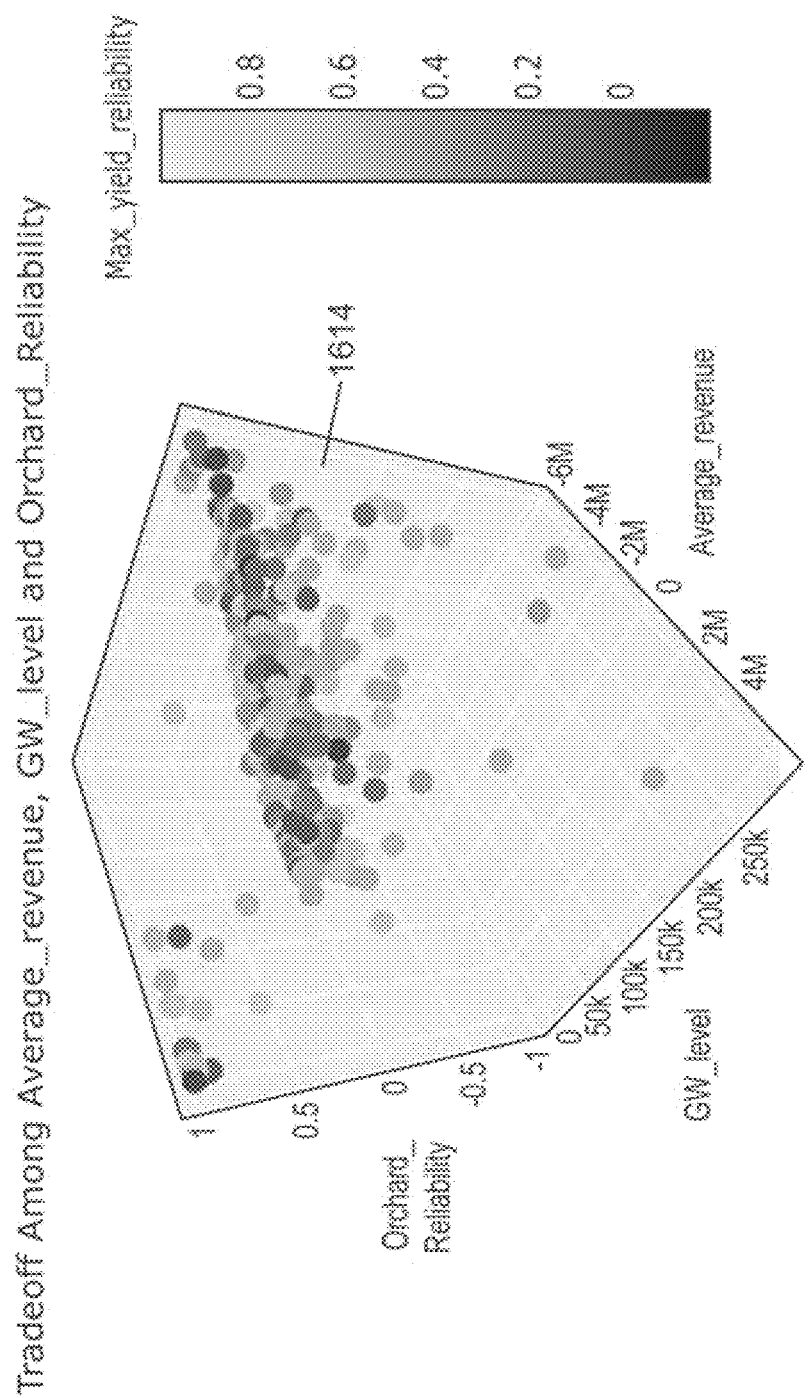

Some implementations described herein use an approach to apply the search constraints. For example, the constraints earlier in the optimization and/or improvement process can be ignored to allow a more comprehensive exploration with diverse parent pools. Then, after the threshold, the constraints can be applied for a more refined search that takes into account the problem's limitations and desires. The threshold for ignoring the constraint can be a user-defined percentage (e.g., as illustrated in FIGS. 14, 15, and 16) of total simulations.

2.7. Example Steady-State Archive Update:

In some implementations, the optimization and/or improvement engine uses a steady-state architecture to update the optimization and/or improvement archive. In some implementations, there can be two broad families of simulation-optimization/improvement methods: i) generational and ii) steady-state. In the generational evolutionary optimization and/or improvement techniques, the offspring can be generated first for a specific generation. After that, the solutions can be evaluated, compared, and ranked based on their fitness. Then, the selection operators can select some representative best- and/or better-fitting solutions and use them as parents to produce the next generation. Finally, the chosen individuals can be recombined and mutated to generate the offspring of the next generation, and this cycle can continue until the termination criteria are met. In contrast, the steady-state evolutionary machine learning models and/or evolutionary optimization models can perform fitness evaluation asynchronously. A Pareto Front archive can be maintained, and each offspring can be compared to the archive member to see if that offspring can replace the archive member. The steady-state evolutionary machine learning models and/or evolutionary optimization models can be superior to their generational counterparts regarding the quality and diversity of the solutions and overall computational time.

2.8. Example Epsilon-Dominance Archive Update:

It can be desirable for many-objective evolutionary machine learning models and/or evolutionary optimization models to include enough diversity in the final solution set that allows the decision-maker to understand the tradeoffs between different objectives. Some implementations of the systems and methods described herein use the epsilon-dominance method, an approach that discretizes the objective space into hyper-rectangles. The size of the edges of each box is a vector of mesh sizes called epsilon. There can be one epsilon size for each objective function. In some implementations, the user defines the epsilons and represents the minimum increments for each objective that constitutes a meaningful change from the users' perspective. In some implementations, one solution can be in each epsilon hyperbox. This approach can help maintain diversity by assuring that there won't be a cluster of solutions in a specific part of the objective space. In addition to diversity preservation, the epsilon-dominance method can help avoid some MOEA problems such as dominance resistance and edge convergence.

2.9. Example Island-Based Implementation:

In some implementations, the optimization and/or improvement engine uses a multiple population parallel evolutionary optimization methodology (AKA, island-based). The island-based method can divide the population (e.g., population 134*a*) and simultaneously conduct optimization and/or improvement in semi-isolated islands (e.g., cloud server 130, cloud server 140, etc.) that communicate with each other (e.g., via network 120) at a predefined frequency and through a process called migration.

The island-based approach implemented in the optimization and/or improvement engine differs from some known versions of the island-based structure. In techniques described herein, the optimization and/or improvement engine uses serverless computational resources, and each island has its own independent data storage system (e.g., memory 134, memory 144, etc.), which is accessible by other islands. Also, in some implementations, the optimization and/or improvement engine does not apply prescheduled migrations. Instead, during each offspring generation cycle, the recombination process selects an island randomly, and a few individuals are chosen from that population (e.g., from the randomly selected island) for mating and recombination and the islands do not have any specific communication protocols, which can make the search more flexible.

2.10. Example Construction of the Parent Pools

In some implementations, the optimization and/or improvement engine included in the systems and methods described herein uses a method to construct parent pools that are used for the creation of future offspring. The parent pools can be created for each individual island and include two separate pools: 1) an elitist pool (e.g., elitist pool 134*c*, elitist pool 144*b*, etc.), and 2) a diversity pool (e.g., diversity pool 134*d*, diversity pool 144*c*, etc.). The elitist pool of each island can be created by random selection of a predefined number of parents (e.g., 10 parents, 50 parents, 100 parents, 250 parents, etc., inclusive of all ranges and values therebetween) from the archive members (e.g., sub-population 134*b*, sub-population 144*a*, etc.) of that island. In some implementations, the diversity parent pool is made of, for example, five different types of already-tested individuals (e.g., data representing candidates/parents associated with the evolutionary machine learning model and/or evolutionary optimization models) listed below (see, e.g., FIG. 7):

(i) Pareto front members of other islands;
(ii) Individuals that are in the same archive box as the Pareto front members but were dominated by that Pareto front member;
(iii) Individuals who were a part of the Pareto front at some point but were replaced by an archive member;
(iv) Several low-quality solutions that have never been selected to be a part of the Pareto front; and/or
(v) Several high-quality solutions from the main archive pool.

After the elitist and diversity archive pools are created, the two archives can be joined together, and the final population can be used for selection, recombination, and mutation. Although some known techniques have used the elitist and diversity parent pools, the diversity pool can be a parallel archive that populates lower-quality solutions of that specific island, and the communication between islands can happen through migration and not other methods. Also, the main archive does not continuously interact with the selection process. Therefore, for techniques described herein, the main archive interaction feature used in the optimization and/or improvement engine can reduce the chance of stagnation during the search.

Figure 9:
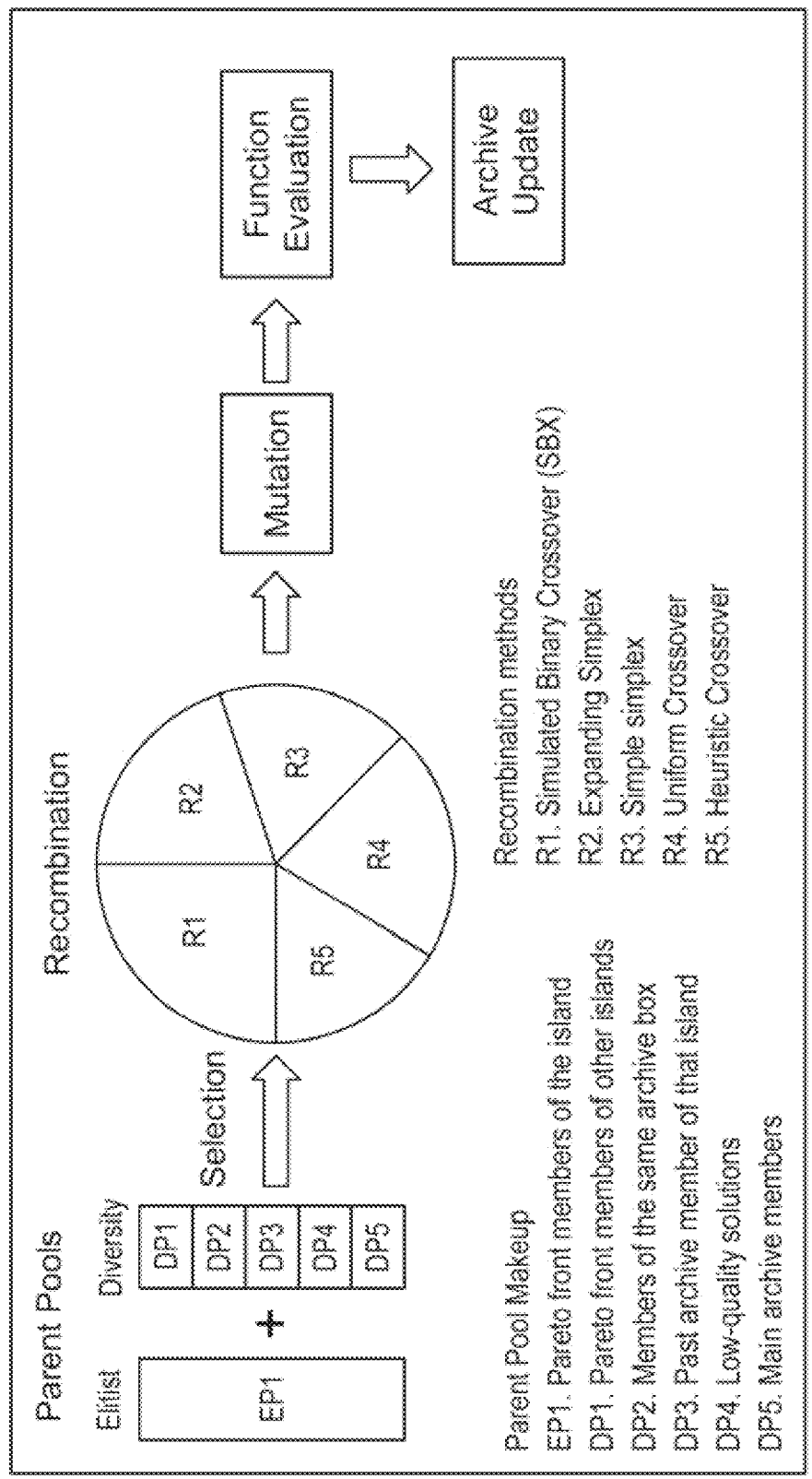
FIG. 9 illustrates performing recombination on parent pools to perform mutation, function evaluation, and an archive update, according to an embodiment.

FIG. 9 illustrates performing recombination on parent pools to perform mutation, function evaluation, and an archive update, according to an embodiment. For each island, a parent pool associated with that island can include an elitist pool and diversity pool. In some implementations, an elitist pool can include Pareto front members of that island. In some implementations, a diversity pool can include Pareto front members of other islands, members of the same archive, past archive members of that island, low-quality solutions, and main archive members. Recombination can be performed using the parent pools for selecting candidates. Recombination can include, for example, using a combination of simulated binary crossover, expanding simplex, simple simplex, uniform crossover, and heuristic crossover. Thereafter, mutation can be performed on at least some the selected candidates. A function evaluation can be performed through the serverless functions, and the archive updated.

2.11. Example Search Operators:

Some implementations of the systems and methods described herein use three evolutionary search operators (e.g., selection, recombination, and mutation). The optimization and/or improvement engine can use a refined and unique way of implementing these operators to make them more flexible and compatible with cloud infrastructures and the rest of the optimization and/or improvement engine compared to known techniques.

2.11.1. Example Selection:

The selection of candidate parents (e.g., set of candidates 134*e*, set of candidates 144*d*, etc.) from the parent pools can depend on the type of recombination method. However, in some implementations, the recombination parents are selected from both elitist and diversity parents. For example, in SBX, one parent can be selected from each of the two parent pools, and in expanding Simplex, one parent can be selected from the elitist pool and k parents from the diversity pool. Note that k can be a user-defined hyperparameter (e.g., with the default value of k=4).

2.11.2. Example Recombination:

The optimization and/or improvement engine can use, for example, any number of different real-value crossover (recombination) methods for creating new offspring (e.g., set of offspring 134*f*, set of offspring 144*e*, etc.). These methods can include, for example, Simulated Binary Crossover (SBX), Expanding Simplex, Simple Simplex, Uniform Crossover, Heuristic Crossover any other suitable recombination method or any suitable combination thereof. In some implementations, the default percentage of contribution of each crossover method to the next generation is 20%, meaning that they equally contribute to the recombination. However, in some implementations, the users can change these percentages as a part of their hyperparameter adjustments (e.g., as illustrated in FIG. 15C at "Fraction of Offspring Generated by Recombination Methods"). This will allow the users to fine-tune greediness and the exploration vs. exploitation trade-offs based on the specific need of their problem.

2.11.3. Example Mutation:

After recombination, the newly generated offspring can go through mutation to finalize the creation of offspring (e.g., mutated set of offspring 134*g*, mutated set of offspring 144*f*, etc.). Each offspring can have a predefined chance of getting selected for mutation during the mutation process. In some implementations, the mutation method used in the optimization and/or improvement engine is uniform mutation.

Figure 11:
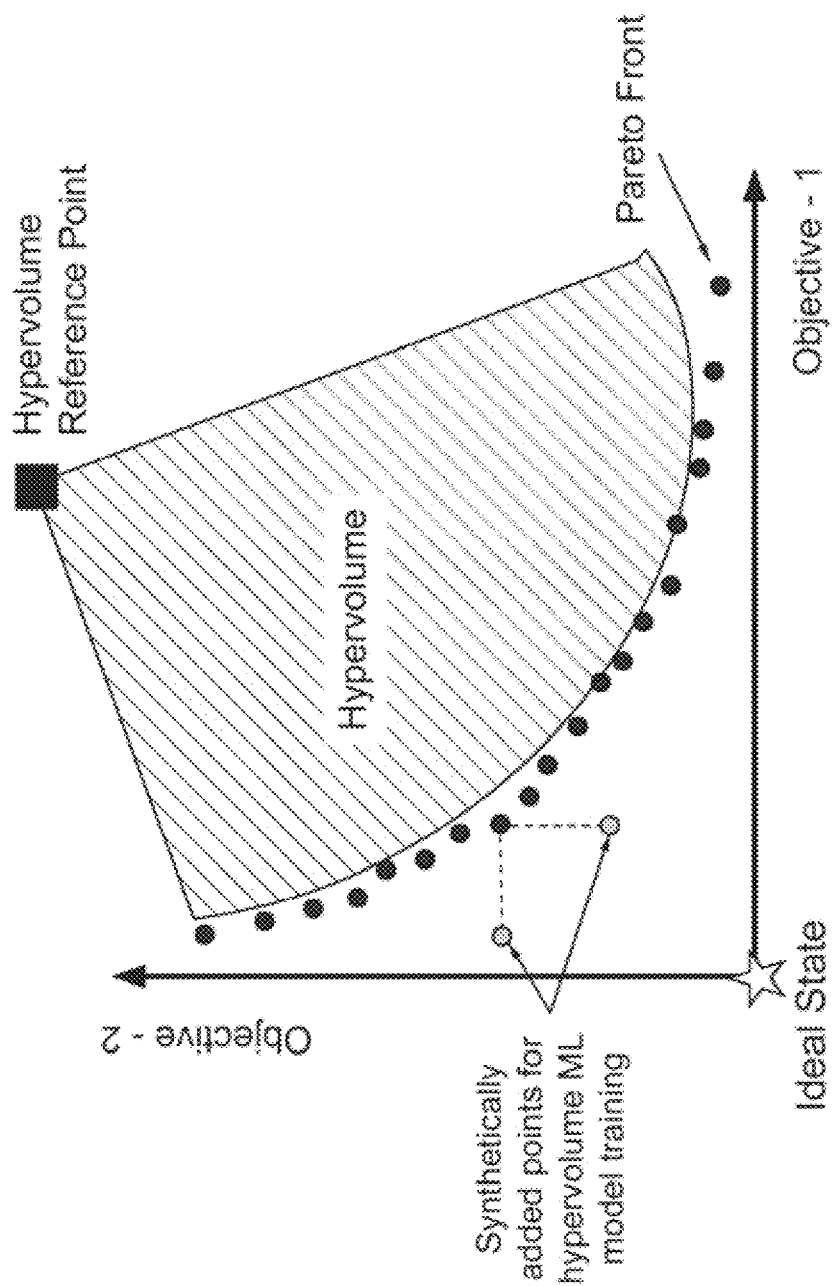
FIG. 11 illustrates a hypervolume approximation method schematic for a two-objective problem, according to an embodiment.

2.12. Example Hypervolume Calculation:

Hypervolume can refer to the volume covered between the Pareto front and a reference point within the objective space (see, e.g., FIG. 11). The volume of hypervolume and its expansion rate can indicate the search quality and the identified Pareto front solution. There can be a category of MOEAs based on hypervolume rate of progression. Higher hypervolume values can imply a more extensive and diverse non-dominated solution set, which can indicate that the search has discovered more comprehensive trade-offs between objective functions.

In the optimization and/or improvement engine, the hypervolume lambda function can get invoked at a predefined interval. In some implementations, the calculation of hypervolume happens for the main archive but not in individual islands. The reference point used for hypervolume calculation can be, for example, the first randomly generated solution at the beginning of the search (e.g., which can have a low quality).

Figure 10:
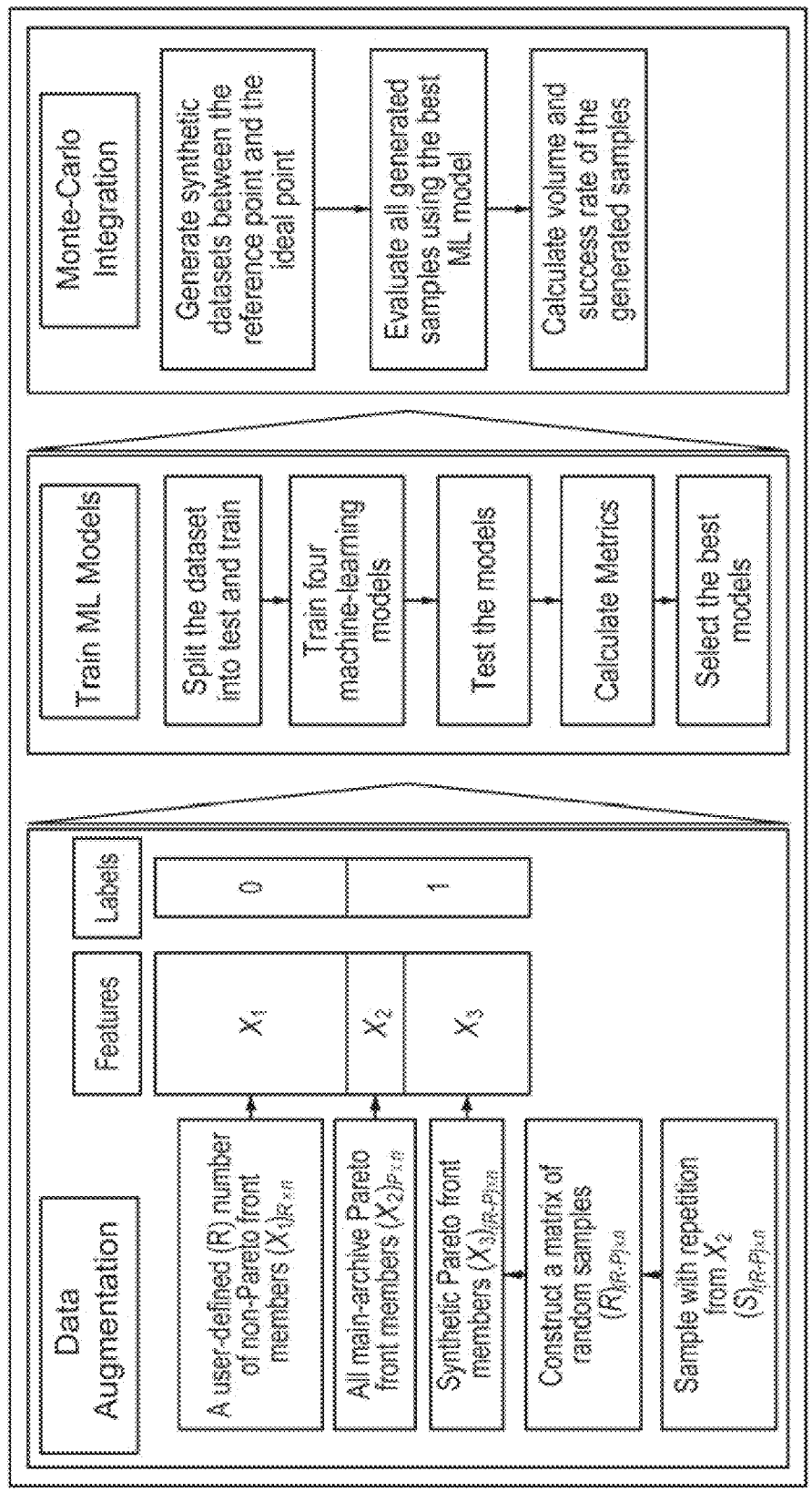
FIG. 10 illustrates a hypervolume calculation process, according to an embodiment.

While there are some known hypervolume calculation methods, they suffer from high computational costs and low accuracy. In some implementations, the hypervolume modules described herein can include three main components (see, e.g., FIG. 10): 1) data augmentation, 2) model development to approximate the Pareto front, and 3) Monte Carlo integration to approximate the hypervolume. FIG. 10 illustrates a hypervolume calculation process, according to an example embodiment. As shown in FIG. 10, in some implementations the hypervolume calculation process can include data augmentation, training ML models, and Monte-Carlo integration.

1) Data augmentation: As shown in FIG. 9, the hypervolume calculation process can include data augmentation. In some known techniques, Pareto front solutions make up a small fraction of the evaluated member pool. Therefore, developing a machine learning (ML) model to estimate the decision boundary between non-Pareto front and Pareto front members becomes a rare event problem subject to an imbalanced dataset with many failures and a limited number of successes. There are known up-sampling or down-sampling strategies to create a more balanced dataset that can lead to more reliable ML models. However, the optimization and/or improvement model described herein can increase the number of success points that reside either on or under the Pareto front to create a more balanced dataset (see, e.g., FIG. 8). The following describes an example methodology used for the data augmentation, according to some implementations:

a) A user-defined number of non-Pareto front members (X1) are randomly selected, and their label set to "0".
b) The main-archive Pareto front members (X2, label="1") are selected and added to X1.
c) The X2 solutions are on the Pareto front. If the quality of any objective functions of any X2 members improves, the newly made solution will be a new archive member. Therefore, to up-sample the Pareto front dataset, the evolutionary machine learning models and/or evolutionary optimization models first samples (with repetition) from X2 with the total size of X3=X1−X2.

d) A matrix of (X3*number of n objectives) size is constructed, which includes randomly generated numbers between 1 and 2.

e) The objectives in X3 are divided by the matrix to synthetically generate solutions superior to the Pareto front, and will set their label values to "1".

f) X1, X2, and X3 are combined to construct the feature space with their corresponding labels.

2) Model development to approximate the position of the Pareto front: As shown in FIG. 9, the hypervolume calculation process can include training ML models. Some implementations use machine learning to approximate the position of the Pareto front and classify points to Pareto-front and non-Pareto front members. Some implementations use four machine-learning methods (logistic regression, SVM, random forest, and gradient-boosted tree). The input data can be divided into two sets for training and testing. The four ML models can each be trained through the training set and tested using the testing set. In some implementations, the model with the best precision and recall score can be selected.

3) Monte Carlo integration to approximate the hypervolume: As shown in FIG. 9, the hypervolume calculation process can include Monte Carlo integration. After developing the ML models, a Monte Carlo integration approach can be used to estimate the hypervolume. First, a predefined number of synthetic samples can be generated using LHS, which reside between the reference point and the "Ideal Point" of the Pareto front. Then, the generated samples can be evaluated using the most accurate ML model developed in (2) above. The success rate of the samples can be the hypervolume of the current Pareto front. After training and testing the Pareto front estimation machine learning models, the best solution and its machine learning model can be saved in a public cloud object storage (e.g., S3 bucket).

2.13. Example Use of Artificial Intelligence to Guide the Search

In the optimization and/or improvement engine, unlike some known MOEAs, the solution dataset (e.g., in its entirety) can be available for querying. This enables the development of real-time Pareto front approximators, which can direct the search and prefilter low-quality offspring. This can significantly increase the speed of search that can be a time-saving capability for, for example, computationally expensive functions.

FIG. 11 illustrates a hypervolume approximation method schematic for a two-objective problem, according to an embodiment. FIG. 11 illustrates two objectives (objective 1 and objective 2) along two axes. The hypervolume is represented along the two axes, as well as the hypervolume reference point, ideal state, and Pareto front. In some implementations, points can be synthetically added for hypervolume ML model training.

3. Example Mass Simulation, Sensitivity Analysis, and Model Calibration

In some implementations, the optimization and/or improvement engine included in the systems and methods described herein can conduct mass simulation and Monte Carlo computational experiments. For example, the same computational platform can be used to explore the sensitivity of model outputs to input parameters (sensitivity analysis). Computational models can also be calibrated in some implementations. Hyperparameters of machine learning models can also be tuned in some implementations.

In some implementations, systems and methods described herein employ serverless computational resources (e.g., cloud server 130 and 140) for executing evolutionary optimization and/or improvement machine learning models. This addresses the longstanding resource provisioning problem that has hindered the mainstream adoption of parallel optimization and/or improvement methods. Some implementations of the systems and methods described herein perform one or more of the following procedures to enable the scalable use of serverless services for optimization and/or improvement and address the computational resource provisioning problem:

1) The optimization and/or improvement function evaluation tasks are conducted through serverless resources. Function evaluation is often the most demanding computational operation in many-objective evolutionary models (MOEA), and serverless system provides high flexibility and scalability for these computations;

2) MOEA offspring generation functions are executed using serverless resources (e.g., cloud server 130, 140, etc.). Techniques described herein are thus not dependent on central controllers and master nodes, and instead facilitates a fully serverless implementation;

3) Serverless resources are used to monitor the status of the search. For example, the calculation of hypervolume during the search process can be fully serverless;

4) Serverless resources are used for substantially real-time data extract, transform, and load operations that are used for the functioning of MOEAs;

5) The use of containerized serverless functions ensures that functions of different sizes and configurations can be optimized and/or improved in the evolutionary optimization and improve the execution time. This is also a useful milestone towards a fully serverless system; and 6) Cloud-based shared memory resources and serverless invocation capabilities are used to facilitate serverless implementation.

Some implementations can be extended to various types of serverless services, including the out-of-the-box cloud-native serverless offerings (for example, AWS Lambda) and other serverless functions created manually, for example:

1) Cloud-based data storage systems can be used as a shared memory resource among various MOEA computational units. This feature increases the storage limit, reduces communication time, and provides continuous access to the entire datasets generated throughout the optimization and/or improvement process. In particular, one or more of the following features can be implemented to enable the use of cloud-based storage resources for the serverless MOEA implementation:

1a) Two-way communications between each MOEA computational unit and the information stored in the relational database system can be established;

1b) Techniques described herein can continuously, periodically and/or sporadically communicate with the other islands' datasets and their Pareto front members, and the main archive;

1c) The memory system (e.g., the invocation of serverless functions (for function evaluation, hypervolume calculation, main archive updates, etc.) through DynamoDB NoSQL events) also triggers serverless optimization and/or improvement functions through NoSQL dataset events;

1d) NoSQL datasets can be used to share unstructured global parameter datasets among the optimization and/or improvement units. This means that the user-defined problem-specific details such as the range of decision and objective variables, hyperparameters, current number of NFE, current stage of the search, etc. remain accessible.

Cloud-native function invocation services as described herein can be used to facilitate asynchronous function execution across different units of the optimization and/or improvement engine, for example, event-driven architecture that treats a newly generated offspring as a new event, invokes the serverless functions and conducts function simulations, and/or the event-driven architecture can also trigger offspring generation, archive update features, and search condition monitoring at user-defined arbitrary NFE intervals.

Implementations described herein can apply to other single-objective or multi-objective evolutionary optimization and/or improvement and genetic machine learning approaches, as well as other heuristic optimization and/or improvement techniques, including (but not limited to) swarm optimization and/or improvement, ant colony optimization and/or improvement, simulated annealing, and differential evolution.

The search can be initialized from previously known solutions or desired initialization benchmarks. This can reduce the time of achieving the convergence while also improving the quality of the final optimized and/or improved solutions.

The transition of the evolutionary search from exploration to exploitation modes can be facilitated using a tiered search method. This feature enables a reasonable convergence speed to be reached while exploring the solution space to escape local optima.

The random seed can be set at the beginning of each serverless computational task. That ensures that the search is not subject to deterministic randomness and is not biased towards a specific part of the space.

A constraint enforcement approach can be used that ensures a comprehensive, unbiased exploration of the parametric space before applying the constraints.

A two-parent pool generation approach for recombination can be used that considers both elitism and diversity in the offspring generation process. Systems and methods described herein can generate two parent pools (diversity and elitist pools) for each individual island. The diversity pool can include a user-defined combination of other islands' archive members, main archive members, high-quality non-Pareto members of the island and low-quality solutions.

An island-based approach can be used that is unique in at least the following aspects:
1) while the evolutionary machine learning models and/or evolutionary optimization models' structure can be island-based, the platform has no master node or centralized controllers. The entire computational process of the island can thus be conducted through serverless functions;
2) The memory can be shared between the islands;
3) The islands do not have a pre-defined migration strategy. Instead, there can be a leakage to other islands at the offspring generation events that affect their recombination process.

A hypervolume calculation method that can significantly reduce the time complexity of hypervolume estimation compared to other alternatives.

Other functionalities that can be embedded in the systems and methods described herein that include a serverless architecture, for example:

1) model sensitivity and uncertainty analysis using serverless cloud resources;
2) calibration of process-based models using serverless cloud resources; and
3) utilizing a serverless cloud-based MOEA platform to optimize and/or improve machine learning models' hyperparameters.

Systems and methods described herein may provide one or more benefits, including, for example:
1) improving the quality of the search for the best and/or improved solutions compared to other counterpart techniques;
2) cost reduction through addressing the resource provisioning issue of some current evolutionary computation techniques;
3) higher search quality through providing a solution for the shared memory problem in parallel evolutionary machine learning and/or evolutionary optimization models;
4) improvement in the total computational time;
5) addressing the need for handling the space complexity of evolutionary machine learning models and/or evolutionary optimization models;
6) efficient and scalable parallelization of optimization and/or improvement engines; and
7) reduction in the time complexity of hypervolume calculation modules.

FIG. 12 illustrates a conceptual workflow of the optimization/improvement module to generate objective functions using function evaluations of decision variables, according to an embodiment. Decisions variables (e.g., Decision 1-26 at FIGS. 14A and 14B) are provided to a function evaluation and objective functions (e.g., Objectives 1-4 at FIG. 14B) can be output. In some implementations, decision variables can be mapped using a first coordinate system (e.g., x), and input into an optimization model and/or function configured to transform the decision variables in the first coordinate system to objectives in a second coordinate system (e.g., y). Where there is decision space (e.g., represented by "x") and objective space (e.g., represented by "y"), the optimization maps "x" to "y" and finds the desired Ys through function evaluation and the optimization operators (e.g., selection, mutation, and crossover).

Figure 13:
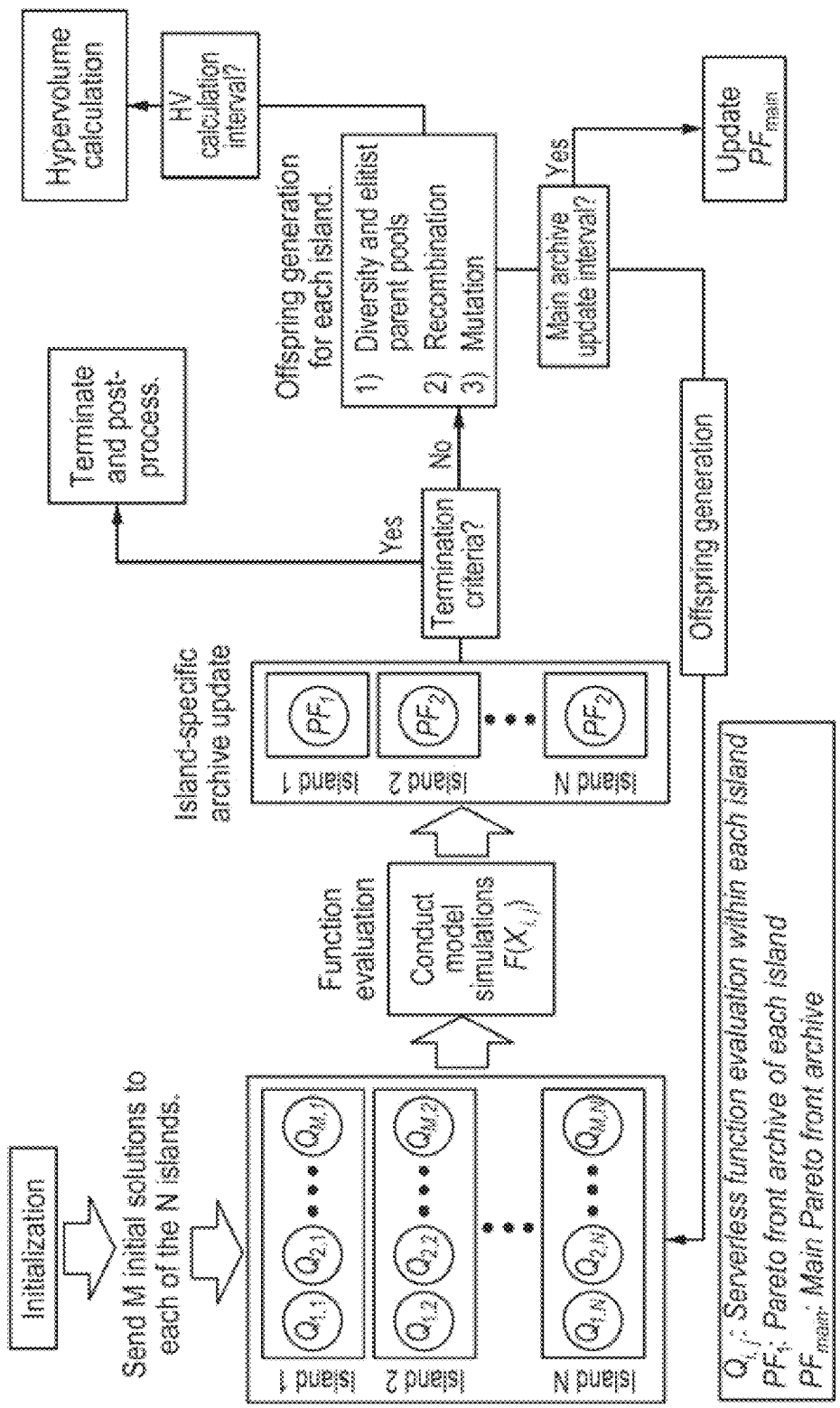
FIG. 13 illustrates a process for performing an evolutionary optimization and/or improvement technique, according to an embodiment.

FIG. 13 illustrates a process (e.g., performable by processor 112, 122, 132, and/or 142) for performing an evolutionary optimization and/or improvement technique, according to an embodiment. Initial solutions can be send (e.g., by processor 122 and/or 112) to multiple islands, and serverless function evaluations can be performed (e.g., by processor 132 and/or 142) at each island. The archives at each island can be updated (e.g., by processor 132 and/or 142). Offspring is generated (e.g., by processor 132 and/or 142) for each island by generating diversity and elitist parent pools, performing recombination, and performing mutation. Thereafter, offspring are generated (e.g., by processor 132 and/or 142) for reperforming serverless function evaluations at islands, and that main archive can be updated if that iteration is predetermined as an iteration for updating the main archive. Additionally, hypervolume calculation can be performed (e.g., by processor 132 and/or 142) if that iteration is predetermined as an interaction for hypervolume calculation. If, however, a termination criteria is met, post-processing occurs.

FIGS. 14A and 14B illustrate an example of defining variables for an example optimization project for a farming operation of an orchard, performed using systems and methods described herein, according to an embodiment. FIGS.

14A and 14B can illustrate, for example, a graphical user interface (GUI) that can be displayed to a user (e.g., via user compute device 120) such that a user can manually provide and/or correct relevant variables. As illustrated in FIG. 14A, section 1 (labelled "General Information") provides an interface to define a project name (e.g., "Seasonal Planning"), optimization method (e.g., "Island Based"), number of decision variables (e.g., 26), number of objectives (e.g., 4), a random seed (e.g., 100), maximum number of function evaluations (e.g., 5,000), and initialization method (e.g., random initialization). Section 2, illustrated in FIGS. 14A and 14B, include subsection 2.1 to define decision variables and subsection 2.2 to define objective variables. At subsection 2.1, 26 decisions (e.g., direct policy search's Gaussian radial basis function variables b_radii_season_sv1, b_radii_season_sv2, b_radii_season_sv3, c_centers_season_sv1, etc.) are illustrated (in response to the "Number of Decisions Variables" at section 1 being 26.). For each decision listed at subsection 2.1, values for similar variables (Similar Vars in this example representing the number of Gaussian radial basis function radii, centers, weights, etc.), a minimum (Min), and a maximum (Max) can be defined. At subsection 2.2, four objectives (Average_revenue, GW_level, Orchard_Reliability, and Max_yield_reliability) are illustrated (in response to the "Number of Objectives" being 4). For each objective, a lower bound, upper bound, epsilon, and direction can also be defined. As illustrated in FIG. 14B, section 3 provides a user with the option to update the optimization function. Once sections 1, 2, and 3 are complete, an optimization function (defined in part by the decisions and objectives outlined in sections 1 and 2) can be solved using techniques described herein (e.g., serverless processing).

FIGS. 15A to 15D illustrate an example of providing additional parameters for a project, according to an embodiment. FIGS. 14A to 15D can illustrate, for example, a GUI that can be displayed to a user (e.g., via user compute device 120) such that a user can manually provide and/or correct relevant variables. As illustrated in FIG. 15A, a "Number of Islands" can be defined (e.g., 10). The "Number of Islands" can indicate the number of islands (e.g., memories and/or compute devices) that will be used to solve an optimization problem. Further, an "Optimization Velocity" can be defined (e.g., gold (memory=1024 MB), silver (memory=512 MB), bronze (memory=256 MB), and/or the like). The "Optimization Velocity" can define the maximum memory and/or CPU allocations to be used to solve the optimization problem. Further, as illustrated in FIGS. 15A and 15B, an "eta Crossover SBX Parameter" can be defined (e.g., 2.0), a "Size of Diversity Pool" can be defined (e.g., 100), a "Number of Offspring per Island" can be defined (e.g., 100), and a "Stage 3 Fraction" can be defined (e.g., 0.8). Further, as illustrated in FIG. 15B, diversity pool partitioning values for multiple stages can be defined. For example, at each stage of diversity pool partitioning, the proportion of candidates in the diversity pool associated with and/or labelled with the following categories can be included: "Replaced by PF" can represent being replaced by Pareto front members, "Replaced by Same Box" can represent being replaced by the same box members, "Filled from Other Islands" can represent injecting from other islands, "Random Bad Members" can represent random bad members from the same pool, and "Main Archive Members" can represent being injected from the main pool. In addition, as illustrated in FIG. 15B, the percentage of total number of function evaluation used to transition from stage 2 to stage 3 can be defined.

In the example illustrated in FIG. 15B, at stage 2, a diversity pool includes: 15% of candidates being replaced by Pareto front members, 15% of candidates being replaced by members of the same island, 50% of candidates being replaced with candidates from a different island, 10% of candidates being replaced with random bad members from the same pool, and 10% of candidates being replaced with candidates from the main archive. Further, at stage 3, a diversity pool includes: 15% of candidates being replaced by Pareto front members, 15% of candidates being replaced by members of the same island, 30% of candidates being replaced with candidates from a different island, 5% of candidates being replaced with random bad members from the same pool, and 35% of candidates being replaced with candidates from the main archive. Furthermore, as illustrated in FIGS. 15B and 15C, a "K Simplex" representing a number of parents going into expanding simplex (e.g., 4), a "Expanding simplex number of offsprings" representing a number of offsprings generated by expanding simplex (e.g., 10), an "Epsilon Simplex" representing a an epsilon simplex (e.g., 0.5) can be defined, and a "Simple simplex Number of Parents" representing a number of parents going into simple simplex (e.g., 2) can be defined. As illustrated in FIG. 15C, a fraction of offspring generated by recombination methods (e.g., SBX, expanding simplex, simple simplex, uniform recombination, heuristic crossover) can be defined. For example, in the example illustrated in FIG. 15C, 20% of offspring are generated using SBX, 20% of offspring are generated using expanding simplex, 20% of offspring are generated using simple simplex, 20% of offspring are generated using uniform recombination, and 20% of offspring are generated using heuristic crossover. An "Offspring Generations Interval" can also be defined (e.g., 1000) indicating the function evaluations (NFE) interval between offspring generations. Further, as illustrated in FIG. 15C and FIG. 15D, mutation parameters can be defined, such as a "Mutation Method" (e.g., SBX), "Mutation Probability" (e.g., 0.7), and "Main Archive Interval" (e.g., 2000). Further, as illustrated in FIG. 15D, a "Hypervolume Call Interval" can be defined (e.g., 2000) indicating a hypervolume call interval.

FIGS. 16A to 16D illustrate sample results of performing the optimization problem related to the farming operation of the orchard, defined in part by the parameters illustrated in FIGS. 14A, 14B, 15A, 15B, 15C, and 15D, according to an embodiment. Said differently, FIGS. 16A to 16D illustrate examples of results that can be generated using some techniques described herein based on the information illustrated in FIGS. 14A, 14B, 15A, 15B, 15C, and 15D. In some implementations, FIGS. 16A to 16D can illustrate, for example, a GUI that can be displayed to a user (e.g., via user compute device 120) such that a user can manually view the results. Plot 1602 illustrates results between three variables defined in FIG. 14B—GW_level, Average_revenue, and Orchard_Reliability. Plot 1604 illustrates results between three variables defined in FIG. 14B—GW_level, Average_revenue, and Max_yield_reliability. Plot 1606 illustrates results between three variables defined in FIG. 14B—Average_revenue, Orchard_Reliability, and Max_yield_reliability. Plot 1608 illustrates results between three variables defined in FIG. 14B—GW_level, Orchard_Reliability, and Max_yield_reliability. Plot 1610 illustrates an interactive scatter plot illustrating the relationships between the four variables defined in FIG. 14B—Average_revenue, GW_level, Orchard_Reliability, and Max_yield_reliability. Plot 1612 illustrates a 3D scatter plot comparing first and last orders for the four variables defined in FIG. 14B—Average_revenue, GW_level, Orchard_Reliability, and Max_yield_reliability. Plot 1614 illustrates a tradeoff among Average_revenue and Orchard_Reliability for the four variables defined in FIG. 14B—Average_revenue, GW_level, Orchard_Reliability, and Max_yield_reliability. Plot 1616 illustrates a generational distance progress over time and plot 1618 illustrates an inverted generational distance progress over time, where time can be represented using a number of iterations.

Figure 17:
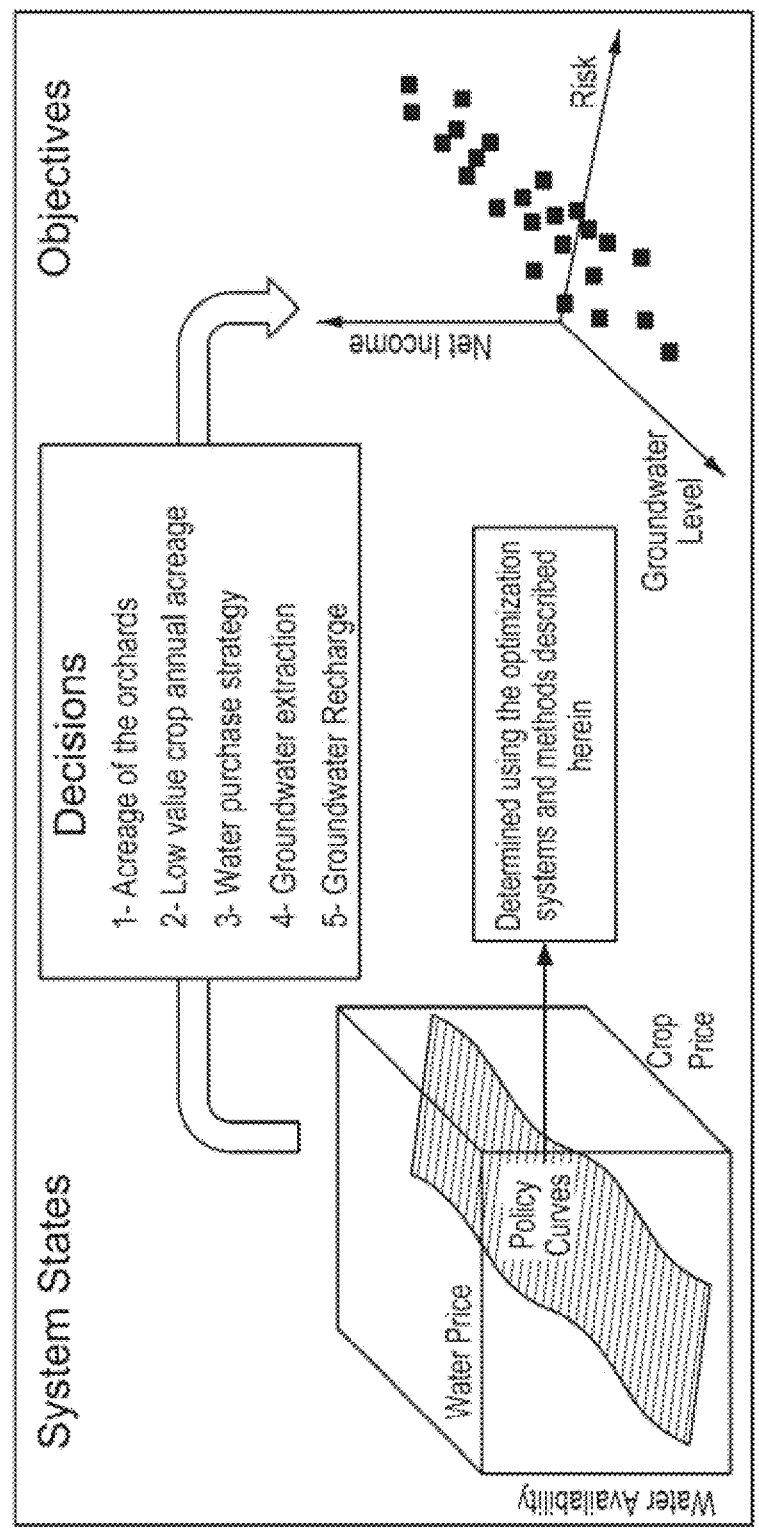
FIG. 17 illustrates an example of states, decisions, and objectives determined using the systems and methods described herein for optimizing and/or improving operation of an orchard, according to an embodiment.

An example is provided in the context of farming, according to an embodiment. In some implementations, a multi-objective optimization engine is applied to identify the best (or a better) investment and seasonal planning strategies for farmers, focusing on high-value specialty crops such as almonds and pistachios in the orchard(s). The method used in this example is referred to as direct policy search, which can use evolutionary optimization to directly parameterize policy curves representing decision rules or strategies. This method can be categorized as a control, evolutionary machine learning, or reinforcement learning solution. This multi-objective optimization engine is configured to optimize (or improve) planting and water management strategies while considering the uncertainties farmers face, including fluctuations in water availability, crop prices, water costs, and interest rates. The optimization module can focus on achieving three key objectives: (1) maximizing and/or improving the farm's net income; (2) minimizing and/or reducing water stress and risk for orchards (e.g., that include the high-value specialty crops like almonds and pistachios), which can use substantial upfront investment; and (3) complying with groundwater sustainability goals mandated by state and federal regulations, particularly in regions like California. The optimization and/or improvement can involve several decision variables, such as: (1) high-value crop acreage investment (a one-time decision over the planning horizon); (2) low-value crop acreage strategy (adjusted annually based on early-season information available to farmers); (3) water purchase strategy (determined annually); (4) groundwater extracted strategy (updated annually); and (5) groundwater recharge strategy (updated annually). FIG. 17 illustrates an example of the states, decisions, and objective, according to an embodiment, where: system states include water price, water availability, crop price, and a policy curve; decisions include the parameters of a policy curve used in direct policy approach of this example (e.g., radial basis function or sigmoid function policy curves) that represent acreage of the orchards, low value crop annual acreage, water purchase strategy, groundwater extraction, and groundwater recharge; and objective include groundwater level, net income, and risk. Using the optimization systems and methods described herein, robust strategies that balance profitability, resource sustainability, and regulatory compliance can be determined. For example, in some implementations, a population of potential answers and/or candidates to the optimization problem defined and/or characterized by the objectives and decisions can be generated (e.g., population 134a) and if qualifies and outperform at least one of the population members saved in the main archive; thereafter, serverless computing can be used (e.g., cloud server 130, 140, etc.) to generate a result for the optimization problem (e.g., by repeatedly generating sub-populations, diversity and elitist pools, candidates, offspring, mutated offspring, updated sub-populations, a updated population(s), and/or the like).

While the above describes specific optimization problems in farming of an orchard solved using the systems and methods described herein, these are for illustrative purposes only, and the systems and methods described herein can be used to solve different optimization problems in different areas. Thus, these examples should not be construed as limiting the disclosure in any way.

Figure 18A:
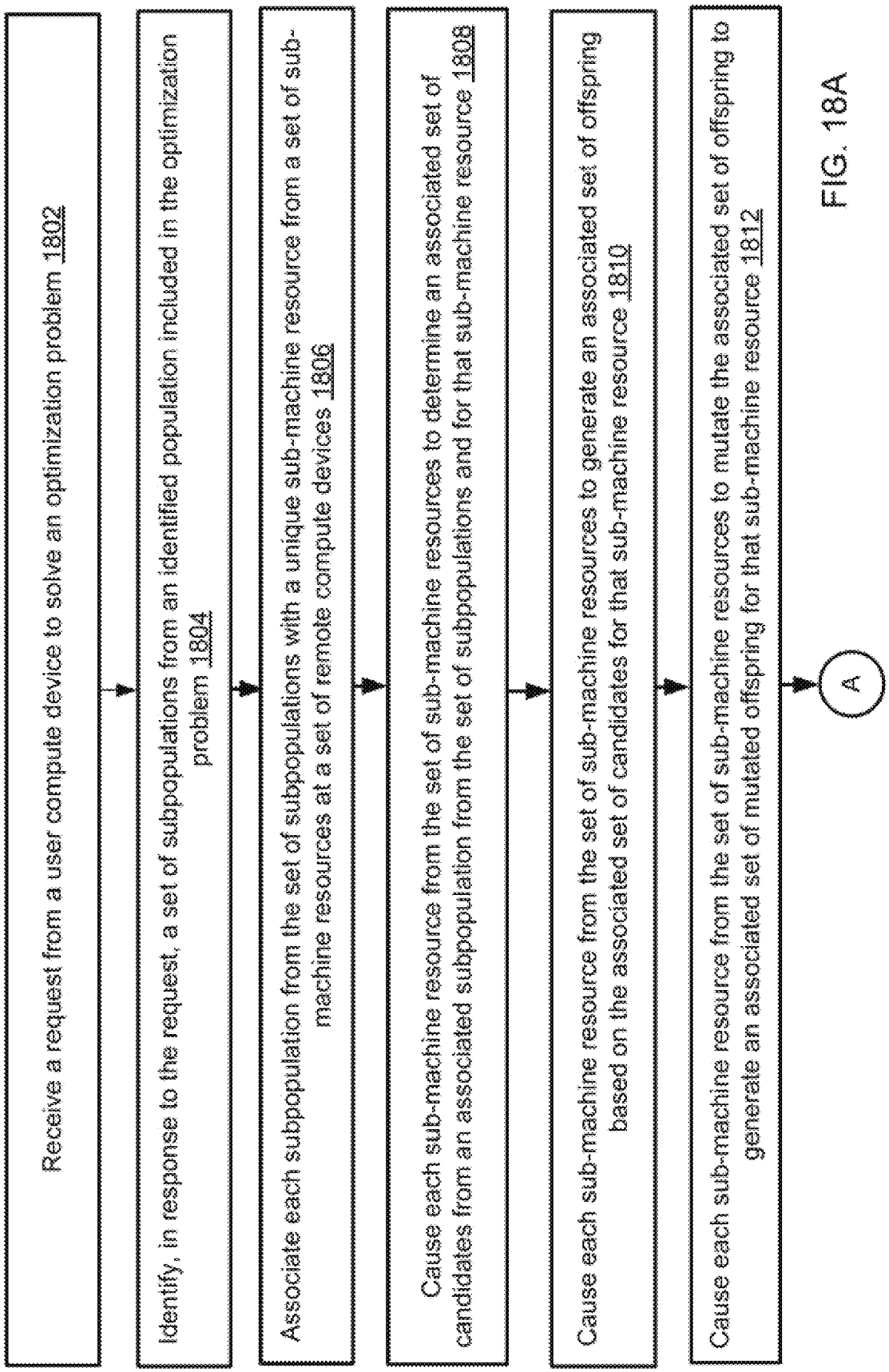
FIGS. 18A and 18B illustrate a flowchart of a method 1800 to generate an updated population and generate a response based on the updated population, according to an embodiment.
Figure 18B:
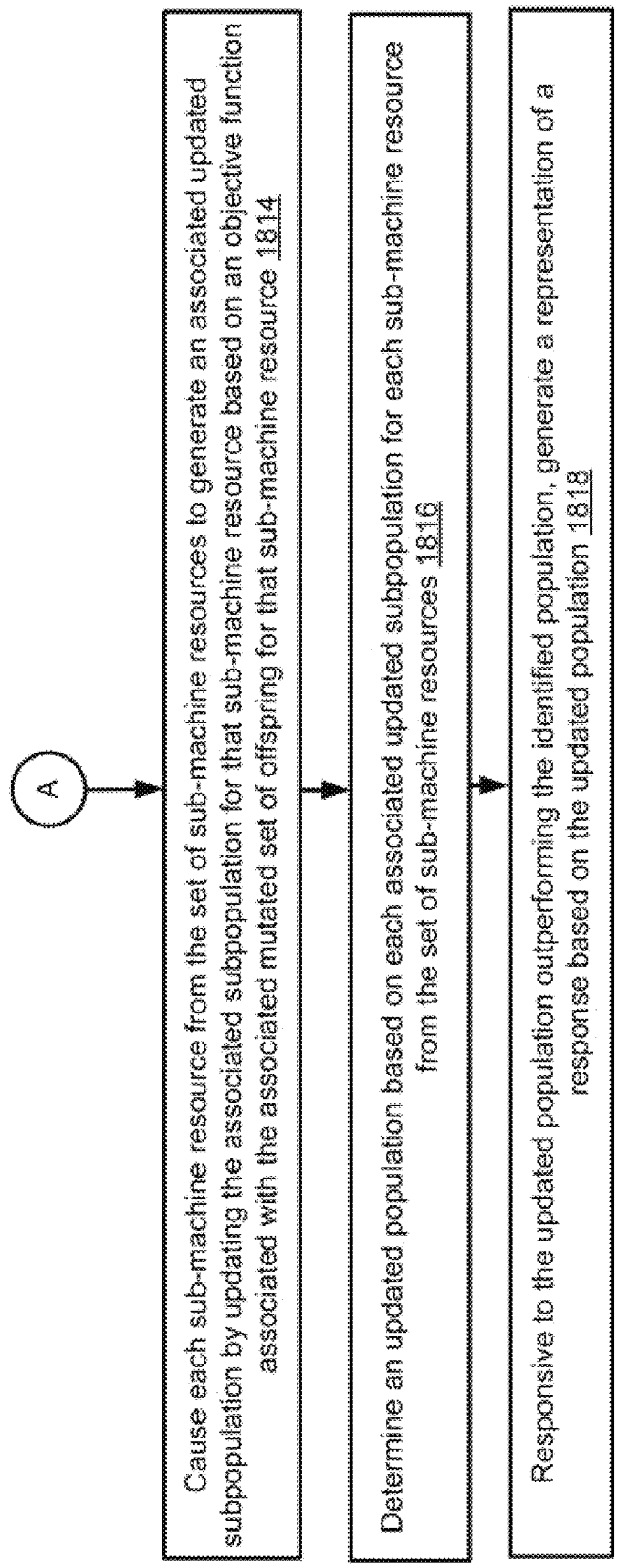

FIGS. 18A and 18B illustrate a flowchart of a method 1800 to generate an updated population and generate a response based on the updated population, according to an embodiment. In some implementations, instructions representing method 1800 are stored in a memory (e.g., memory 114 of FIG. 1) and configured to be executed by a processor (e.g., processor 112 of FIG. 1).

At 1802, a request is received from a user compute device (e.g., user compute device 120) to solve an optimization problem. For example, an electronic signal representing the optimization problem can be sent from user compute device 120 to optimization and/or improvement compute device 110 via network 102.

At 1804, in response to the request at 1802, a set of subpopulations (e.g., sub-populations 134b, 144a, etc.) is identified from an identified population (e.g., population 134a) included in the optimization problem. In some implementations, operation 1804 occurs automatically (e.g., without human intervention) in response to completing operation 1802.

At 1806, each subpopulation from the set of subpopulations is associated with (e.g., linked to, assigned to be processed by, etc.) a unique sub-machine resource from a set of sub-machine resources at a set of remote compute devices (e.g., cloud server 130, 140, etc.). In some implementations, operation 1806 occurs automatically (e.g., without human intervention) in response to completing operation 1804.

At 1808, each sub-machine resource from the set of sub-machine resources is caused to determine an associated set of candidates (e.g., set of candidates 134e, 144d) from an associated subpopulation from the set of subpopulations and for that sub-machine resource. For example, in response to receiving an electronic signal from optimization and/or improvement compute device 100, cloud servers 130 and 140 can determine the associated sets of candidates. In some implementations, operation 1808 occurs automatically (e.g., without human intervention) in response to completing operation 1806.

At 1810, each sub-machine resource from the set of sub-machine resources is caused to generate an associated set of offspring (e.g., set of offspring 134f, 144e) based on the associated set of candidates for that sub-machine resource. For example, in response to receiving an electronic signal from optimization and/or improvement compute device 100, cloud servers 130 and 140 can generate the associated sets of offspring. In some implementations, operation 1810 occurs automatically (e.g., without human intervention) in response to completing operation 1808.

At 1812, each sub-machine resource from the set of sub-machine resources is caused to mutate the associated set of offspring to generate an associated set of mutated offspring (e.g., mutated set of offspring 134g, 144f) for that sub-machine resource. For example, in response to receiving an electronic signal from optimization and/or improvement compute device 100, cloud servers 130 and 140 can generate the associated sets of mutated offspring. In some implementations, operation 1812 occurs automatically (e.g., without human intervention) in response to completing operation 1810.

At 1814, each sub-machine resource from the set of sub-machine resources is caused to generate an associated updated subpopulation (e.g., updated sub-population 134, 144g) by updating the associated subpopulation for that sub-machine resource based on an objective function associated with the associated mutated set of offspring for that sub-machine resource. For example, in response to receiving an electronic signal from optimization and/or improvement compute device 100, cloud servers 130 and 140 can generate the associated updated subpopulations. In some implementations, operation 1814 occurs automatically (e.g., without human intervention) in response to completing operation 1812.

At 1816, an updated population is determined based on each associated updated subpopulation for each sub-machine resource from the set of sub-machine resources. In some implementations, operation 1816 occurs automatically (e.g., without human intervention) in response to completing operation 1814.

At 1818, responsive to the updated population outperforming the identified population, a representation of a response is generated based on the updated population. In some implementations, operation 1818 can occur without being responsive to the updated population outperforming the identified population. In some implementations, operation 1818 occurs automatically (e.g., without human intervention) in response to completing operation 1816.

In some implementations of method 1800, causing each sub-machine resource from the set of sub-machine resources to determine the associated set of candidates for that sub-machine resource at 1808 includes causing each sub-machine resource from the set of sub-machine resources to determine an associated elitist pool (e.g., elitist pool 134c, 144b) from the associated subpopulation for that sub-machine resource, causing each sub-machine resource from the set of sub-machine resources to determine an associated diversity pool (e.g., diversity pool 134d, 144c) from the associated subpopulation for that sub-machine resource, and causing each sub-machine resource from the set of sub-machine resources to determine the associated set of candidates for that sub-machine resource based on the associated elitist pool for that sub-machine resource and the associated diversity pool for that sub-machine resource. The associated set of candidates for that sub-machine resource include at least one candidate from the associated elitist pool for that sub-machine resource and at least one candidate from the associated diversity pool for that sub-machine resource. In some implementations, the associated elitist pool for that sub-machine resource is generated by randomly selecting a predetermined number of candidates from the associated subpopulation for that sub-machine resource. In some implementations, the diversity pool includes: a member that is part of a Pareto front and associated with a subpopulation from the set of subpopulations different than that subpopulation; a member from the subpopulation that was dominated by the Pareto front member; a member that is not currently part of the Pareto front but was previously part of the Pareto front; a member that has never been part of the Pareto front; and a member identified as a high-quality solution. Some implementations of method 1800 further include causing the set of sub-machine resources to generate a hypervolume indicator, where the diversity pool is generated based on the hypervolume indicator.

In some implementations of method 1800, the associated set of offspring are generated at 1810 using a recombination algorithm. In some implementations, the recombination algorithm includes at least one of simulated binary crossover, expanding simplex, simple simplex, uniform crossover, or heuristic crossover.

Some implementations of method 1800 further include, responsive to the updated population not outperforming the identified population, repeating: the identifying of the set of subpopulations; the associating of each subpopulation from the set of subpopulations; the causing of each sub-machine resource from the set of sub-machine resources to determine the associated set of candidates; the causing of each sub-machine resource from the set of sub-machine resources to generate the associated set of offspring; the causing of each sub-machine resource from the set of sub-machine resources to mutate the associated set of offspring; the causing of each sub-machine resource from the set of sub-machine resources to generate the associated updated subpopulation; the determining of the updated population; and the generating of the representation of the response using the updated population in place of the identified population. In some implementations, a first set of constraints are used in the associating of each subpopulation from the set of subpopulations, the causing of each sub-machine resource from the set of sub-machine resources to determine the associated set of candidates, the causing of each sub-machine resource from the set of sub-machine resources to generate the associated set of offspring, the causing of each sub-machine resource from the set of sub-machine resources to mutate the associated set of offspring, the causing of each sub-machine resource from the set of sub-machine resources to generate the associated updated subpopulation, and the determining of the updated population when using the identified population; a second set of constraints different from the first set of constraints is used when using the updated population.

In some implementations of method 1800, each subpopulation from the set of subpopulations is generated at the identifying of the set of subpopulations at 1804 using a steady-state algorithm.

Some implementations of method 1800 further include, prior to the identifying of the set of subpopulations at 1804, generating the identified population from a known solution. In some implementations, the identified population is generated using a random initialization. In some implementations, the identified population is generated using a latin-hypercube sampling.

Some implementations of method 1800 further include, prior to the identifying of the set of subpopulations at 1804, receiving a population signal from the user compute device. The population signal is indicative of the identified population.

Some implementations of method 1800 further include sending an output signal to the user compute device. The output signal is configured to cause the user compute device to output a representation of the response.

In some implementations of method 1800, the identifying of the set of subpopulations at operation 1804, the associating of each subpopulation from the set of subpopulations at operation 1806, the causing of each sub-machine resource from the set of sub-machine resources to determine the associated set of candidates at operation 1808, the causing of each sub-machine resource from the set of sub-machine resources to generate the associated set of offspring at operation 1810, the causing of each sub-machine resource from the set of sub-machine resources to mutate the associated set of offspring at operation 1812, the causing of each sub-machine resource from the set of sub-machine resources to generate the associated updated subpopulation at operation 1814 are performed asynchronously.

In some implementations of method 1800, the set of sub-machine resources include memory shared amongst the set of remote compute devices.

In some implementations of method 1800, the request includes an indication of at least one of a memory level limit or a processing level limit, the response generated without surpassing the at least one of the memory level limit or the proceeding level limit.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A method, comprising:
receiving, via a processor, a request from a user compute device to solve an optimization problem;
identifying, via the processor and in response to the request, a set of subpopulations from an identified population included in the optimization problem;
associating, via the processor, each subpopulation from the set of subpopulations with a unique sub-machine resource from a set of sub-machine resources at a set of remote compute devices;
causing, via the processor, each sub-machine resource from the set of sub-machine resources to determine an associated set of candidates from an associated subpopulation from the set of subpopulations and for that sub-machine resource, the causing each sub-machine resource from the set of sub-machine resources to determine the associated set of candidates for that sub-machine resource including:
 causing, via the processor, each sub-machine resource from the set of sub-machine resources to determine an associated elitist pool from the associated subpopulation for that sub-machine resource,
 causing, via the processor, each sub-machine resource from the set of sub-machine resources to determine an associated diversity pool from the associated subpopulation for that sub-machine resource, and
 causing, via the processor, each sub-machine resource from the set of sub-machine resources to determine the associated set of candidates for that sub-machine resource based on the associated elitist pool for that sub-machine resource and the associated diversity pool for that sub-machine resource, the associated set of candidates for that sub-machine resource including at least one candidate from the associated elitist pool for that sub-machine resource and at least one candidate from the associated diversity pool for that sub-machine resource;
causing, via the processor, each sub-machine resource from the set of sub-machine resources to generate an associated set of offspring based on the associated set of candidates for that sub-machine resource;
causing, via the processor, each sub-machine resource from the set of sub-machine resources to mutate the associated set of offspring to generate an associated set of mutated offspring for that sub-machine resource;
causing, via the processor, each sub-machine resource from the set of sub-machine resources to generate an associated updated subpopulation by updating the associated subpopulation for that sub-machine resource based on an objective function associated with the associated set of mutated offspring for that sub-machine resource;
determining, via the processor, an updated population based on each associated updated subpopulation for each sub-machine resource from the set of sub-machine resources; and
responsive to the updated population outperforming the identified population, generating, via the processor, a representation of a response based on the updated population.

2. The method of claim 1, wherein the associated elitist pool for that sub-machine resource is generated by randomly selecting a predetermined number of candidates from the associated subpopulation for that sub-machine resource.

3. The method of claim 1, wherein the diversity pool includes:
a member that is part of a Pareto front and associated with a subpopulation from the set of subpopulations different than that subpopulation;
a member from the subpopulation that was dominated by the Pareto front member;
a member that is not currently part of the Pareto front but was previously part of the Pareto front;
a member that has never been part of the Pareto front; and
a member identified as a high-quality solution.

4. The method of claim 1, further comprising:
causing, via the processor, the set of sub-machine resources to generate a hypervolume indicator, the diversity pool generated based on the hypervolume indicator.

5. The method of claim 1, wherein the associated set of offspring are generated using a recombination algorithm.

6. The method of claim 5, wherein the recombination algorithm includes at least one of simulated binary crossover, expanding simplex, simple simplex, uniform crossover, or heuristic crossover.

7. The method of claim 1, further comprising:
responsive to the updated population not outperforming the identified population, repeating:
the identifying of the set of subpopulations,
the associating of each subpopulation from the set of subpopulations,
the causing of each sub-machine resource from the set of sub-machine resources to determine the associated set of candidates,
the causing of each sub-machine resource from the set of sub-machine resources to generate the associated set of offspring,
the causing of each sub-machine resource from the set of sub-machine resources to mutate the associated set of offspring,
the causing of each sub-machine resource from the set of sub-machine resources to generate the associated updated subpopulation,
the determining of the updated population, and
the generating of the representation of the response using the updated population in place of the identified population.

8. The method of claim 7, wherein:
a first set of constraints are used in the associating of each subpopulation from the set of subpopulations, the causing of each sub-machine resource from the set of sub-machine resources to determine the associated set of candidates, the causing of each sub-machine resource from the set of sub-machine resources to generate the associated set of offspring, and the causing of each sub-machine resource from the set of sub-machine resources to mutate the associated set of offspring, the causing of each sub-machine resource from the set of sub-machine resources to generate the associated updated subpopulation, and the determining of the updated population when using the identified population, and
a second set of constraints different from the first set of constraints is used when using the updated population.

9. The method of claim 1, wherein each subpopulation from the set of subpopulations is generated at the identifying of the set of subpopulations using a steady-state algorithm.

10. The method of claim 1, further comprising:
prior to the identifying of the set of subpopulations, generating, via the processor, the identified population from a known solution.

11. The method of claim 10, wherein the identified population is generated using a random initialization.

12. The method of claim 10, wherein the identified population is generated using a latin-hypercube sampling.

13. The method of claim 1, further comprising:
prior to the identifying of the set of subpopulations, receiving, via the processor, a population signal from the user compute device, the population signal indicative of the identified population.

14. The method of claim 1, further comprising:
sending, via the processor, an output signal to the user compute device, the output signal configured to cause the user compute device to output a representation of the response.

15. The method of claim 1, wherein the identifying of the set of subpopulations, the associating of each subpopulation from the set of subpopulations, the causing of each sub-machine resource from the set of sub-machine resources to determine the associated set of candidates, the causing of each sub-machine resource from the set of sub-machine resources to generate the associated set of offspring, the causing of each sub-machine resource from the set of sub-machine resources to mutate the associated set of offspring, and the causing of each sub-machine resource from the set of sub-machine resources to generate the associated updated subpopulation are performed asynchronously.

16. The method of claim 1, wherein the set of sub-machine resources include memory shared amongst the set of remote compute devices.

17. The method of claim 1, wherein the request includes an indication of at least one of a memory level limit or a processing level limit, the response generated without surpassing the at least one of the memory level limit or the processing level limit.

18. An apparatus, comprising:
a memory; and
a processor operatively coupled to the memory, the processor configured to:
identify a set of subpopulations from an identified population included in an optimization problem;
associate each subpopulation from the set of subpopulations with a unique sub-machine resource from a set of sub-machine resources at a set of compute devices;
cause each sub-machine resource from the set of sub-machine resources to determine an associated set of candidates from an associated subpopulation from the set of subpopulations and for that sub-machine resource, the causing each sub-machine resource from the set of sub-machine resources to determine the associated set of candidates from the associated subpopulation from the set of subpopulations and for that sub-machine resource including:
causing each sub-machine resource from the set of sub-machine resources to determine an associated elitist pool from the associated subpopulation for that sub-machine resource,
causing each sub-machine resource from the set of sub-machine resources to determine an associated diversity pool from the associated subpopulation for that sub-machine resource, and
causing each sub-machine resource from the set of sub-machine resources to determine the associated set of candidates for that sub-machine resource based on the associated elitist pool for that sub-machine resource and the associated diversity pool for that sub-machine resource, the associated set of candidates for that sub-machine resource including at least one candidate from the associated elitist pool for that sub-machine resource and at least one candidate from the associated diversity pool for that sub-machine resource;
cause each sub-machine resource from the set of sub-machine resources to generate an associated set of offspring based on the associated set of candidates for that sub-machine resource;

cause each sub-machine resource from the set of sub-machine resources to mutate the associated set of offspring to generate an associated set of mutated offspring for that sub-machine resource;

cause each sub-machine resource from the set of sub-machine resources to generate an associated updated subpopulation by updating the associated subpopulation for that sub-machine resource based on an objective function associated with the associated set of mutated offspring for that sub-machine resource;

determine an updated population based on each associated updated subpopulation for each sub-machine resource from the set of sub-machine resources; and generate a representation of a response based on the updated population.

19. The apparatus of claim 18, wherein the processor is configured to associate each subpopulation from the set of subpopulations with the unique sub-machine resource from the set of sub-machine resources without intervention by a user.

20. The apparatus of claim 18, wherein the processor is configured to associate each subpopulation from the set of subpopulations with the unique sub-machine resource from the set of sub-machine resources based on user input that includes an indication of at least one of a maximum number of compute devices to use for the optimization problem or a minimum number of compute devices to use for the optimization problem.

21. The apparatus of claim 18, wherein a size of a first subpopulation from the set of subpopulations is different than a size of a second subpopulation from the set of subpopulations.

22. The apparatus of claim 18, wherein each subpopulation from the set of subpopulations has a common size.

23. The apparatus of claim 18, wherein the response includes a figure and at least one statistic.

24. A non-transitory computer-readable storage medium storing instructions that, when executed by a computer system, perform operations comprising:

receive a request from a user compute device to solve an optimization problem;

identify, in response to the request, a set of subpopulations from an identified population included in the optimization problem;

associate each subpopulation from the set of subpopulations with a unique sub-machine resource from a set of sub-machine resources at a set of remote compute devices;

cause each sub-machine resource from the set of sub-machine resources to determine an associated set of candidates from an associated subpopulation from the set of subpopulations and for that sub-machine resource, each sub-machine resource from the set of sub-machine resources generating an associated set of offspring based on the associated set of candidates for that sub-machine resource, each sub-machine resource from the set of sub-machine resources mutating the associated set of offspring to generate an associated set of mutated offspring for that sub-machine resource, each sub-machine resource from the set of sub-machine resources generating an associated updated subpopulation by updating the associated subpopulation for that sub-machine resource based on an objective function associated with the associated set of mutated offspring for that sub-machine resource, the causing each sub-machine resource from the set of sub-machine resources to determine the associated set of candidates from the associated subpopulation from the set of subpopulations and for that sub-machine resource including:

causing each sub-machine resource from the set of sub-machine resources to determine an associated elitist pool from the associated subpopulation for that sub-machine resource, causing each sub-machine resource from the set of sub-machine resources to determine an associated diversity pool from the associated subpopulation for that sub-machine resource, and causing each sub-machine resource from the set of sub-machine resources to determine the associated set of candidates for that sub-machine resource based on the associated elitist pool for that sub-machine resource and the associated diversity pool for that sub-machine resource, the associated set of candidates for that sub-machine resource including at least one candidate from the associated elitist pool for that sub-machine resource and at least one candidate from the associated diversity pool for that sub-machine resource;

determine an updated population based on each associated updated subpopulation for each sub-machine resource from the set of sub-machine resources; and responsive to the updated population outperforming the identified population, generate a representation of a response based on the updated population.

25. The non-transitory computer-readable storage medium of claim 24, wherein the identified population is stored at a remote compute device from the set of remote compute devices.

26. The non-transitory computer-readable storage medium of claim 24, wherein the request includes an indication of an objective variable, the response includes a plot, and the objective variable is a variable at the plot.

27. The non-transitory computer-readable storage medium of claim 24, wherein the request includes an indication of a plurality of decision variables and a plurality of objective variables.

28. The non-transitory computer-readable storage medium of claim 24, wherein the request includes an indication of at least one of a memory level minimum or a processing level minimum, the response generated using more than the at least one of the memory level minimum or the processing level minimum.

29. The non-transitory computer-readable storage medium of claim 24, wherein the request includes an indication of a processor type, and the response is not generated using the processor type.

* * * * *